United States Patent [19]
Richardson et al.

[11] Patent Number: 5,917,727
[45] Date of Patent: Jun. 29, 1999

[54] SHEET REGISTRATION SYSTEM

[75] Inventors: Michael M. Richardson, Eden Prairie; Allan C. Brittle, Jr., Wayzata; Kent Gorham, Prior Lake; Jay R. Peterson, Eden Prairie; Chris J. Vetter, St. Paul, all of Minn.

[73] Assignee: Check Technology Corporation, Minnetonka, Minn.

[21] Appl. No.: 08/926,763

[22] Filed: Sep. 8, 1997

Related U.S. Application Data

[63] Continuation of application No. 08/481,765, Jun. 7, 1995, abandoned, which is a continuation of application No. 08/399,126, Mar. 6, 1995, Pat. No. 5,748,483, which is a continuation-in-part of application No. 08/354,654, Dec. 13, 1994, Pat. No. 5,644,494.

[51] Int. Cl.⁶ .................................................. G06F 17/00
[52] U.S. Cl. .................. 364/478.11; 364/478.01; 271/227
[58] Field of Search ................. 364/478.01, 478.07, 364/478.11, 478.16; 271/226, 227

[56] References Cited

U.S. PATENT DOCUMENTS

| | | | |
|---|---|---|---|
| Re. 33,843 | 3/1992 | Naramore et al. | 271/251 |
| 3,816,866 | 6/1974 | Miaskoff et al. | 11/3 |
| 3,881,717 | 5/1975 | Dean | 270/58 |
| 4,417,801 | 11/1983 | Eisemann | 355/35 H |
| 4,438,917 | 3/1984 | Janssen et al. | 271/227 |
| 4,560,293 | 12/1985 | McCumber et al. | 271/254 |
| 4,734,748 | 3/1988 | Murayama et al. | 271/287 |
| 4,786,041 | 11/1988 | Acquaviva et al. | 271/3.1 |
| 4,799,661 | 1/1989 | Nail | 270/54 |
| 4,880,223 | 11/1989 | Yamazaki et al. | 271/293 |
| 4,971,304 | 11/1990 | Lofthus | 271/227 |
| 5,005,817 | 4/1991 | Ruch et al. | 271/9 |
| 5,049,924 | 9/1991 | Moro et al. | 271/258 |
| 5,067,704 | 11/1991 | Tsuihiji et al. | 271/262 |
| 5,075,721 | 12/1991 | Paulsel et al. | 271/9 |
| 5,078,384 | 1/1992 | Moore | 271/228 |
| 5,079,729 | 1/1992 | Nowakowski | 364/559 |
| 5,085,418 | 2/1992 | Rapkin et al. | 271/3.1 |
| 5,136,343 | 8/1992 | Brasell | 271/287 |
| 5,141,215 | 8/1992 | Ishiguro et al. | 270/53 |
| 5,156,391 | 10/1992 | Roller | 271/227 |
| 5,222,860 | 6/1993 | Kamath et al. | 414/795.8 |
| 5,232,211 | 8/1993 | Kubota et al. | 271/9 |
| 5,246,219 | 9/1993 | Watkiss | 270/58 |
| 5,273,274 | 12/1993 | Thomson et al. | 271/228 |
| 5,278,624 | 1/1994 | Kamprath et al. | 355/317 |
| 5,284,338 | 2/1994 | Allmendinger et al. | 271/220 |
| 5,287,158 | 2/1994 | Nagashima et al. | 355/309 |
| 5,316,288 | 5/1994 | Fish et al. | 271/250 |
| 5,322,273 | 6/1994 | Rapkin et al. | 271/227 |

*Primary Examiner*—Paul P. Gordon
*Attorney, Agent, or Firm*—Merchant, Gould, Smith, Edell, Welter & Schmidt, P.A.

[57] ABSTRACT

In one embodiment of the present invention, a modular printing system has a plurality of modules for processing sheets. One module is a collator module configured to retain the sheets. The collator module has a collator controller and sensors linked to the collator controller. The sensors are arranged to detect erroneously processed sheets. The collator controller is configured to generate an error signal in response to detection of an error. The collator module also includes a feed assembly for presenting the sheets. A printer module is configured to receive sheets presented by the feed assembly. The printer module includes a printer controller and sensors linked to the printer controller. The sensors are arranged to detect erroneously processed sheets and to generate an error signal in response to detection of an error. The module printing system also includes a system controller linked to the collator controller and the printer controller. The system controller is configured to generate and transmit scheduling signals thereby scheduling operation of the printing system for processing sheets. The system controller is further configured to generate error-recovery signals in response to error signals generated by the collator and printer controllers, thereby causing the modular printing system to automatically recover from printer and collator errors.

19 Claims, 28 Drawing Sheets

SHEET REGISTRATION SYSTEM

REFERENCE TO APPLICATION

This is a Continuation of application Ser. No. 08/481,765, filed Jun. 7, 1995, now abandoned, which is a continuation of Ser. No. 08/399,126 filed Mar. 6, 1995 now U.S. Pat. No. 5,748,483 issued May 5, 1998, which application is incorporated herein by reference, which is a continuation-in-part of Ser. No. 08/354,654 filed Dec. 13, 1994, now U.S. Pat. No. 5,644,494 issued Jul. 1, 1997, and entitled IMPROVED PRINTING SYSTEM.

FIELD OF THE INVENTION

The present invention relates generally to a document handling apparatus and, more particularly, to a document handling apparatus that collates sheets and inserts the sheets into a printing system.

BACKGROUND OF THE INVENTION

Customized documents are commonly used in the form of deposit slips, checks, and other types of bank drafts and personalized documents. The use of these types of documents has become widespread throughout the world and many institutions, such as banks and credit unions, are dependent upon these documents for efficient operation. The widespread use of these customized documents has lead to numerous efforts to develop systems that can print them fast and without error.

Conventional check printing processes typically use a collator and either a printer or a press. The collator first organizes different types of check stock, and then selects ("picks") the appropriate type of check stock and feeds it to the printer. Once received by the printer, the check stock is printed with customized information, such as an account-holder's name and address.

Many check-printing systems use a press-type printer that includes an imaging plate. The imaging plate is typically arranged in a document-feed path for engaging the face of the documents as they are guided by document-guiding rollers. Such document-guiding mechanisms are conventional in photocopying machines. When printing a document, the printer is designed to transport the document around the rollers in order to guide it to the imaging plate for printing.

In connection with the present invention, several disadvantages of the above-described process have been recognized. One disadvantage concerns productivity. It is important that the document-feeding path to and through the printer be as error-free as possible in order to minimize the likelihood of the paper-jams. In the above-described process, the documents (or print medium) are typically bent around several different rollers while they are being transported through the printing equipment. Bending the documents in this manner dramatically increases the likelihood of them getting jammed, which results in a significant productivity interruption because operator intervention is required to remove the jammed documents. Moreover, jammed documents can cause a series of sequential documents to be printed out of order, which causes an even greater interruption to productivity.

Another shortcoming is that the printer, collator, and other machines used in the printing system are not typically integrated. This lack of integration, or disjointedness, makes it difficult to control the various sections of the overall printing system. For example, if an error occurs in one part of the system, such as the printer, the system will typically stop running and a warning light will illuminate. The operator is then required to manually correct the error. Furthermore, independent machines are not easily configured into a customized printing system.

Other disadvantages concern the involvement by a system operator to detect and recover from errors that inevitably occur in such document-handling systems. While many known systems can detect an error, these systems typically do not provide the operator with information regarding the location and type of error that occurred. Moreover, even the more sophisticated systems typically cannot automatically recover from the error without user intervention.

Additionally, systems that use press-type printers are expensive to operate because imaging plates for each set of checks must be created and stored. Thus, the manufacturer must purchase material for the plates and related chemicals. The labor that is required to produce and install the imaging plates is also expensive.

Accordingly, there is a need for an improved printing system that overcomes the above-mentioned deficiencies, and that increases the accuracy and productivity of the overall document-handling process.

SUMMARY OF THE INVENTION

In one embodiment of the present invention, a modular printing system has a plurality of modules for processing sheets. One module is a collator module configured to retain the sheets. The collator module has a collator controller and sensors linked to the collator controller. The sensors are arranged to detect erroneously processed sheets. The collator controller is configured to generate an error signal in response to detection of an error. The collator module also includes a feed assembly for presenting the sheets. A printer module is configured to receive sheets presented by the feed assembly. The printer module includes a printer controller and sensors linked to the printer controller. The sensors are arranged to detect erroneously processed sheets and to generate an error signal in response to detection of an error. The module printing system also includes a system controller linked to the collator controller and the printer controller. The system controller is configured to generate and transmit scheduling signals thereby scheduling operation of the printing system for processing sheets. The system controller is further configured to generate error-recovery signals in response to error signals generated by the collator and printer controllers, thereby causing the modular printing system to automatically recover from printer and collator errors.

An alternative embodiment of the present invention includes an apparatus for registering a sheet being transported along a path. The sheet has a leading edge and the apparatus is configured to shift the sheet from a first position in which the leading edge is not substantially perpendicular to the path to a second position in which the leading edge is substantially perpendicular to the path. The apparatus has a first sensor arranged and configured to detect the leading edge and generate a first signal in response to detection of the leading edge. A second sensor is arranged and configured to detect the leading edge and generate a second signal in response to detection of the leading edge. First and second roller pairs are arranged and configured to feed the sheet along the path. First and second motors are arranged and configured to rotate the first and second roller pairs, respectively. Circuitry is linked to the first and second sensors and to the first and second motors. The circuitry is configured to receive the first and second signals, detect the time interval between reception of the first and second signals, and cause a speed differential between the first and second motors in response to detection of a time interval thereby shifting the sheet from the first position to the second position.

Another alternative embodiment of the present invention is a sheet stacking apparatus for stacking sheets received from a printing assembly. The sheet stacking apparatus includes a support structure and an inverted conveyor assembly supported by the support structure. The inverted-conveyor assembly has a bottom surface and is configured to suspend the sheet received from the printing assembly against the bottom surface. The inverted-conveyor assembly transports the suspended sheets. A recirculating assembly is also supported by the support structure. The recirculating assembly is configured to separate the suspended sheet from the inverted-conveyor assembly thereby causing the sheets to fall. A platform is supported by the support structure. The falling sheets land on the platform and form a stack.

The above summary of the present invention is not intended to present each embodiment or every aspect of the present invention. This is the purpose of the figures and the associated description that follow.

BRIEF DESCRIPTION OF THE DRAWINGS

Other aspects and advantages of the present invention will become apparent upon reading the following detailed description and upon reference to the drawings in which.

While exemplary implementations of the present invention, as illustrated in these figures, can be modified and altered in various ways, it should be understood that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE DRAWINGS

A. Overview

Figure 1:
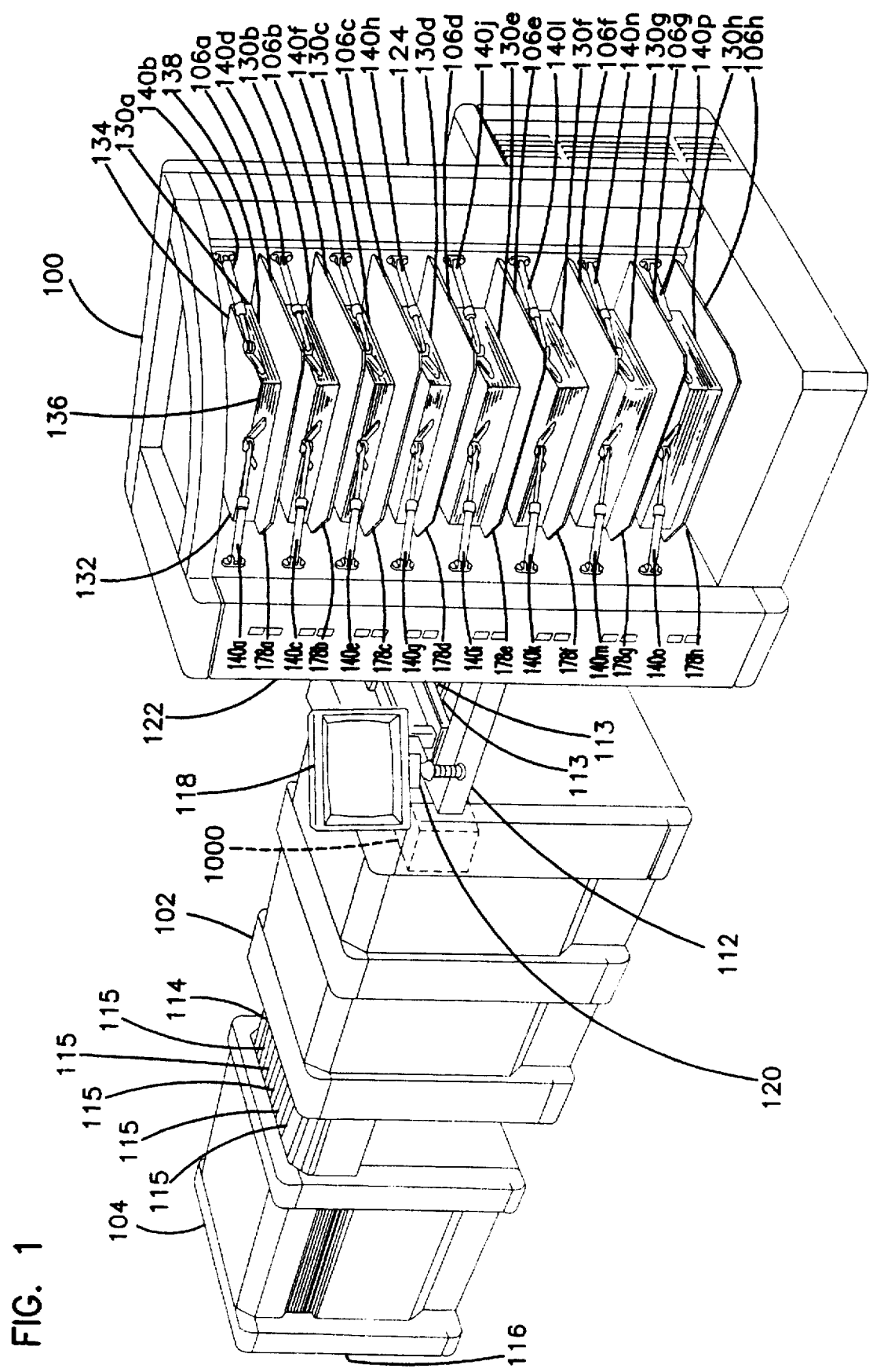
FIG. 1 is an illustration of a printing system including a collator module, a printing module, and a stacker module.
Figure 2:
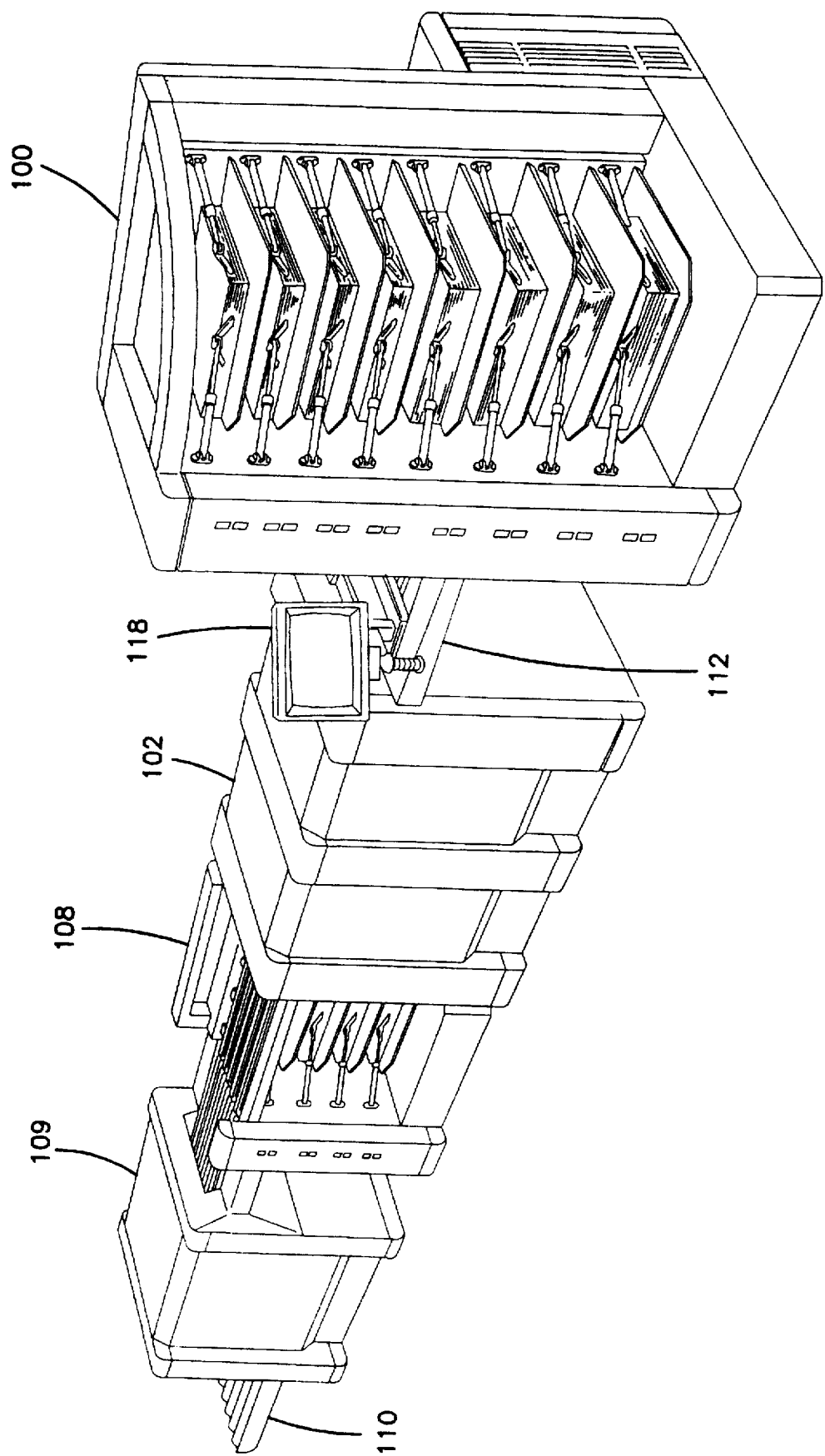
FIG. 2 is an illustration of an alternative embodiment of the printing system shown in FIG. 1.

Each of FIGS. 1–2 illustrates a system for creating documents, such as checks, deposit slips and other customized forms used in the finance industry. While the principles of the present invention are not so limited, it has been discovered that the present invention is particularly advantageous for this type of application. Hence, the implementations and embodiments embodying the principles of the present invention will be described in this context.

Referring first to FIG. 1, the system can be viewed as including three main modular sections: a collator 100, a printer 102, and a stacker 104. Each of these sections operates under the control of a programmed controller (not shown in FIG. 1), such as a conventional business computer that controls the selection (or "picking") of print medium sheets from the various retainers 106 in the collator 100 for processing by the printer 102. After the printing stage, the printer 102 feeds the printed sheets to the stacker 104, which stacks the printed sheets according to a programmed arrangement as dictated by the programmed controller. A first track assembly 112 is connected between the collector 100 and the printer 102. A second track assembly 114 is connected between the printer 102 and the stacker 104.

The alternative system of FIG. 2 is essentially identical to the system of FIG. 1, with the exception that the stacker 104 is replaced by a post collator 108 and an alternative embodiment 109 of the stacker 104. In this alternative embodiment, a conveyer 110 can be attached as yet another modular component for transporting stacks of printed sheets after the stacking stage. As will be described in more detail below, the present invention can be implemented in modular form to permit interconnection of these processing modules. This modularity also enables other types of processing modules to be interconnected into the present system.

The systems shown in FIGS. 1 and 2 address problems recognized with existing systems by providing a number of important advantages related to maintenance reduction and increased flexibility and productivity within the printing process. Examples of these advantages include: automatic detection of erroneously processed sheets; automatic recovery from such an undesired state; and processing the sheets to minimize jamming, which frequently occurs in conventional systems while they process sheets during the printing stage.

Automatic detection and automatic recovery are provided using strategically-placed sensors and sheet diverters. The sensors can detect many different types of errors that occur during printing. For example, the sensors detect multiple and simultaneous picks that result in overlapping sheets being fed from the collator, the failure of the collator to pick a sheet, whether the collator picked the wrong sheet, and whether a sheet becomes jammed within the system. When an error is detected, the diverter allows the system to eject an erroneously processed sheet and continue printing without operator intervention. Minimizing operator invention in this way results in increased quality control and efficiency.

Accordingly, it is important that the sheets are properly controlled as they are being processed and transported through the printing system. If a sheet of print media, such as check stock, is picked at the collator 100 for subsequent customized printing and insertion into a checkbook, the erroneously-picked sheet is automatically rejected without breaking the sequential numbering of the checks. This type of error is one of many undesired situations that the present invention addresses by properly controlling the sheets as they are processed.

Another important aspect of the present invention is that a transport assembly forms a substantially planer path along which the sheets are processed and transported. The transport assembly is formed by the first track assembly 112, printer 102, second track assembly 114, and stacker 112. The substantially planer path begins at an output port of the collator 100. After collation, all processing of the print medium occurs while it is in the substantially planer path. Even the printing stage is implemented without removing the sheet from the substantially planar path.

The substantially planer path eliminates the need to transport the sheets around rollers, drums, or other bends, which can deform the sheet and cause jamming. Consequently, the risk of jamming is reduced and manufacturing efficiency is improved. Additionally, rolling the sheet around rollers or drums can cause it to become permanently bowed. Even if a deformed sheet does not jam the printing system, a bowed sheet can be difficult to handle and finish into a complete check book. Thus, processing the sheet along a substantially planer path improves quality control.

Turning now to the details of FIG. 1, the collator 100 is shown to include a plurality of retainers (or hoppers) 106a–106h for storing groups of documents. Each retainer 106a–106h can hold a different type of print media sheets. A first track assembly 112 is operably connected between the output of the collator 100 and the input of the printer 102, which contains a print engine and mechanisms to position and prepare the sheet for printing. The second track assembly 114 is operably connected between an output of the printer 102 and an input of the stacker 104.

In use, the collator 100 picks a sheet from a retainer 106a–106h and feeds it into a vertical track (not shown in FIG. 1). The vertical track then transports the sheet to the first track assembly 12, which transports it to the printer 102. The collator 100 picks sheets from the retainers in any predetermined sequence or order. The printer will position the sheet along the planer path and then print an image. After printing on the sheet, the printer feeds it to the second track assembly 114, which then transports the sheet to the stacker 104.

The stacker 104 stacks the sheets fed from the second output track 114. The stacker will place the sheet on a dolly (not shown in FIG. 1) that is positioned within the stacker's base 116. After the stack is complete, the operator can remove the dolly and push it to another area of the production facility so that production of the check books can be completed. A stack is complete after it reaches a certain height, has a certain number of sheets, or sensors in the stacker 104 detect a certain character string printed on a sheet that is fed from the printer 102.

A programmed controller enhances the modularity of the present printing system by providing a control system that integrates control of all the modules and track assemblies. A benefit of this programmed controller is that it provides a comprehensive and integrated error detection and recovery system. If the programmed controller detects an erroneously processed document, it will generate an error signal, determine a recovery strategy, and then generate an error-recovery signal. Another benefit is that the programmed controller is flexible and can be adapted to many different combinations of modules.

Referring back to FIG. 1, a touch screen 118 provides an interactive and graphical user interface for the programmed controller that controls the collator 100, printer 102, stacker 104, and first and second track assemblies 112 and 114. A floptical disk drive 120 is located directly below the touch screen. The floptical disk drive 138 is a peripheral storage device that accepts both magnetic and optical storage media, including 3½ inch, 1.44 megabyte magnetic floppy disks and 20 megabyte optical disks.

The collator 100, first and second track assemblies 112 and 114, printer 102, stacker 104, and programmed controller are described in greater detail below.

B. Collator

Continuing with FIG. 1, the collator 100 is a document handling apparatus having a side portion 122 and a rear portion 124 that are adjacent to and substantially perpendicular to one another. The collator 100 also includes a frame 126 and a plurality of retainers 106a–106h. Each retainer 106a–106h is formed by a tray assembly 128a–128h, respectively, that may hold a stack 130a–130h of print media sheets. Examples of print media sheets that can be used in the present printing system include standard paper, self-carbonizing paper, preprinted check stock ready for customization, and other forms and materials ready for customization. Referring to the stack 130a, each stack has a leading edge 132, first side edge 134, second side edge 136, rear edge 138, and bottom (not shown). The stack 130a is oriented so that the leading edge 132 is proximate the side portion 122 of the collator 100 and the first side edge 134 is proximate the rear portion 124 of the collator 100.

Each retainer 106a–106h has an associated pair of adjustable edge guides 140a–140p for helping to control the sheets. For example, the retainer 106a is associated with adjustable edge guides 140a and 140b, which helps to control the second side edge 136 and the rear edge 138 of the stack 130a.

Each retainer 106a–106h also has an associated elevator assembly (not shown in FIG. 1) that is housed in the rear portion 124 of the collator 100. Each elevator assembly is arranged and configured to move an associated tray assembly 106a–106h up and down in order to maintain the top of the stack 130a–130h, respectively, at an appropriate level. The elevator assemblies are described in more detail below and are shown in later figures.

Each retainer 106a–106h also has an associated pick mechanism assembly that is housed in the side portion 122 of the collator 100. A vertical track is also housed in the side portion 122 of the collator 100. Each pick mechanism assembly is arranged and configured to pick the top sheet from the stack 130a–130h and feed it into the vertical track, which then transports it to the first track assembly 112. The pick mechanism assemblies and vertical track are described in more detail below and are shown in later figures.

The collator 100 also includes sensors for detecting errors and a drive system for providing motive power to both the vertical track and the pick mechanism assemblies, as discussed in more detail below.

1. Frame

Figure 3:
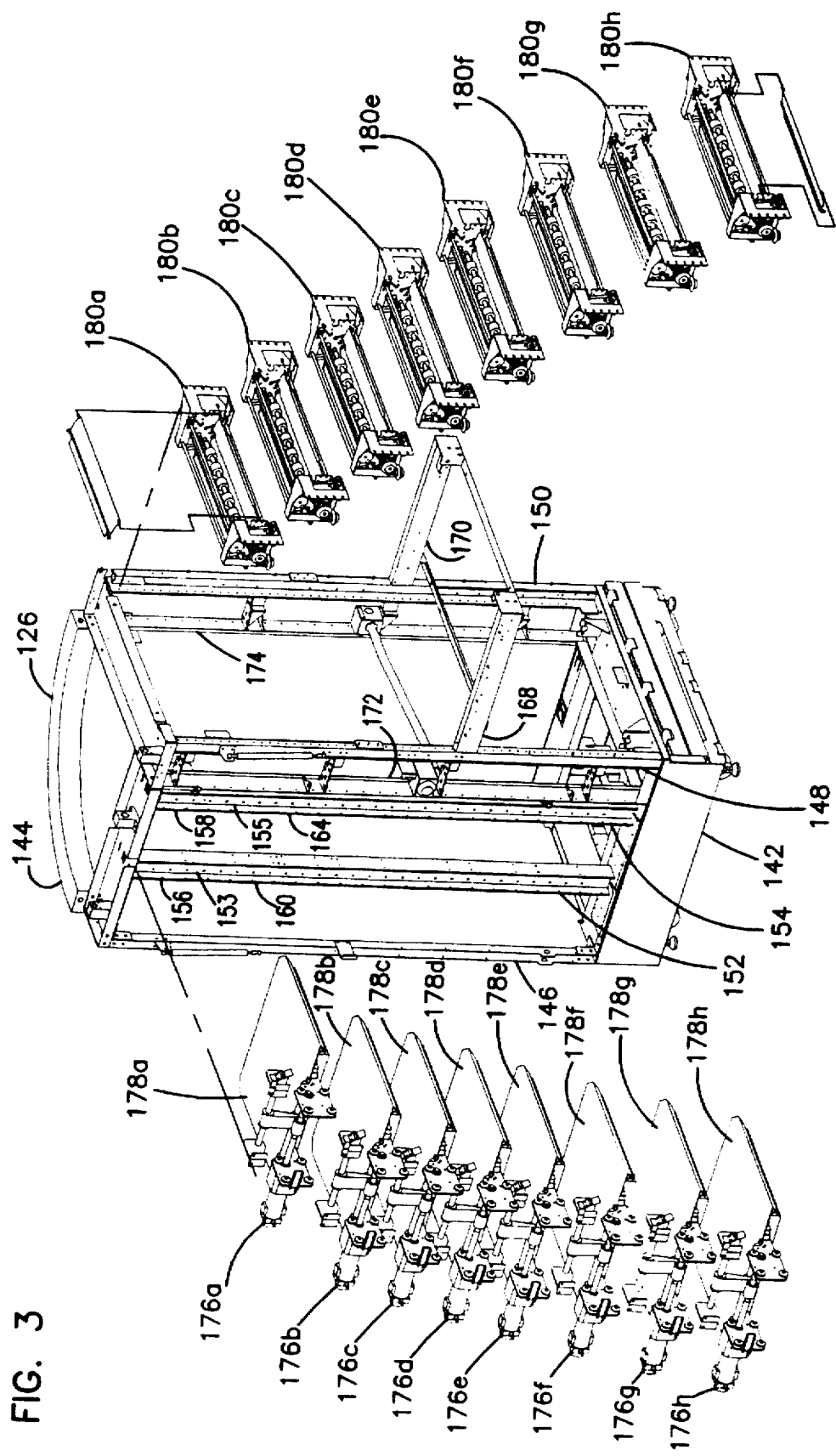
FIG. 3 is an illustration of a frame of the collator module shown in FIG. 1.

Referring now to FIG. 3, the collator 100 includes a frame 126 that provides a support structure. The frame has a base unit 142, a top unit 144, a first vertical support beam 146, a second vertical support beam 148, and a third vertical support beam 150. The first vertical support beam 146, second vertical support beam 148, and third vertical support beam 150 are connected between the base unit 142 and the top unit 144. The first vertical support beam 146 is proximate the rear portion 124 of the collator 100, the second vertical support beam 148 is proximate to a corner formed between the rear and side portions 122 and 124 of the collator 100, and the third vertical support beam 150 is proximate the side portion 122 of the collator 100.

First and second I beams 152 and 154 are positioned between the first and second vertical support beams 146 and 148 and are connected between the base unit 142 and the top unit 144. The first and second I beams 152 and 154 each have a flange 156 and 158, respectively. The flange 156 has first and second edges 160 and 162, each including a V-shaped profile. The flange 158 has first and second edges 164 and 166, also having V-shaped profiles. Flanges 156 and 158 form rails for the elevator assembly described in more detail below. Additionally, first and second I beams 152 and 154 have webs 153 and 155, respectively.

Elevator assemblies 176a–176h are mounted on both flange 160 of the first I beam 152 and flange 162 of the second I beams 154. Tray assemblies 178a–178h are connected to the elevator assemblies 176a–176h, respectively. The elevator assemblies 176a–176h and the tray assemblies 178a–178h are described in more detail below.

Pick mechanism assemblies 180a–180h are mounted on and extend between the second vertical support beam 148 and the third vertical support beam 150. Each pick mechanism 180a–180h cooperates with a corresponding elevator assembly 176a–176h, respectively, and a corresponding tray assembly 178a–178h, respectively. This cooperation is controlled to select the appropriate documents from the appropriate trays in a timely manner for presentation to the transporter. The pick mechanism assemblies 180a–180h are described in more detail below.

First and second horizontal beams 168 and 170 are connected to the second and third vertical support beams 146 and 148, respectively. The first and second horizontal beams 168 and 170 are substantially horizontal and project outward from the side portion 122 of the collator 100. The first and second brackets 172 and 174 are connected between the base unit 142 and the top unit 144. The first bracket 172 is positioned proximate the second vertical support beam 148, and the second bracket 174 is positioned proximate the third vertical support beam 150.

2. Tray and Elevator Assemblies

Figure 4:
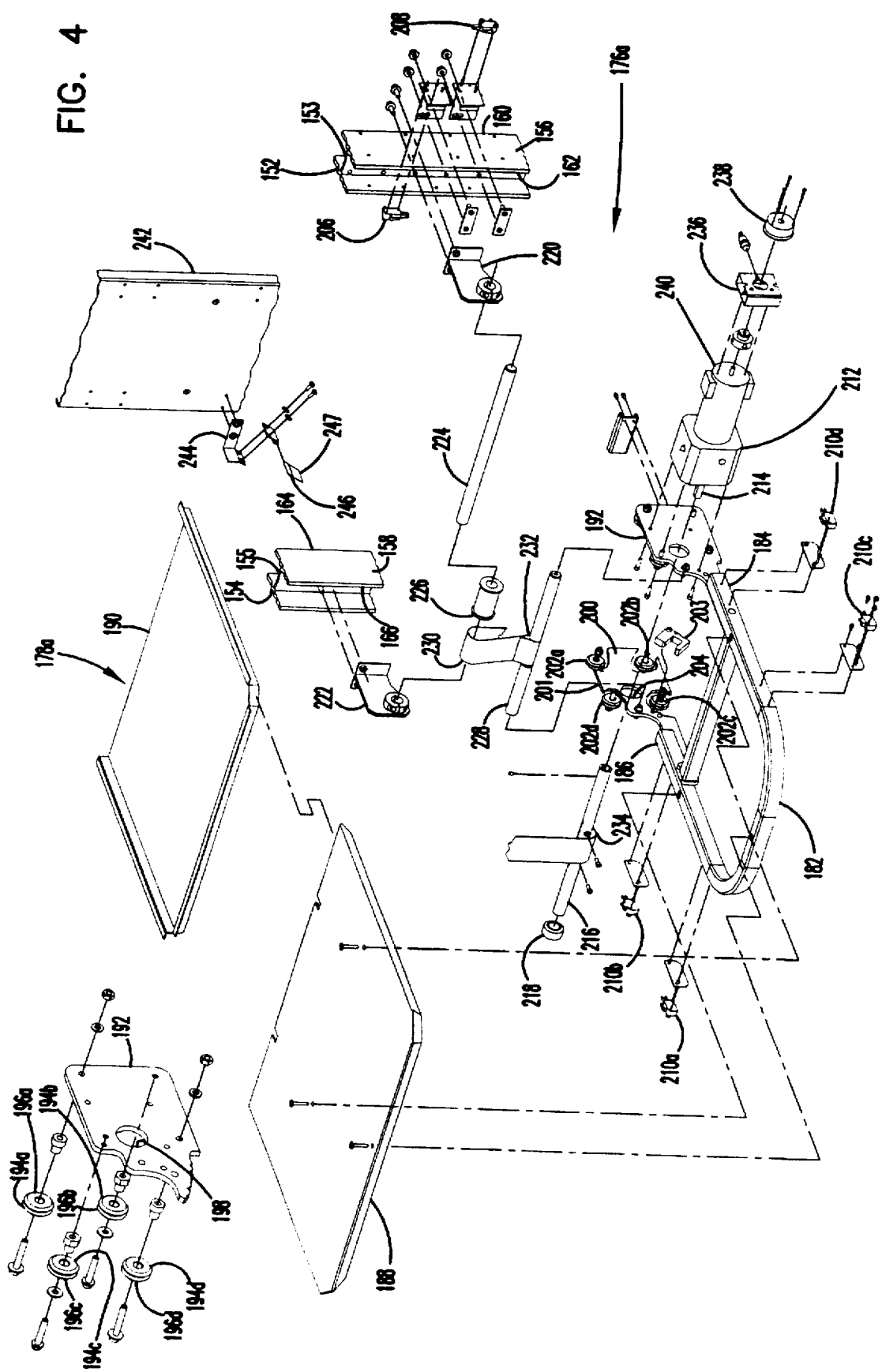
FIG. 4 is an illustration of a tray assembly and an elevator assembly that are components of the collator module shown in FIG. 1.

In FIG. 4, the tray assembly 178a is shown to includes a supporting frame 182, which has first and second posts 184 and 186. A safety interlock plate 188 is positioned on top of, and is connected to, the supporting frame 182. A paper tray 190 slideably engages the safety interlock tray 188. During use, the stack 130a is positioned on the paper tray 190. The operator can remove the paper tray 190 from the safety interlock plate 188 when replenishing the stack 130a.

The elevator assembly 176a includes a first support plate 192 to which a first post 184 of the supporting frame 182 is connected. The support plate 192 is substantially parallel to the flange 156 of the first I beam 152. Wheels 194a–194d are mounted on the support plate 192 and have rims 196a–196d, respectively. The rims 196a and 196b have a V-shaped groove that mate with the first V-shaped edge 160 of the flange 156. The rims 196c and 196d have a V-shaped groove that mate with the second V-shaped edge 162 of the flange 156.

Second support plate 200 is substantially similar to the first support plate 192 and has wheels 202a–202d that mate with the first and second edges 164 and 166 of the flange 158. The second post 186 of the supporting frame 182 is connected to the second support plate 200. One skilled in the art will appreciate that the flange 156 of the first I beam 152 and the flange 158 of the second I beam 154 provide a track along which the elevator assembly 176a raises and lowers the associated tray.

A paper sensor 203 is mounted on second support plate 200 and is positioned at approximately a 45° angle. The paper sensor 203 interfaces with the control system and has a light emitter such as a light emitting diode (LED) and a light-sensitive transducer. The LED will attempt to transmit light from the lower portion of the first side edge 134 of the stack 130a to the bottom (now shown) of the stack 130a.

The paper sensor 203 detects the presence or absence of sheets in the retainer 106a. The control system monitors a signal from the paper sensor 203 and uses this information to determine whether the stack 130a needs to be replenished. An advantage of this system is that the control system can quickly determine when the stack 130a is depleted without having to make several failed attempts to pick a sheet from the retainer 106a. The control system can then instruct the collator 100 to pick a sheet from a different retainer 106b–106h without delay.

Upper and lower limit switches 206 and 208 are mounted on the flange 156 of the first I beam 152. The upper limit switch 206 is mounted at a point above the elevator assembly 176a and the lower limit switch 208 is mounted below the elevator assembly 176a. Both limit switches 206 and 208 are proximate the first edge 160 of flange 156 so that they can be actuated by wheels 194a and 194b, respectively. Upper limit switch 206 is actuated if the elevator assembly 176a is raised too far, and lower limit switch 208 is actuated if the elevator assembly 176a is lowered too far. If either upper or lower limit switch 206 or 208 is actuated, the control system, which is communicatively coupled thereto, commands the elevator assembly 176a to stop moving.

Safety switches 210a–210d are operably connected to supporting frame 182 and positioned beneath safety interlock plate 188. One of the safety switches 210a, 210b, 210c, or 210d is actuated if elevator assemblies 176a and 176b are moved too close together and a foreign object is located between them. The control system will then stop the elevator assemblies 176a and 176b from being moved any closer together.

The drive system that raises and lowers elevator assembly 176a includes a motor 212 having a drive shaft 214 and an armature 240. Motor 212 is mounted on first support plate 192 and drive shaft 214 extends through a hole 198 of the first support plate 192. Drive shaft extension 216 is operably connected to drive shaft 214 and extends into a hole 204 of second support plate 200 and bushing 218.

First and second brackets 220 and 222 are operably connected to the webs 153 and 155, respectively, of first and second I beams 152 and 154, respectively. A first bar 224 is connected between first and second brackets 220 and 224. First and second brackets 220 and 222 and first bar 224 are positioned at a point above upper limit switch 206. Pulley or reel 226 is mounted on first bar 224 and is approximately centered between first and second brackets 220 and 222. A second bar 228 is connected between first and second support plates 192 and 200.

A belt 230 has one end 232 operably connected to second bar 228 and an opposite end 234 operably connected to drive shaft extension 216. Belt 230 extends upward from the second bar 228, wraps around pulley 226, and then extends downward to drive shaft extension 216. The belt 230 may be implemented, for example, using a nylon mesh material.

In use, the motor 212 causes drive shaft extension 216 to rotate and reel in belt 230. As a result, elevator assembly 176a moves upward. The motor 212 is also controlled for reverse direction which causes drive shaft extension 216 to rotate in the opposite direction and let out belt 230. As a result, elevator assembly 176a moves downward.

Elevator motion encoder 236 and brake assembly 238 are operably connected to the armature 240 of motor 212 and interfaces with the control system. The elevator motion encoder 236 is used to sense how many rotations the motor armature has made. The control system uses this information to determine how far the elevator assembly 176a has traveled and its current level.

The brake assembly 238 is used to slow and stop rotation of the armature 240 and, hence, movement of the elevator assembly 176a. The brake assembly 238 is a fail safe electronic disk brake that remains in a locked position. Gearing between the brake assembly 238 and the motor 212 can be implemented, for example, with a 90 to 1 ratio that safely locks the tray assembly 128a in a fixed position if there is a power outage or a trip of a safety interlock. Consequently, the elevator assembly 176a is prevented from reeling out of control and creating damage.

Edge guide plate 242 is connected between the base unit 142 and the top unit 144 of frame 126. Edge guide 242 is positioned so that it is straddled by first and second support plates 192 and 200. The edge guide 242 helps to position the stack 130a in the retainer 106a and prevents the first side edge 134 of the stack 130a from getting caught in the mechanisms of the elevator assembly 176a.

Flange 244 is operably connected to edge guide 242 and extends over tray assembly 178a. Brush 246 is connected to flange 244 and extends downward. A lower edge 247 of brush 246 rests against the top sheet of the stack 130a. In this position, brush 246 helps to control the first side edge 134 and prevents undesired situations such as curling.

Elevator assemblies 176b–176h are substantially identical to elevator assembly 176a, which was described above. For purposes of brevity and clarity, these other elevator assemblies 176b–176h are not described in further detail.

3. Pick Mechanism Assembly

Figure 5:
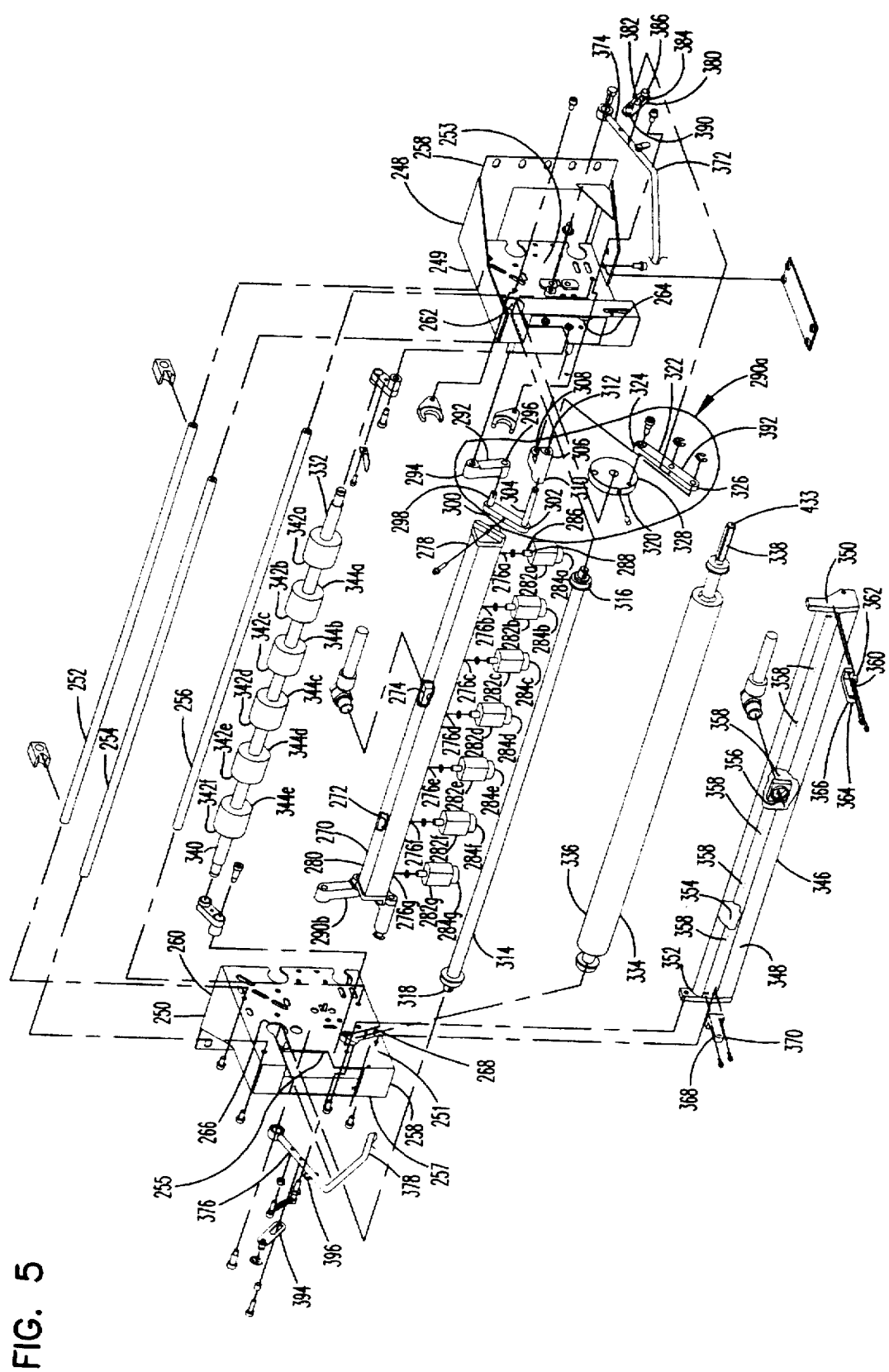
FIGS. 5 and 6 show a pick mechanism assembly that is a component of the collator module shown in FIG. 1.
Figure 6:
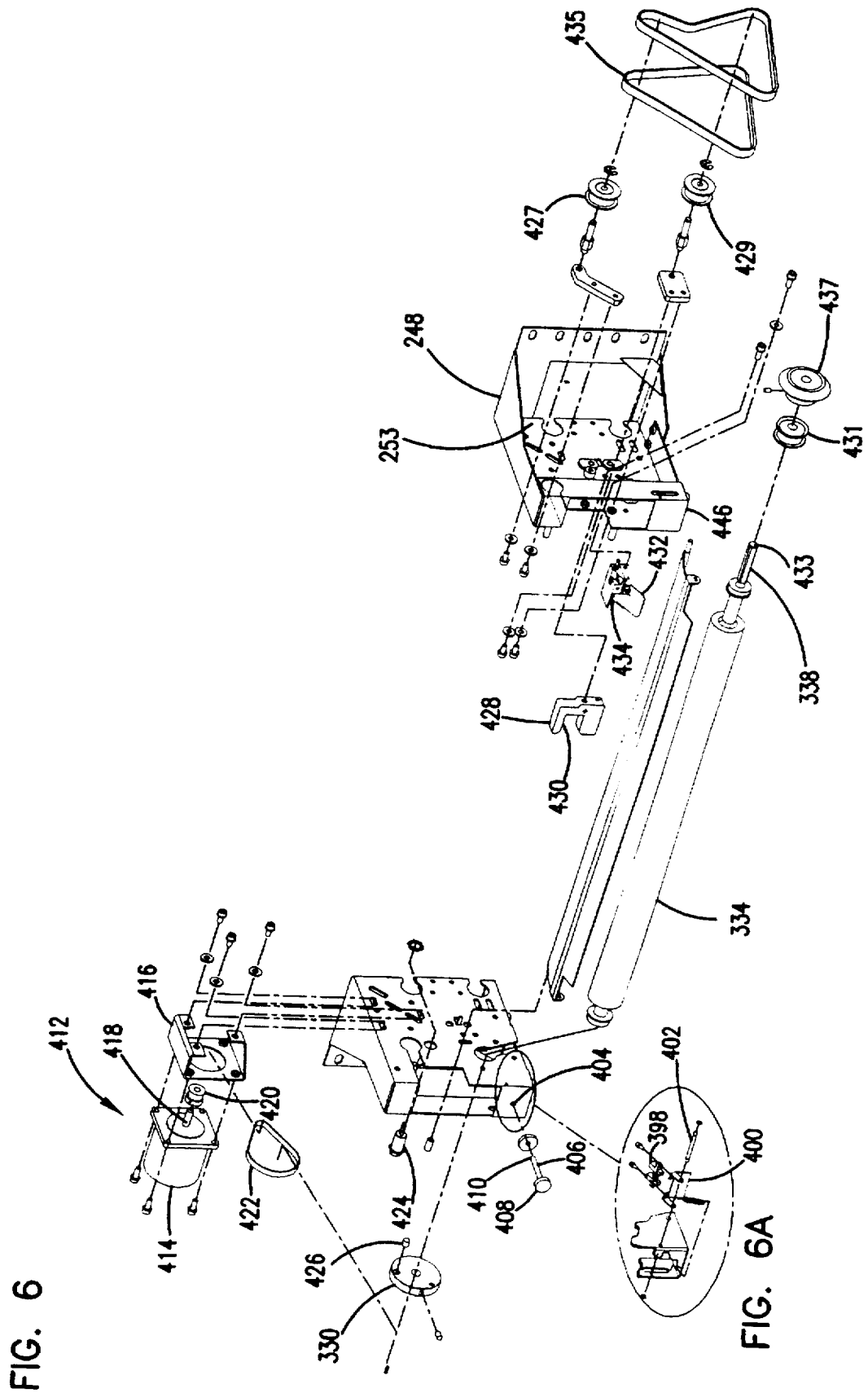

Referring now to FIGS. 5 and 6, pick mechanism assembly 180a includes first and second brackets 248 and 250, which are connected by rods 252, 254, and 256. First bracket 248 has an inside surface 249, an outside surface 253, a hole 262, a slot 264, and a mounting flange 258. Second bracket 250 has an inside surface 251, an outside surface 255, a hole 266, and a slot 268. Mounting flanges 258 and 260 are used to mount pick mechanism assembly 180a to second and third vertical beams 148 and 150, respectively, of frame 126. Second bracket 250 also has an edge 257 that is proximate tray assembly 178a and a flange 259 that projects outward from outside surface 255.

Manifold 270 is positioned between first and second brackets 248 and 250 and defines a passageway 272, a main port 270, and a plurality of periodically placed apertures 276a–276g. Manifold 270 has first and second ends 278 and 280. Suction foot 282a extends down from manifold 270 and has a lower end 284, an upper end 286, and a vertical passageway 288 that is open at both upper end 286 and lower end 284. The upper end 286 of the vertical passageway 288 is in fluid communication with aperture 276a.

Suction feet 282b–282g are substantially identical to suction foot 282a and have lower ends 284b–284g, respectively. Suction feet 282b–282g are also in fluid communication with apertures 276b–276g. A vacuum is formed at the lower ends 284a–284g of the suction feet 282a–282g, respectively, by withdrawing air from passageway 272 of manifold 270. The vacuum creates a force that attracts the top sheet from the stack 130a.

Air is withdrawn from passageway 272 via a vacuum distribution manifold that provides fluid communication between main port 272 and an air compressor. A valve and solenoid combination controls the flow of air from main port 272 to the vacuum distribution manifold. The vacuum distribution manifold, valve, and solenoid are conventional and, therefore, are not shown in the figures. Manifold 270 and suction feet 282a–282g form the primary mechanism for picking sheets from the stack 130a and feeding the picked sheets into the path of the present printing system. This action is described in more detail below.

Manifold 270 is operably connected to first and second brackets 248 and 250 by recirculating mechanisms 290a and 290b that cycles manifold 270 from a home position, to a position that is proximate the stack, and back to the home position. This cycle is called a picking cycle.

Recirculating mechanism 290a includes a first linkage 292 that has an upper end 294 rotatably connected to an inside surface 249 of first bracket 248 and a lower end 296 rotatably connected to an upper end 298 of a second linkage 300. A lower end 302 of second linkage 300 has a post 304 that projects through slot 264 of first bracket 248. First end 278 of manifold 270 is operably connected to second linkage 300 at a point between upper and lower ends 298 and 302. A third linkage 306 has a first end 308 rotatably connected to the inside surface 249 of first bracket 248 and a second end 310 that has a tube 312. Post 304 rotatably engages tube 312, which projects through slot 248.

A drive shaft 314, having first and second ends 316 and 318, extends between first and second brackets 248 and 250 such that the first end 316 projects through hole 262 of first bracket 248 and the second end 318 projects through a hole 266 of second bracket 250. First crank wheel 320 is positioned proximate the outside surface 253 of the first bracket 248 and is mounted on first end 316 of drive shaft 314. Fourth linkage 322 is positioned proximate an outside surface 253 of first bracket 248 and has first and second ends 324 and 326. First end 324 is rotatably connected to first crank wheel 320 at a point proximate the crank wheel's 320 circumferential edge 328. Second end 326 is rotatably connected to post 304.

Recirculating mechanism 240b is substantially similar to recirculating mechanism 290a and is operably connected between second end 280 of manifold 270 and second bracket 250. Recirculating mechanism 290b includes a second crank wheel 330, which is operably connected to second end 318 of drive shaft 314 and is positioned proximate an outside surface 255 of second bracket 250.

Upper and lower infeed rollers 332 and 334 form a roller assembly and extend between and are rotatably connected to first and second brackets 248 and 250. Additionally, upper and lower infeed rollers 332 and 334 are positioned so that they are proximate the leading edge 132 of the stack 130a. Lower roller bar 334 has a tubular pad 336 and a shaft 338 that extends through tubular pad 336. Upper roller bar 332 has a shaft 340 and a plurality of tubular pads 342a–342f that are spaced periodically along shaft 340. Tubular pads 342a–342f form gaps 344a–344e.

In the home position, manifold 270 and suction feet 282a–282g are positioned proximate shaft 338 of upper infeed roller 332 such that suction feet 282b–282f are positioned in gaps 344a–344b, suction foot 282a is positioned to the right of tubular pad 342a, and suction foot 282g is positioned to the left of tubular pad 342f.

During the picking cycle, the pick mechanism assembly 180a picks the top sheet from the stack 130a and feeds it between the upper roller 332 and the lower roller 334. When feeding a sheet, the manifold 270 and suction feet 282a–282g are in their home position. Picking a sheet is discussed in more detail below.

An air knife manifold 346 has a surface 348, one end 350 operably connected to first bracket 248, and an opposite end 235 operably connected to second bracket 250. Air knife manifold 346 is positioned below lower roller bar 334 and thus is also positioned proximate the leading edge 132 of the stack 130a.

Manifold 346 defines a passageway 354, main port 356, and a plurality of apertures 358 that extend from the passageway 354 to the surface 348. Manifold 346 forms an air knife. First tubular member or air knife post 360 is mounted proximate one end 350 of air knife manifold 346. First air knife post 360 defines a passageway 362 that is in fluid communication with passageway 354 of air knife manifold 346. First air knife post 360 also defines a side aperture 364 that extends from the passageway 362 to a surface 366. Second tubular member or air knife post 368 is substantially identical to first air knife post 360 and has a side aperture 370 that is in fluid communication with passageway 354 of air knife manifold 346.

The passage 354 of manifold 346 is pressurized by blowing air into the main port 356. In turn, the air exits the plurality of apertures 358 in the air knife manifold 346 and the side apertures 364 and 370 of the first and second air knife posts 360 and 368, respectively. The air exiting the plurality of apertures 358 blows against the leading edge 132 of the top sheets in the stack 130a. The air that exits the side apertures 364 and 370 blows on the first and second side edges 134 and 136, respectively, of the top sheets in the stack 130a. The air from the side apertures 364 and 370 blows on that portion of the first and second side edges 134 and 136, respectively, that is proximate to the leading edge 132.

Air is supplied to the main port 356 via an air distribution manifold that provides fluid communication between main port 356 and an air supply, which may be a compressor. A valve and solenoid combination controls the flow of air from the air distribution manifold to the main port 356. The solenoid is linked to the control system. The air distribution manifold, valve, and solenoid are conventional and thus are not shown in detail in the figures.

The air flow from the manifold 346 against the leading edge of the stack and from the first and second air knife posts 360 and 368 against the first and second side edges of the stack, respectively. The air fluffs or levitates at least the top sheet of the stack 130a. This levitation aids separation of the top sheet from the stack 130a during the picking cycle, which is discussed in more detail below.

Stack-height sensing bar 372 is a probe that has first and second end portions 374 and 376 and cross-member portion 378. First and second end portions 374 and 376 are rotatably connected to the outer surfaces 253 and 255, respectively, of first and second brackets 248 and 250, respectively. Cross member portion 378 extends between first and second end portions 374 and 376, so that the cross member portion 378 reaches across the width of the pick mechanism assembly 180a. Additionally, stack-height sensing bar 372 projects outward so that it can rest on a portion of the stack 130a that is not being levitated by the air knife manifold 346 and the first and second air knife posts 360 and 368.

First rocking linkage 380 defines a slot 382 at a first end 384 and is operatively connected to first end portion 374 by a pin 386 that passes through slot 382. A second end 390 of first rocking linkage 380 is rotatably connected to a mid portion 392 of fourth linkage 322 of recirculating mechanism 290a. Second rocking linkage 394 is similarly connected between second end portion 376 and recirculating mechanism 290b.

Referring now to FIGS. 5 and 6, a flag 396 is operably connected to second end portion 376 of stack height sensing bar 372. The flag 396 projects downward. An interrupt-type beam sensor 398 is mounted on a mounting member 400 that is pivotally connected to outside surface 255 of second bracket 250 by pin 402. Interrupt-type beam sensor 398 is positioned below the flag 396 and is communicatively connected to the control system.

Interrupt-type beam sensor 398 projects a beam of light to a light-sensitive detector and has normally closed circuit to the control system. As the stack 130a is depleted, the level of the stack height sensing bar 372 falls. When the stack height sensing bar 372 falls below a threshold level, the flag 396 drops into the path of the light beam and breaks the circuit to the control system. A break in the circuit to the control system indicates that the top level of the stack has fallen below a predetermined threshold level and that the tray assembly 178a needs to be raised.

Movement of the flag 396 is provided via a pivot mechanism involving a second bracket 250 having a flange 259. A threaded rod 406 has a head 408 and a tip 410. Threaded rod 406 extends through and engages threaded hole 404. Tip 410 engages mounting member 400. Twisting threaded rod 406 causes it to move in or out of the threaded hole 404. In turn, mounting member 400 pivots around pin 402. This pivoting action will adjust the relevant position between the interrupt-type sensor 398 and the flag 396.

A stepper motor drive system 412 provides motive power to the recirculating mechanisms 290a and 290b, which move the manifold 270 and suction feet 282a–282g through a picking cycle. Stepper motor 414 is mounted on motor bracket 416, which is connected to second bracket 250. Stepper motor 414 has a drive shaft 418 on which a drive wheel 420 is mounted. A belt 422 extends around drive wheel 420 and second crank wheel 330 of recirculating mechanism 290b.

As the stepper motor turns, belt 422 causes second crank wheel 330, drive shaft 314, and first crank wheel 320 to rotate. The rotating first and second crank wheels 320 and 330 cause recirculating mechanism 290a and 290b, respectively, to move the manifold 270 and suction feet 282a–282g through the picking cycle. During the picking cycle, the manifold 270 and the suction feet 282a–282g move from the home position, out over the stack 130a. The manifold 270 and the suction feet 282a–282g also move down until the lower ends 284a–284g of the suction feet 282a–282g are proximate the leading edge 132 of the top sheet in the stack 130a. The vacuum at the lower ends 284a–284g of suction feet 282a–282g, respectively, creates a force that attracts the leading edge 132 of the top sheet. As the picking cycle is completed, the manifold 270 and the suction feet 282a–282g return to the home position.

The attractive force caused by the vacuum and the movement of the manifold 270 and suction feet 282a–282g causes the top sheet to be separated from the stack 130a and move with the manifold 270 and suction feet 282a–282g as they complete the picking cycle. When the manifold 270 and the suction feet 282a–282g are returned to the home position, the leading edge of the sheet is inserted between the upper and lower infeed rollers 332 and 334, which are rotating. The upper and lower infeed rollers 332 and 334 then feed the sheet to the vertical track, which transports it to the first track assembly 112.

Determining when a picking cycle is completed involves the use of a hall-effect sensor 424 that is operably connected to second bracket 230, and a corresponding magnet 426 that is operably connected to second crank wheel 330. The hall-effect sensor 424 and the magnet 426 are proximate to one another when the second crank wheel 330 has positioned the manifold 270 and the suction feet 282a–282g in the home position. When the magnet 426 and the hall-effect sensor 424 are proximate one another, the hall-effect sensor 424 will send a signal to the control system. The control system uses this signal to identify when the manifold 270 and the suction feet 282a–282g are in the home position and to determine when a picking cycle is complete.

The system attempts to complete a picking cycle and feed a sheet of the print medium into the upper and lower infeed rollers 332 and 334 within a prescribed time frame. If the picking cycle is not completed with the prescribed period of time, the control system will generate an error and determine a recovery strategy.

Referring to FIG. 6, an upper sprocket 427 is connected to first bracket 248 and is positioned proximate to the outside surface 253. A lower sprocket 429 is also rotatably connected to first bracket 248 and is positioned proximate the outside surface 253 and below the upper sprocket 427. A drive sprocket 431 is mounted on an end 433 of shaft 338 of lower infeed roller 334 and is positioned proximate the outside surface 253 of first bracket 248. A drive belt 435 extends around drive sprocket 431, upper sprocket 427, and a lower sprocket 429. When lower infeed roller 334 rotates, the belt 435 causes the upper drive sprocket 427 and the lower drive sprocket 429 to rotate at the same rate as the lower infeed roller 334.

A cone gear 437 is also mounted on the end 433 of shaft 338 of lower infeed roller 334. Drive sprocket 431 is positioned between the cone gear 437 and the outside surface 253 of the first bracket 248. A drive assembly, which is described in more detail below, transmits motive power through the cone gear 437 and to the lower infeed roller 334, the drive sprocket 431, the upper sprocket 427, and the lower sprocket 429.

A paper sensor 428 is mounted on first bracket 248, defines a gap 430, and is positioned behind upper and lower infeed rollers 332 and 334 so that a picked sheet of print medium must pass through the gap 430 before it enters the vertical track. Paper sensor 428 signals the control system if it senses the presence of a sheet of print medium. If paper sensor 428 does not sense the presence of a sheet within the prescribed time frame identified above, the control system generates an error and determines a recovery strategy.

The manifold 270 and suction feet 282a–282g attempt, up to three times, to pick the top sheet and feed it into the upper and lower infeed roller 332 and 334. No error results if the top sheet is properly fed into the upper an lower infeed rollers 332 and 334 within three attempts. If the top sheet is not properly fed within three attempts, the control system generates a misfeed error and determines a recovery strategy.

Additional error detection is provided by a multi-item detector 432 that is also operably connected to first bracket 248. Multi-item detector 432 defines a gap 434, and is positioned behind upper and lower infeed rollers so that a picked sheet must also pass through the gap 434 before it enters the vertical track. Multi-item detector 432 determines whether a single sheet or multiple, overlapping sheets have been picked from the stack 130a and fed into the upper and lower infeed rollers 332 and 334. If multi-item detector 432 senses multiple, overlapping sheets, it sends a signal to the control system, which then generates an error and determines a recovery strategy. The multi-item detector 432 is discussed in more detail below.

The stepper motor 414 operates according to a predetermined acceleration and velocity profile that is controlled by an algorithm programmed in the control system. The predetermined acceleration and velocity profile is established in order to facilitate proper separation and picking of sheets from the stack 130a. Each type of print medium may require a different acceleration and velocity profile in order to optimize the separation and picking of separate sheets.

Additionally, it may be helpful to have different types of print media sheets within a single stack. An example of such an application might be printing check books that have self duplicating carbonless stubs. In this application, the stack 130a may have alternate sheets of check stock and sheets of lightweight self-contained carbonless paper. In order to accommodate different types of sheets within a single stack, the control system switches between different acceleration and velocity ramps.

Pick mechanism assemblies 180b–180h are substantially identical to pick mechanism assembly 180a. These are essentially the same, except for pick mechanism assembly 180e, which has a tandem driver sprocket 439. Tandem driver sprocket 439 is also rotatably connected to first bracket 248 and is in axial alignment with lower driver sprocket 429.

4. Cooperation Between Elevator Assembly and Pick Mechanism Assembly

Elevator assembly 176a and stack height sensing bar 372 of pick mechanism assembly 180a cooperate in order to maintain the top sheet of the stack 130a above a predetermined threshold level so that the top sheet can be picked and fed into the upper and lower infeed rollers 332 and 334. As discussed above, stack height sensing bar 372 is connected to first and second crank wheels 320 and 330 by first and second rocking linkages 380 and 394, respectively. First and second crank wheels 320 and 330 repeatedly move stack height sensing bar 372 up and down in sync with movement of the manifold 270 and the suction feet 282a–282g.

If the stack 130a blocks the fall of the stack height sensing bar 372, the flag 396 does not fall low enough to trigger the interrupt-type beam sensor 398. In this scenario, the top level of the stack 130a is still above the predetermined threshold level.

However, each sheet picked during the picking cycle lowers the top level of the stack 130a. Accordingly, the stack height sensing bar 372 falls a bit farther during each consecutive picking cycle. Eventually, the stack 130a is depleted enough that stack height sensing bar 372 falls below the threshold level and flag 396 triggers interrupt-type sensor 398, which then sends a signal to the control system.

The control system commands the motor 212 to raise the level of elevator assembly 176a until the top of the stack 130a returns to a level above the predetermined threshold level. The control system determines that the top of the stack 130a has returned to an appropriate level when the flag 396 moves out of the beam in the interrupt-type beam sensor 398. The control system then stops raising the elevator assembly 176a.

Adjusting the relative position between the interrupt-type sensor 398 and the flag 396 changes the threshold level at which the stack height sensing bar 372 will cause the flag 396 to trigger the interrupt-type sensor 398. In turn, this adjustment changes the predetermined level of the top sheet of the stack 130a. The predetermined level is adjusted when the top sheet of the stack is laying flat, not when it is being levitated.

Adjusting the top level of the stack 130a allows the operator to accommodate different paper and humidity conditions that might cause up curl or down curl of the paper edges, tightly nested perforations, and different stock weights. Lightweight stocks tend to levitate under influence of the air knife manifold 346 and first and second air knife posts 360 and 368 more than heavier stocks. Thus, an operator may want to set the top level of a stack of lightweight paper lower than the level of a stack that includes heavier paper.

Elevator assemblies 176b–176h cooperate with their corresponding pick mechanism assemblies 180b–180h, respectively, in substantially the same manner elevator assembly 176a and pick mechanism assembly 180a cooperate.

5. Front Edge Guide

Figure 7:
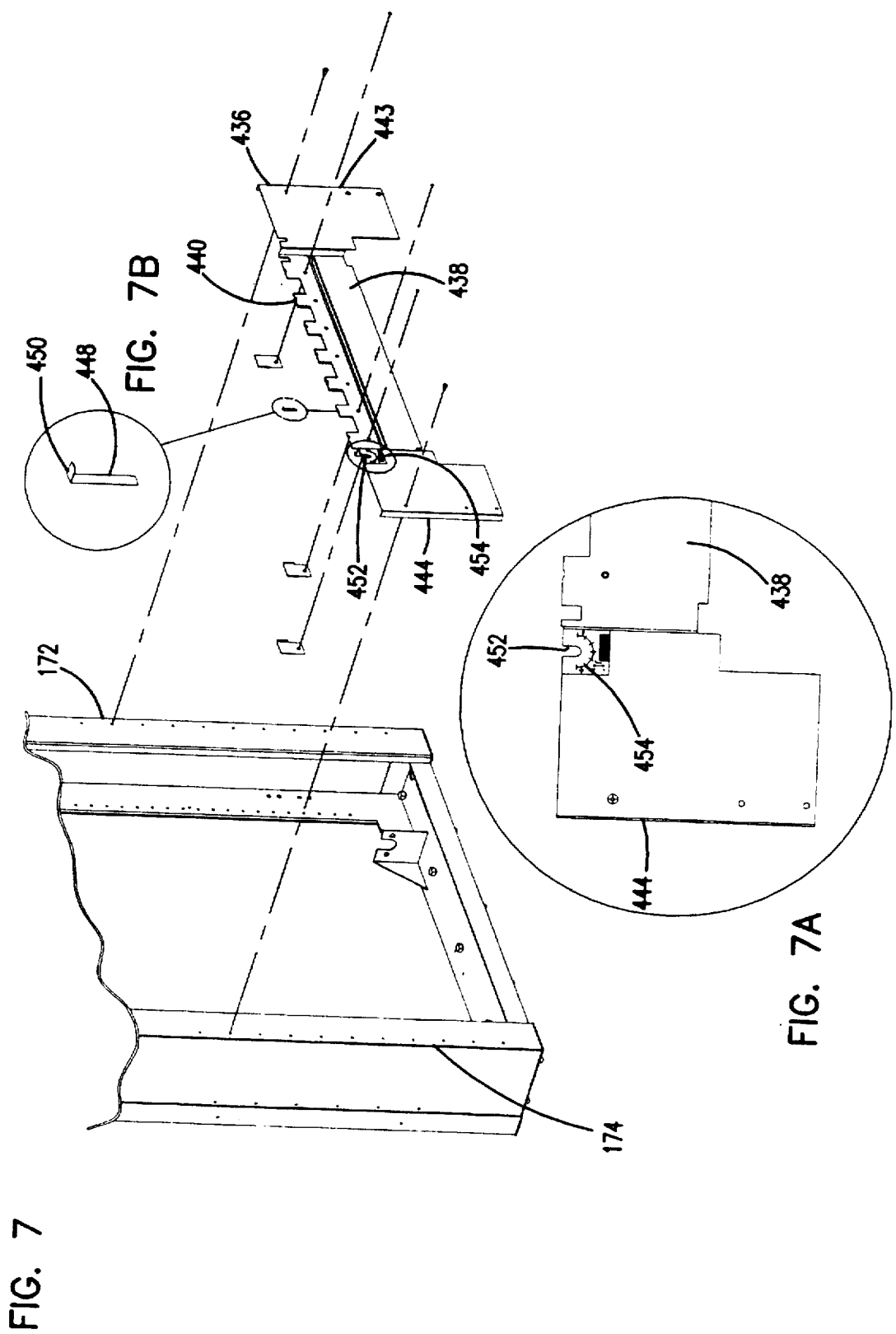
FIG. 7 is an illustration of a front edge guard and separator fingers that are components of the collator module shown in FIG. 1.

Referring to FIG. 7, front edge guide 436 is a plate having a face 408, top edge 440, a first end 443 connected to first bracket 172 of frame 126, and a second end 444 connected to second bracket 174 of frame 126. Front edge guide 436 is positioned so that face 438 is proximate the leading edge 132 of the stack 130a and top edge 444 is proximate a lower portion 446 of the pick mechanism assembly 180a.

A plurality of separator fingers 448 are connected to the plate at periodic intervals and project upward. As a result, separator fingers 448 are proximate the leading edge 132 of the stack 130a. Additionally, separator fingers 448 have a top portion 450 that is folded over. Top portions 450 are substantially horizontal and extend over the leading edge 132 of the stack 130a. The top portions 450 of the separator fingers 448 provide a fixed upper limit of sheet travel within the retainer 106a that prevents the top sheets of the stack 130a from levitating too high when air is injected into the stack 130a.

Additionally, front edge guide 436 has a slot 452 proximate the second end 444. When front edge guide 436 is mounted on first and second brackets 172 and 174, the threaded rod 406 and head 408 project through the slot 452. As discussed above, the threaded rod 406 is for adjusting the top level of the stack 130a stored in the retainers 130a.

Indices 454 are marked on the front edge guide 136 proximate the slot 452. Head 408 has a corresponding mark. The relative level of the top of the stack 130a can be determined by examining the position of the mark on head 408 relative to the indices 454 marked on front edge guide 436.

Each pick mechanism assembly 180b–180h has an associated front edge guide (not shown) that is substantially similar to front edge guide 436.

6. Multi-Item Detector

Figure 8:
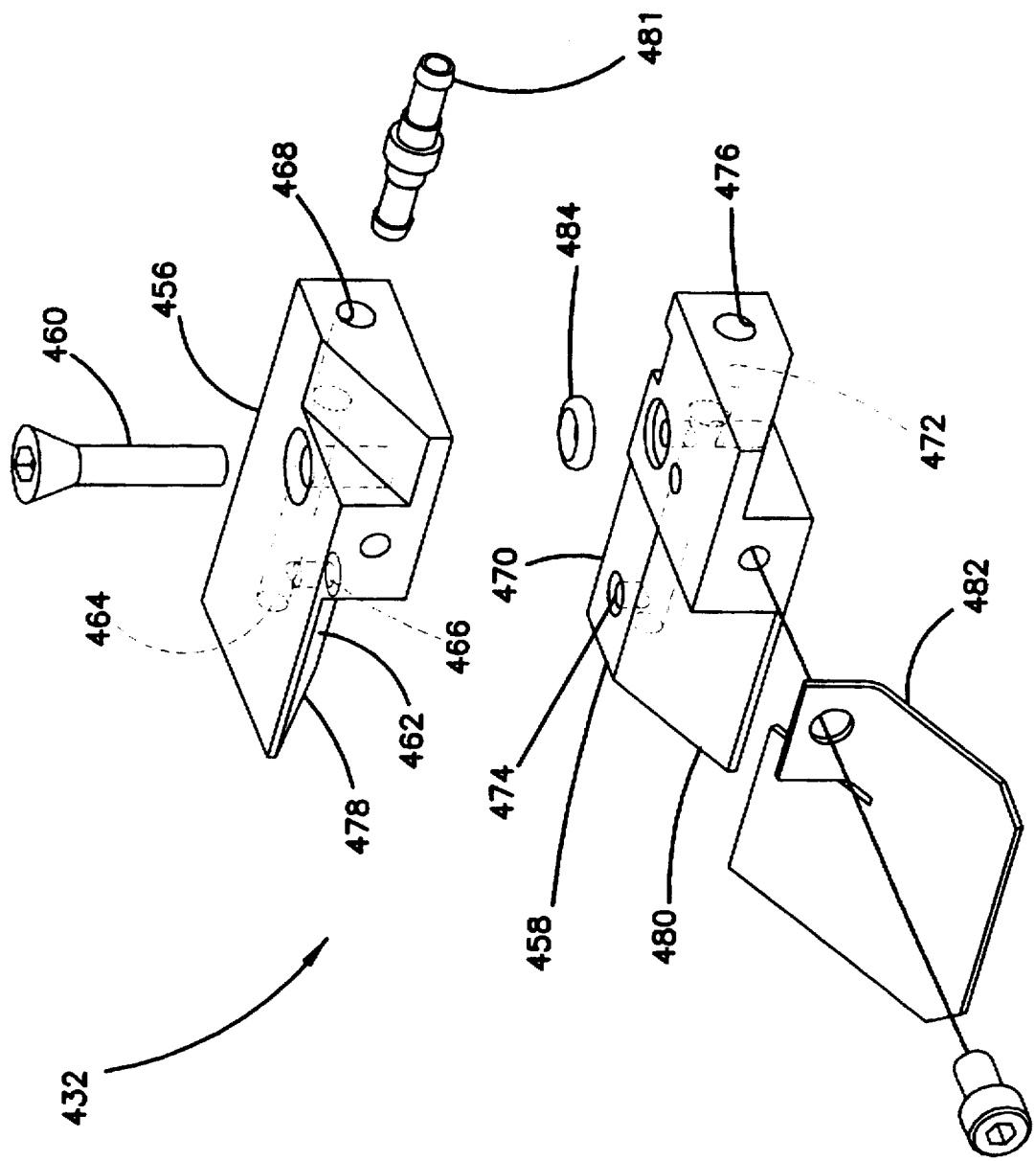
FIG. 8 is an illustration of a multi-item detector that is a component of the pick mechanism assembly shown in FIGS. 5 and 6.

Referring now to FIG. 8, multi-item detector 432 has an upper member 456 and a lower member 458 that are connected by countersunk screw 460. Upper member 458 defines a lower or first surface 462, a first passageway 464, an upper or first aperture 466 that extends from the lower surface 462 to the first passageway 464, and a first port 468 that is open to the first passageway 464. Lower member 456 defines an upper or second surface 470, a second passageway 472, a lower or second aperture 474 that extends from the upper surface 470 to the second passageway 472, and a second port 476 that is open to the second passageway 472.

Upper and lower surfaces 470 and 462 define gap 432, through which the sheet passes as it is fed from the upper and lower infeed rollers 332 and 534 to the vertical track. First and second apertures 466 and 474 are on oppositely disposed sides of the gap 432 and face one another.

Additionally, first and second ports 468 and 476 are in fluid communication with a vacuum assembly. The vacuum assembly includes a pressure-differential switch 477 that is in fluid communication with the vacuum-distribution manifold, described above, via second hose 481. A valve and solenoid combination (not shown) controls the flow of air between the pressure differential switch and the vacuum distribution manifold. The valve, solenoid, and vacuum distribution manifold are conventional.

Additionally, both upper member and lower members 456 and 458 have first and second leading faces 478 and 480, respectively. Leading faces 478 and 480 are beveled and cooperate in order to guide a moving sheet into the gap 432. Plate 482 is connected to the first leading face 480 of the lower member 458 in order to assist guidance of a sheet having a curled edge.

Upper and lower members 456 and 458 can be connected by a countersunk screw 460 that passes through first and second passageways 464 and 472. An O-ring 484 circumscribes countersunk screw 460 and provides a seal between the countersunk screw 460 and the upper member 456 and also between the countersunk screw 460 and the lower member 458. O-ring 484 prevents air from passing around countersunk screw 460 and into the first and second passageways 464 and 472.

In operation, the vacuum manifold withdraws air from first and second passageways 464 and 472 via the second hose 481, pressure differential switch 477, and first hose 479. Withdrawing air from first and second passageways 464 and 472 causes a vacuum adjacent to first and second apertures 466 and 474, respectively. If a single sheet is transported through gap 432, it will be drawn toward either the first or the second apertures 466 or 474 and block only that aperture. The vacuum differential switch 477 is not actuated in this scenario. If two sheets overlap and enter the gap 432 together, the vacuums cause the sheets to separate and block both the first and the second apertures 466 and 474. Blocking both first and second apertures 466 and 474 causes the pressure differential switch 477 to be actuated. The actuated pressure differential switch 477 sends a signal to the control system, which then generates an error and determines a recovery scheme.

7. Paper Sensor

Figure 9:
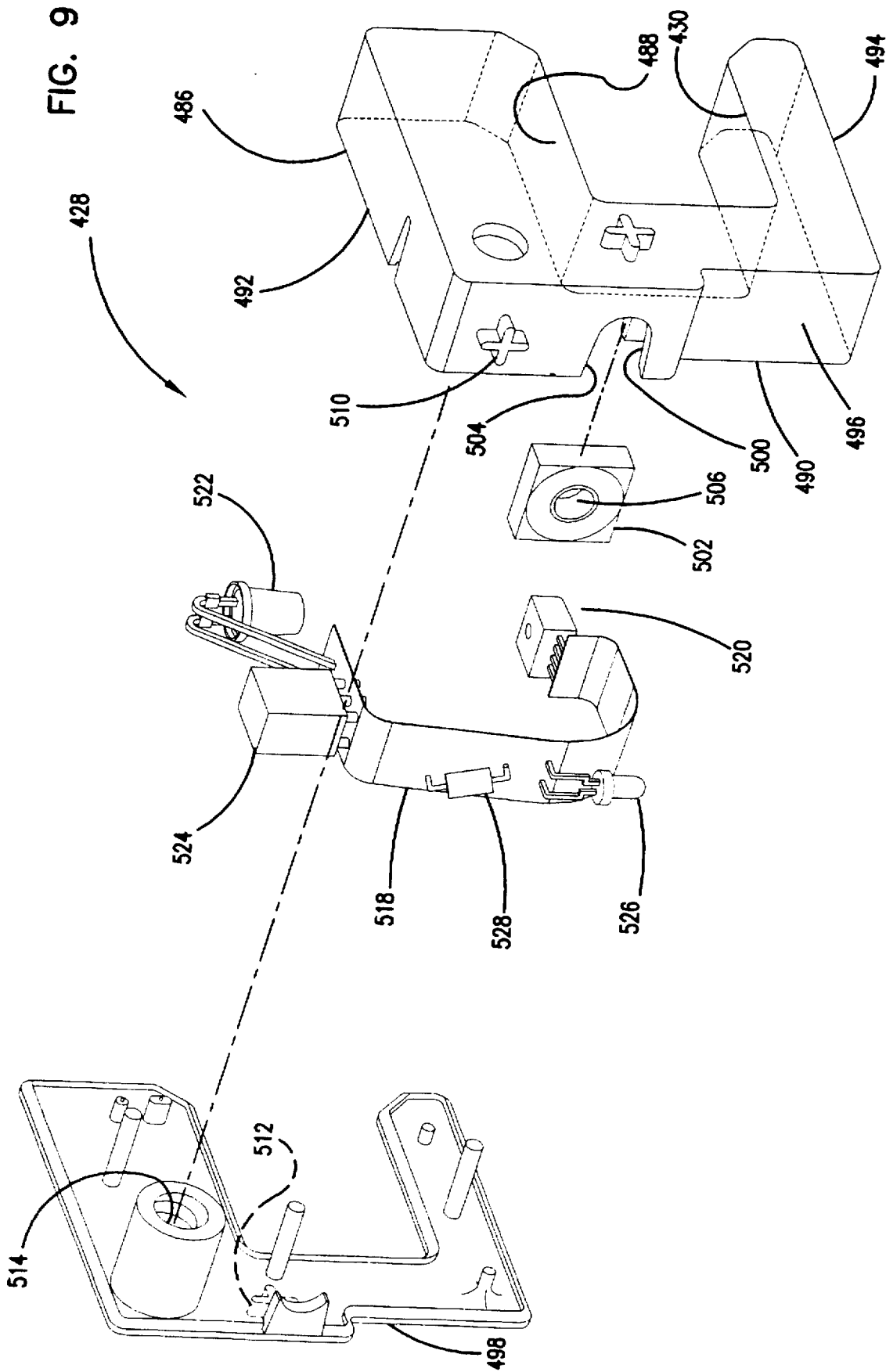
FIGS. 9 and 10 show a paper sensor that is a component of the pick mechanism assembly shown in FIGS. 5 and 6.
Figure 10:
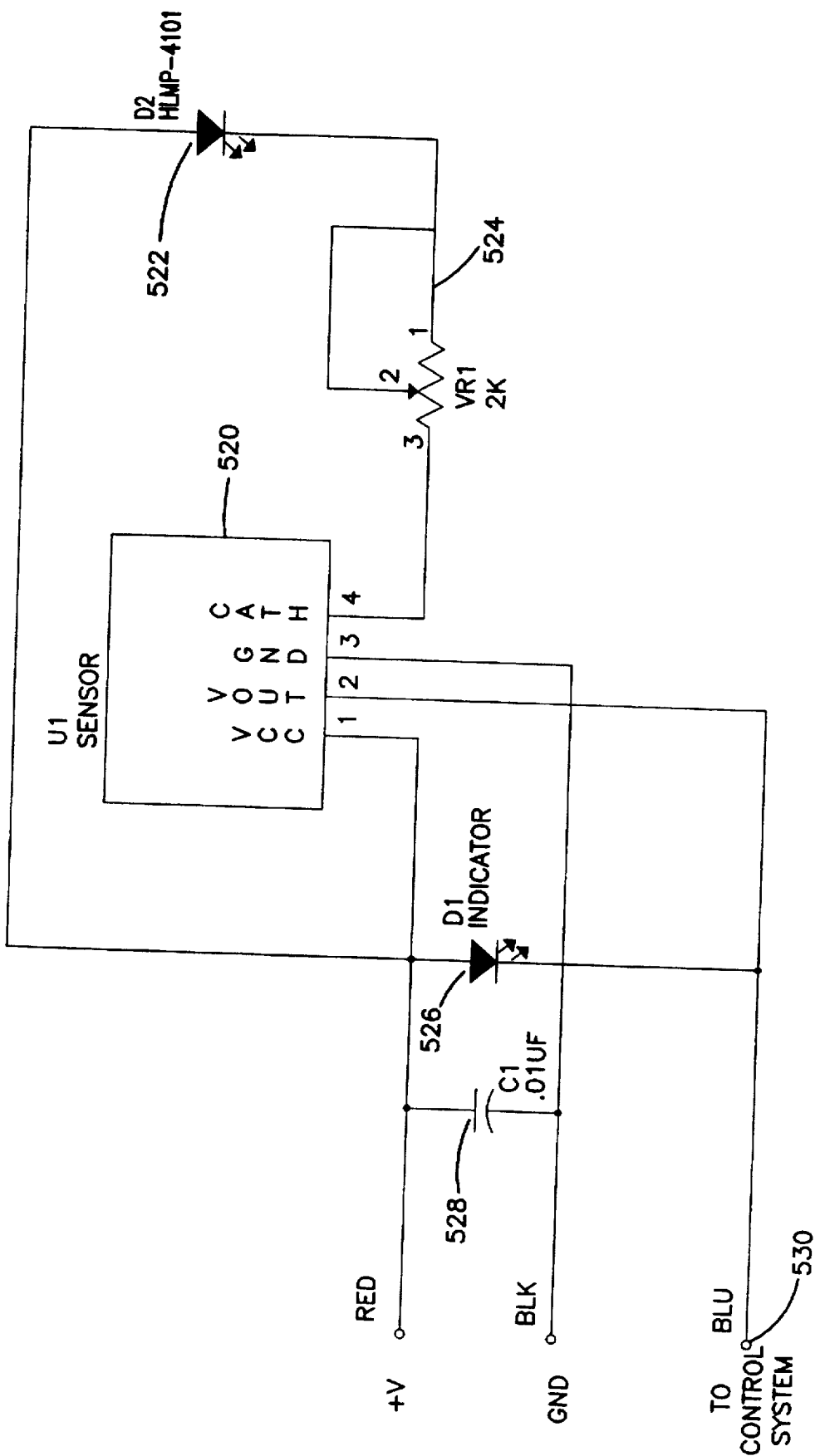

Referring to FIGS. 9 and 10, the paper sensor 428 includes housing 486 that defines a cavity 488 and is molded from clear LEXSAN brand material. Housing 486 has a rear portion 490, an upper portion, and a lower portion 492. Rear portion 490 has a face 496. Upper and lower portions 492 and 494 define the gap 430 through which sheets can pass. A cover 498 is operably connected to housing 486 and seals the cavity 488. Cover 498 can be sonically welded to housing 486.

Housing 486 also defines a recess 500 that receives a square nut 502 and a slot 504 that exposes the threaded hole 506 of square nut 508. Cover 498 secures square nut 502 in the recess 500. Alternatively, the paper sensor 428 is mounted by mating square nut 502 with an appropriately sized threaded post or bolt. For example, bracket 248 of pick mechanism assembly 180a might have a projecting threaded post for mounting paper sensor 428. Cover 498 and housing 486 also define a bolt passage 514 through which a mounting bolt can pass.

Additionally, housing 486 has a first protrusion 510 that projects from face 496 of rear portion 490. A second protrusion 512 may project from cover 498. Either first or second protrusion 510 or 512 can mate with a slot defined in the structure on which paper sensor 428 is mounted. Mating either first or second protrusions 510 or 512 will prevent the paper sensor 428 from rotating and moving out of alignment with the path.

Referring to FIGS. 9 and 10, a light-sensitive sensor 520, an emitter LED 522, a potentiometer 524, an indicator LED 526, and a capacitor 528 are mounted on a flexible circuit board 518 that is positioned in cavity 488 of housing 486. Emitter LED 522 is positioned in the upper portion 494 of the housing 486 and the light-sensitive sensor 520 is positioned in the lower portion 494 of the housing 486.

The light-sensitive sensor 520 is an intelligent signal processing sensor to which the emitter LED 522 is slaved. The light-sensitive sensor 520 provides a pulsed power signal to the slaved emitter LED 522, which emits a signature in the form of a step wave function. Emitter LED transmits the signature across gap 430. The light-sensitive sensor 520 is sensitive to the signature of the emitter LED 522, but has a low sensitivity to a continuous wave of light. The light-sensitive sensor 520 thus has a low sensitivity to ambient light conditions including bright lights. A signal output 530 is operably connected to the control system and provides a signal to the control system whenever light-sensitive sensor 520 does not detect the signature from the emitter LED 522. The light-sensitive sensor 520 can be implemented using a light modulation photo integrated circuit, Model No. S4282, manufactured by Hamamatsu Corp., of Japan.

The potentiometer 524 sets the sensitivity between the emitter LED 522 and the light-sensitive sensor 520. If multiple paper sensors 428 are used, the potentiometer 524 can be adjusted to standardize the response of all the paper sensors 428. This adjustment enables accommodation of lot differentials for the light-sensitive sensors 520 and emitter LED 522.

Indicator LED 526 is visible through housing 486 and provides a visual mimic of the light-sensitive sensor 520 condition for diagnostic purposes. When working properly, indicator LED 526 emits a visible light when light-sensitive sensor 520 detects the signature emission from emitter LED 522. Indicator LED 526 does not emit a visible light when light-sensitive sensor 520 does not detect the signature emission from emitter LED 522. Thus, a technician can test the paper sensor 428 by manually cycling light-sensitive sensor 520 on and off and observing indicator LED 526. The light-sensitive sensor 520 can be cycled by blocking it with an opaque object such as a sheet of paper.

Paper sensor 203 is substantially similar to paper sensor 428 and is not described in detail for purposes of brevity and clarity.

8. Vertical Track

Figure 11:
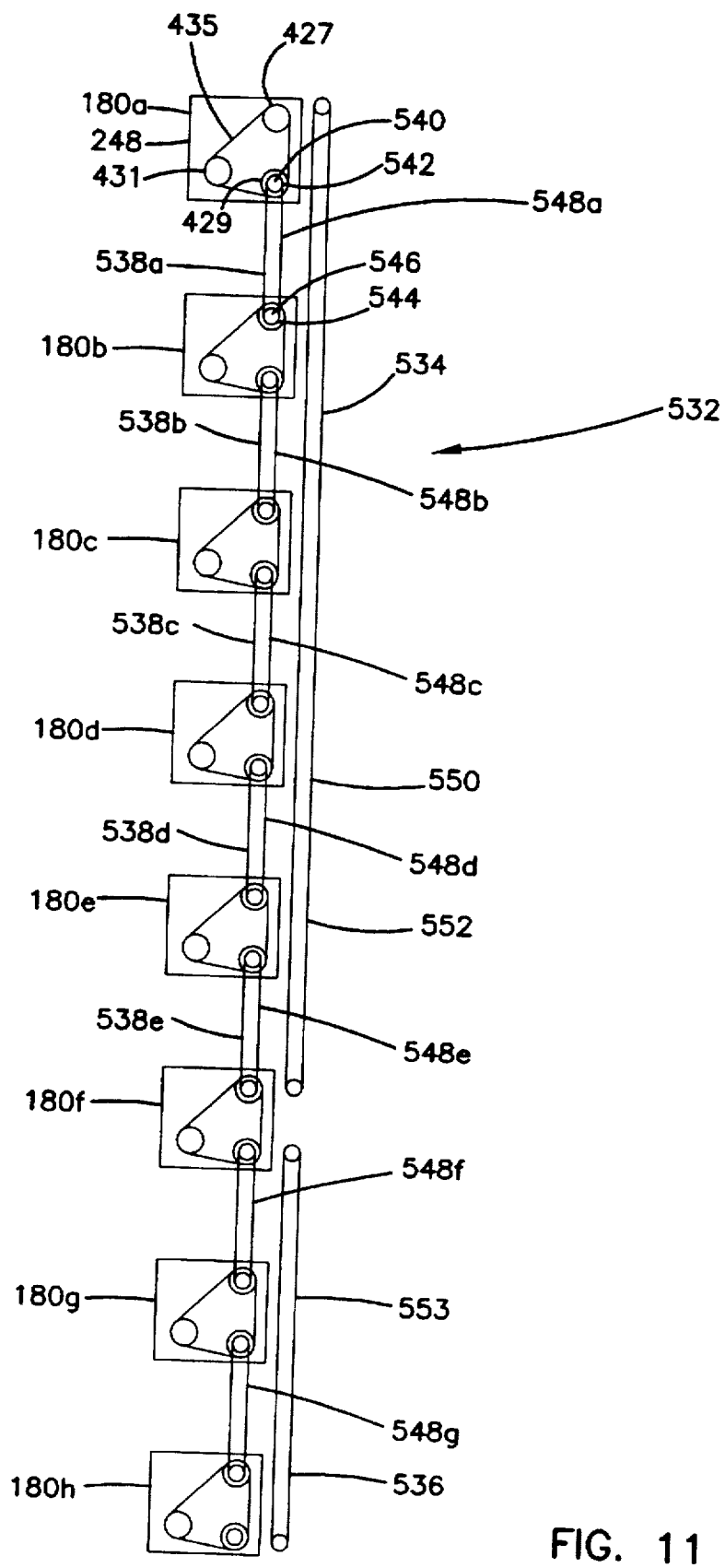
FIG. 11 shows a conveyor system for a vertical paper track that is a component of the collator module shown in FIG. 1.

Referring to FIG. 11, vertical track 532 is a feed assembly having an upper portion 534 and a lower portion 536. An output port is formed between the upper portion 534 and the lower portion 536. Upper portion 534 is substantially vertical and positioned above the level of the first track assembly 112 so that it transports sheets from the upper retainers 106a–106e to the first track assembly 112. Lower portion 536 is substantially vertical and positioned below the level of the first track assembly 112 so that it transports sheets from the lower retainers 106g and 106h to the first track assembly 112.

Sheets from retainer 106f are fed directly into first track assembly 112. This substantially vertical configuration has several advantages. For example, stacking the retainers 106a–106h on top of each other minimizes the foot print of the collator 100 and saves floor space. Another advantage is that the average distance between the retainers 106a–106h and the first track assembly is substantially minimized. As a result, the recovery strategy for error conditions is optimized, which minimizes both waste of the sheets and man hours required for correcting jams.

Upper portion 534 has five inner conveyor assemblies 538a–538d that cooperate with pick mechanism assemblies 180a–180f. Inner conveyor assembly 538a is connected between pick mechanism assembly 180a and 180b; inner conveyor assembly 538b is connected between pick mechanism assemblies 180b and 180c; inner conveyor assembly 538c is connected between pick mechanism assemblies 180c and 180d; inner conveyor assembly 538d is connected between pick mechanism assemblies 180d and 180e; and inner conveyor assembly 538e is connected between pick mechanism assemblies 180e and 180f.

Inner conveyor 538a has an upper shaft 540 that is rotatably connected between the first and second brackets 248 and 250 of pick mechanism assembly 188a. Upper shaft 540 also has an end 542 on which lower sprocket 429 of pick mechanism 180a is mounted. Inner conveyor 538 also has a lower shaft 544 that is rotatably connected between the first and second brackets 248 and 250 of pick mechanism assembly 180b. Lower shaft 544 has an end 546 on which upper sprocket 427 of pick mechanism assembly 180b is mounted. A belt 548 extends around upper shaft 540 and lower shaft 544.

The inner conveyor assemblies 538c through 538e are substantially similar to inner conveyor assembly 538a and are similarly mounted between pick mechanism assemblies 180b and 180c, 180c and 180d, 180d and 180e and 180e and 180f, respectively. An outer conveyor assembly 550 extends from a position adjacent to pick mechanism 180a and pick mechanism assembly 180f and includes a belt 552 that fictionally engages the belts of inner conveyor assemblies 538a–538e.

Lower portion 536 is substantially similar to upper portion 534 and cooperates with pick mechanism assemblies 180f–180h to transport sheets from retainers 180g and 180h to first track assembly 112.

9. Drive Assembly

Figure 12:
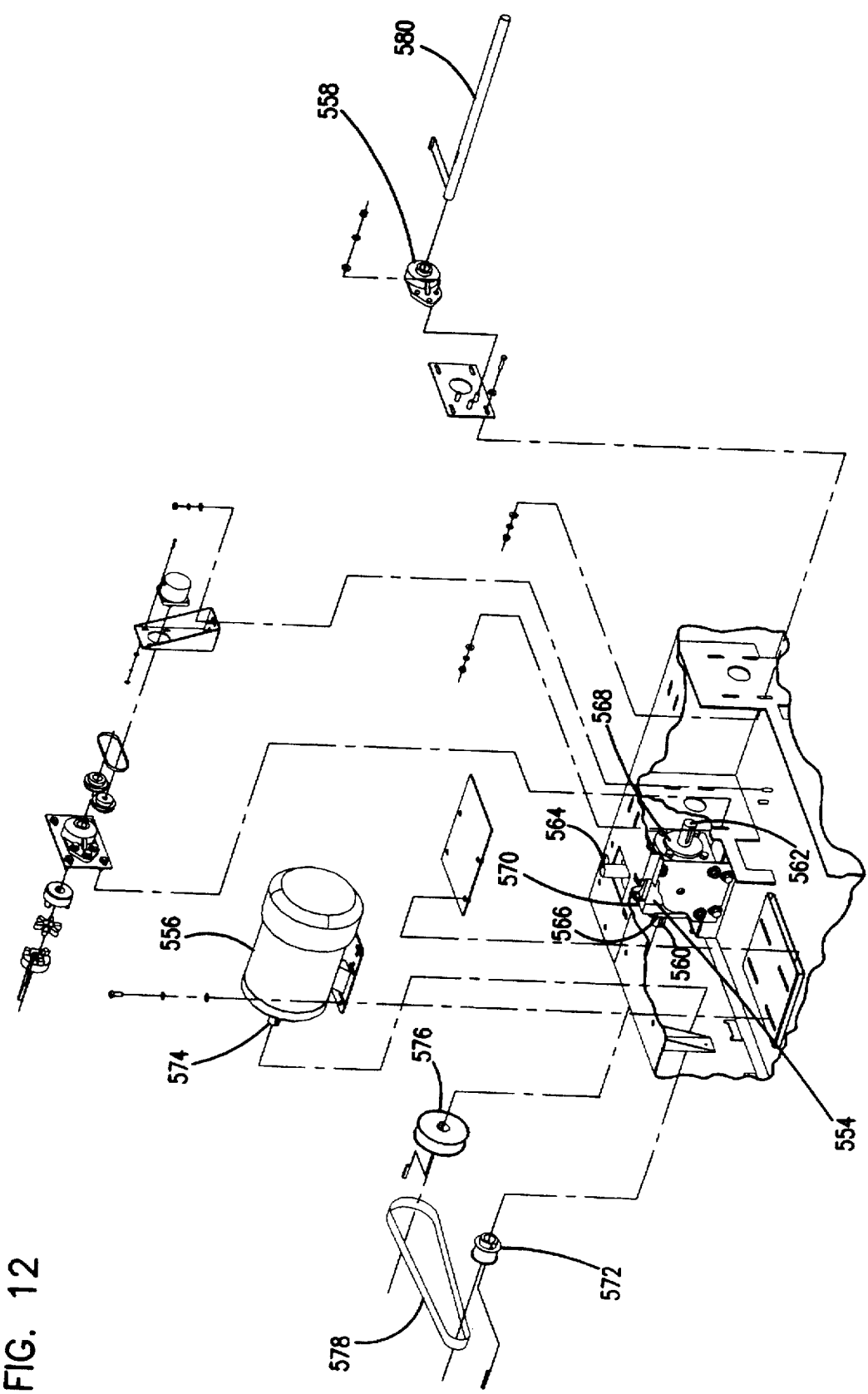
FIGS. 12 and 13 show a drive assembly for the collator module shown in FIG. 1.
Figure 13:
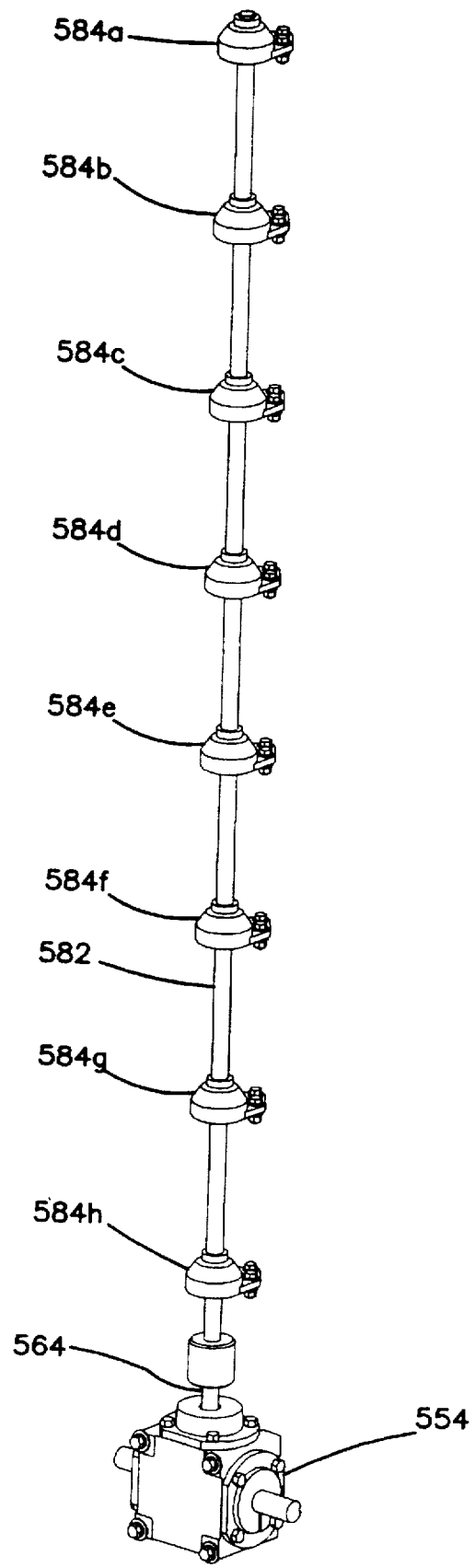

Referring to FIGS. 12 and 13, a drive assembly includes a gear box 554, a track motor 556, and a track encoder 558. The gear box 554 has first, second, and third shafts 560, 562, and 564. First and second shafts 560 and 562 project from oppositely disposed sides 566 and 568 of the gear box 554. The third shaft 564 projects upward from the top 570 of the gear box 554 and is substantially vertical. First, second, and third shafts 560, 562, and 564 are related such that rotating the first shaft 560 will transmit the motion to the second and third shafts 562 and 564.

A drive sprocket 572 is mounted on motor shaft 534 of track motor 556. Additionally, a pulley 576 is mounted on first shaft 560. A drive belt 578 extends around drive sprocket 572 and pulley 576. Track motor 556 is controlled by the control system and provides motive force for rotating first shaft 560, second shaft 562, and third shaft 564 of gear box 554.

Encoder rod 580 is connected to the second shaft 562 and extends through encoder 581. When track motor 556 rotates, it drives the first shaft 560 of gear box 554, which transmits the rotational force to the second shaft 562 and third shaft 564. In turn, the second shaft 562 causes the encoder 580 rod to rotate. The encoder 581 senses rotation of the encoder rod 580 and transmits a signal to the control system for each complete rotation made by the encoder rod 580. Each signal is a pulse that is termed a "tick". One skilled in the art will realize that each rotation of the encoder rod 580 corresponds to a complete rotation of the third shaft 564.

A vertical drive shaft 582 is connected to third shaft 564 of gear box 554. Vertical drive shaft 582 is adjacent to the pick mechanism assemblies 180a–180g and extends up to a position proximate top unit 144 of frame 126. A plurality of driving cone gears 584a–584h are intermittently positioned along the vertical drive shaft 582. Driving cone year 584a mates with cone gear 437 of pick mechanism assembly 180a. Similarly, driving cone gears 584b–584h mate with the cone gear 437 of pick mechanism assemblies 180b–180h.

Referring now to FIGS. 11, 12, and 13, vertical drive shaft transmits motive power from track motor 556 to lower infeed roller 334. In turn, drive sprocket 431 transmits the force to upper and lower sprockets 427 and 429, which causes the belts 548a–548f of inner conveyor assemblies 538a–538f, respectively, to rotate outer belts 549 and 549b to rotate.

As a result, the vertical track 532 and the upper and lower infeed rollers 332 and 334 are all driven by track motor 556 and move in sync. An advantage of this interconnectivity is that the control system can use the ticks from track encoder 558 to measure the amount of movement by the initial track 532 and the upper and lower infeed rollers 332 and 334. In turn, the control system determines the position that a picked sheet should be located. The control system uses this information to increase accuracy of the error detection and error correction.

10. Adjustable Edge Guide

Figure 14:
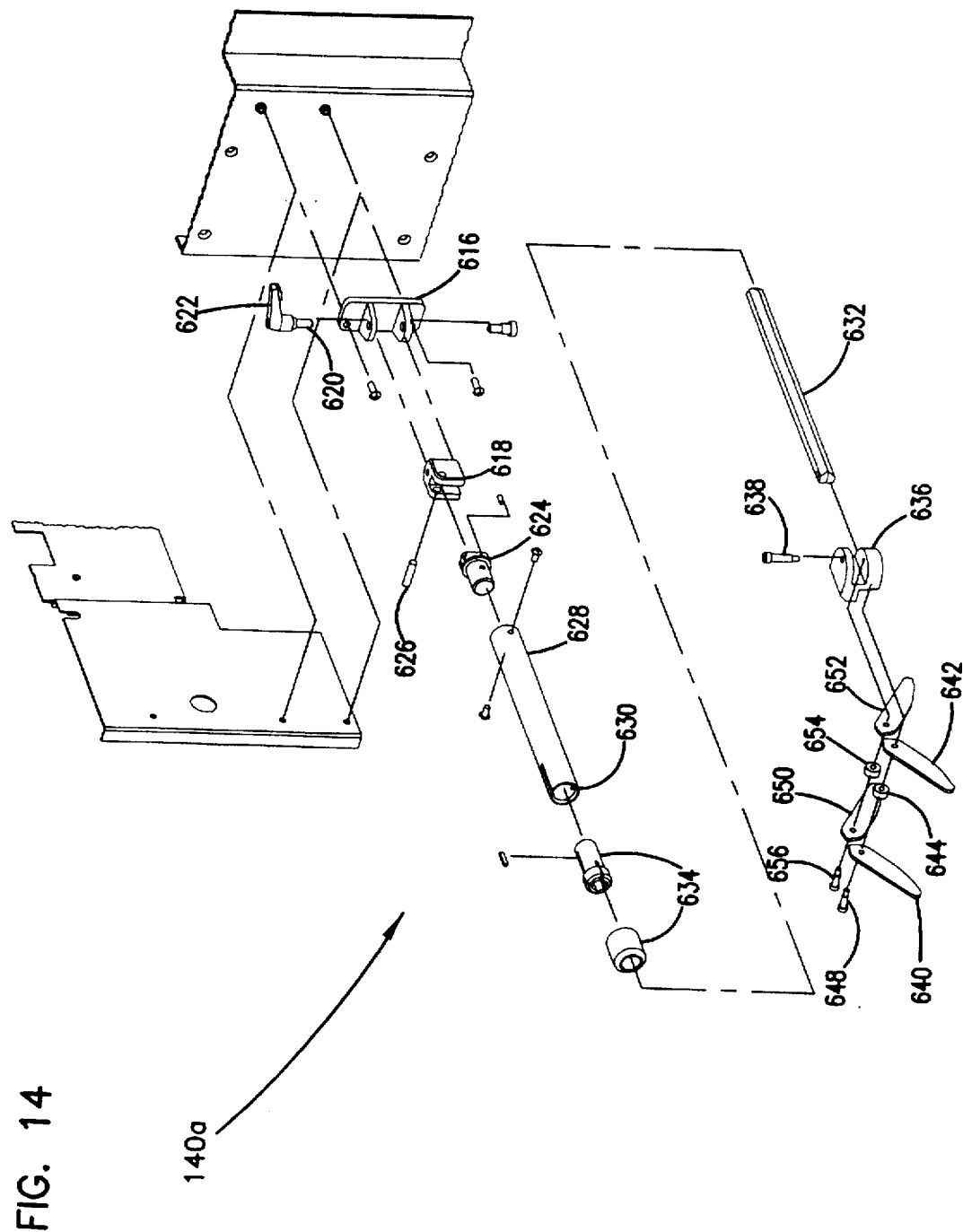
FIG. 14 is an illustration of an adjustable edge guide that is a component of the collator module shown in FIG. 1.

Referring now to FIG. 14, adjustable edge guide 140a has a base 616 for mounting on the collator 100. A swivel joint 618 is operably connected to base 616 and was a vertical locking pin 620, which includes a lever 622. An operator can use lever 622 to twist and lock locking pin 620, which prevents the adjustable edge guide 140a from pivoting from side to side.

A coupling member 624 is operably connected to swivel joint 618 by horizontal pin 626. Tube 628 is operably connected to coupling member 624 and has channel 600 that was a non-circular profile. For example, the profile of channel 600 may be trapezoidal. However, other conventional profiles can also be used to configure channel 630. As a safety feature, horizontal pin 626 does not lock so that tube 628 can pivot up and down.

Allowing the adjustable edge guide 140a to pivot up and down prevents an object located in retainer 106a from being pinched between the adjustable edge guide 140a and either the tray assembly 178a or the top unit 144 of frame 126. Damage to the adjustable edge guide 140a is also prevented.

Shaft 632 slideably engages channel 630 and has a profile that is similar to the profile of the channel 630. Having a trapezoidal profile for channel 630 and a mating profile for shaft 632 prevents shaft 632 from rotating. Tube 628 and shaft 632 form a telescoping member.

A collar chuck 634 selectively secures shaft 632 in its position relative to tube 628. An advantage of the shaft 632 and channel 630 combination is that the shaft 632 can be moved into or out of channel 630 in order to accommodate different sizes of print media.

A pivoting member 636 is connected to shaft 632 by vertical pin 638. A flange arrangement has first and second flanges 640 and 642, which are substantially parallel to one another and are spaced by bushing 644. First and second flanges 640 and 642 are connected to pivoting member 636 with pin 648 and can pivot around pin 648. Another flange arrangement has third and fourth flanges 650 and 652, which are substantially parallel to one another and are spaced by bushing 654. Second set of flanges 650 and 652 are operably connected to pivoting member 636 with pin 656 and can pivot around pin 656. Pivoting member 636 permits the flange arrangements to pivot horizontally.

Adjustable edge guides 140b–140p are substantially identical to adjustable edge guide 140a. The other adjustable edge guides are not discussed in detail for purposes of brevity and clarity.

As discussed above, each retainer has two adjustable edge guides 140a–140p, which assist control of the print media. In retainer 106a, for example, adjustable edge guide 140a is positioned so that first, second, third, and fourth flanges 640, 642, 650, and 652 are abutting second side edge 136 of the stack 130a. If the paper stock is heavy, first and third flanges 640 and 650 are placed adjacent the second side edge 136 of the stack 130a such that they are in contact with at least the top sheets. Second and fourth flanges 642 and 652 do not contact the stack 130a. In this position, the adjustable edge guide 140a provides control of the sheets as they are being picked and fed into the upper and lower infeed rollers.

If the sheet is light weight, first and third flanges 640 and 650 is pivoted upward around pins 648 and 656, respectively, so that they rest on top of the stack 130a. Second and fourth flanges 642 and 652 are then placed in contact with the second side edge 136 of the stack 130a. In this position, the adjustable edge guide 140a provides a controlled amount of drag along the top of the stack 130a and provides better control for feeding into the upper and lower infeed rollers 332 and 334.

Adjustable edge guide 140b is substantially similar to adjustable edge guide 140a and can be similarly positioned against the rear edge 138 of the stack 130a. The other adjustable edge guides 140c–140p also operate in a substantially similar manner to adjustable edge guide 140a.

In order to replenish the stack 130a in retainer 130a, the operator loosens the locking pin 620 and pivot the adjustable edge guide 140a to the side. In this position, the adjustable edge guide 140a does not block the retainer 176a. Adjustable edge guide 140b can be pivoted in a similar manner. Print media sheets can then be resupplied to the retainer. After the sheets are resupplied, the adjustable edge guides 140a and 140b can be returned to one of the positions described above. One skilled in the art will realize that adjustable edge guides 140c–140p pivot in a substantially similar manner to clear their respective retainers 106b–106g.

11. Modularity

In the collator 100 described above, retainers 106a–106d have a 500-sheet capacity and retainers 106e–106h have a 1,000-sheet capacity. In this configuration, the collator 100 has an overall capacity of 6,000 sheets. One skilled in the art will realize that the collator 100 can have different configurations of retainers, which will affect its overall capacity. For example, the collator might include four retainers that have a 3,000-sheet capacity. In this configuration, the overall capacity of the collator is 12,000 sheets. This flexibility allows the printing system to be configured to meet the needs of individual applications.

Additionally, the present printing system can include multiple collators that are ganged together in a train structure. The train structure would include a common horizontal path that would lie in the same plane as the first track assembly 112 and provide a path by which sheets are transported from retainers within the additional collators to the first track assembly 112.

C. First Track Assembly

Figure 15:
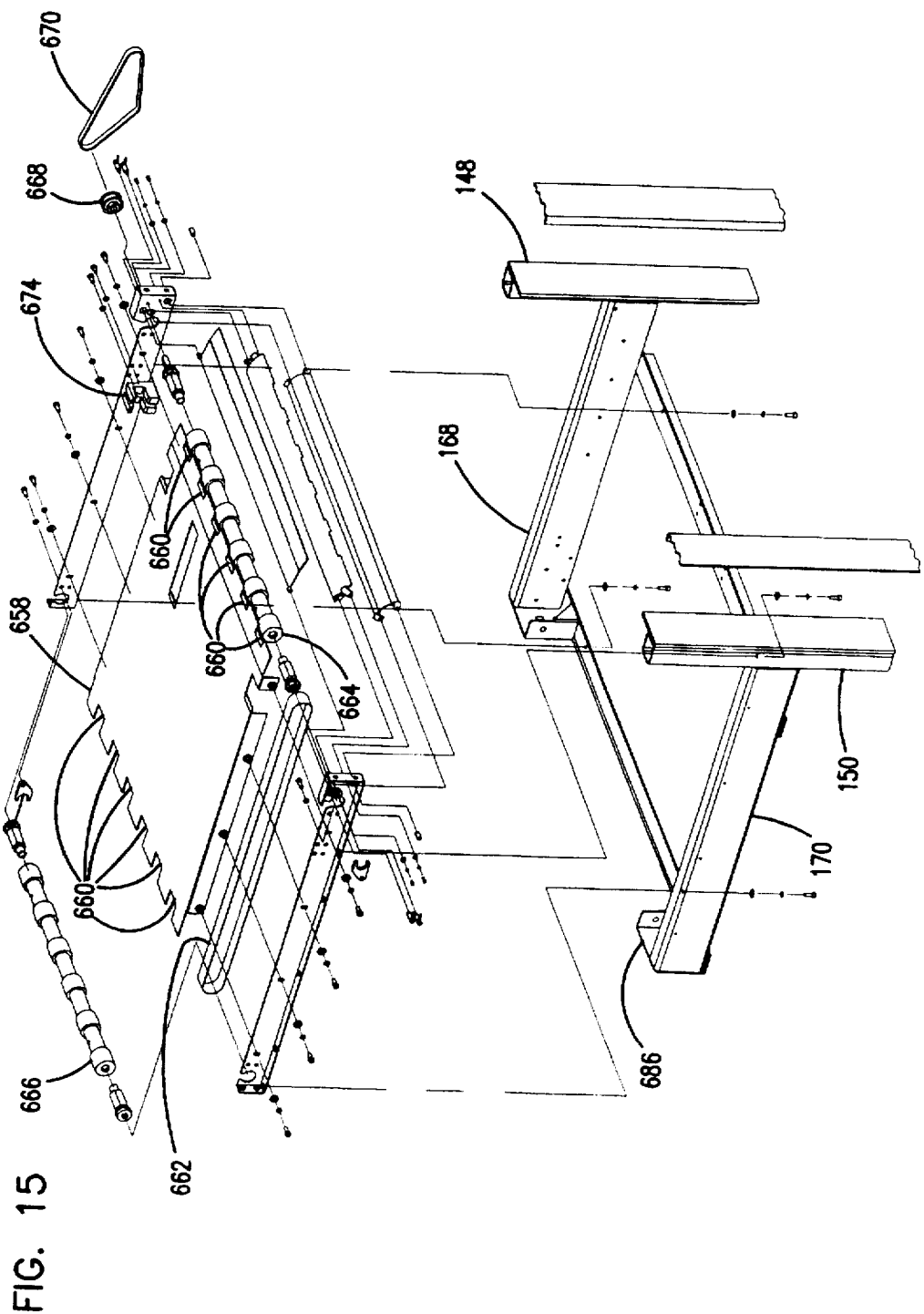
FIGS. 15 and 16 show an output track that extends between the collator and printer module shown in FIG. 1.

Referring to FIG. 15, output track platen 658 is connected to first and second horizontal beams 168 and 170 of frame 126. Platen 658 is substantially horizontal and has six perforations 660 located at oppositely disposed ends. A base 659 is connected to the lower surface of the platen 658 such that the base 659 and the platen 658 form a chamber 661.

The platen 658 forms six slots 663 such that each slot extends between each of the oppositely disposed perforations 660. Six track belts 662 extend around platen 658 and mate with oppositely disposed perforations 660. These six track belts 662 are mounted on a front roller assembly 664 and a rear roller assembly 666. Each of the six track belts 662 forms a plurality of perforations 665 that extend along substantially the entire length of the belts 662. Each of the six track belts 662 are aligned with one of the slots 663 such that the perforations 665 are in fluid communication with the slots 663.

Additionally, a blower (not shown) is in fluid communication with the chamber 661 through an opening (not shown) in the base 659. The blower withdraws air from the chamber 661 so that air is drawn through the perforations 665 in the belts 662 and an attractive vacuum force is formed proximate the perforations 665. The attractive vacuum force should have sufficient strength so that a sheet being transported by the track assembly will be secured to the belts 662 and thus move with the belts 662 as they rotates. However, the attractive vacuum force should not be so strong that the sheet cannot be shifted during registration in order to correct the angular and lateral error in the sheets position.

A drive sprocket 668 is connected to the front roller assembly 664 and a drive belt 670 extends around the drive sprocket 668 and the tandem drive sprocket 439 of pick mechanism assembly 180f, which feeds sheets of print medium directly into first track assembly 112 as described above. Thus, the six track belts 662 receive motive power from track motor 556 and move at the same rate as vertical track assembly 552 and upper and lower infeed rollers 332 and 334.

In an alternative embodiment, the six track belts 662 can receive motive power from their own dedicated motor (not shown). In this alternative embodiment, the speed of the six track belts can be adjusted so that they rotate at the same speed as the vertical track assembly, faster than the vertical track assembly 552, or slower than the vertical track assembly 552. If the six track belts 662 operate at the same speed as the vertical track assembly 552, the ticks can be used to determine the position of sheets being transported along the first track assembly as well as the vertical track assembly 552. Operating the six track belts 662 at a different speed than the vertical track assembly 552 allows the distance between picked sheets to be adjusted.

A paper sensor 674 is connected to first horizontal beam 168 and positioned so that it can detect a document being transported by the upper six and lower six track belts 672 and 662. The paper sensor 674, which is linked to the control system, is substantially similar to the paper sensor 428, that was described above.

Figure 16:
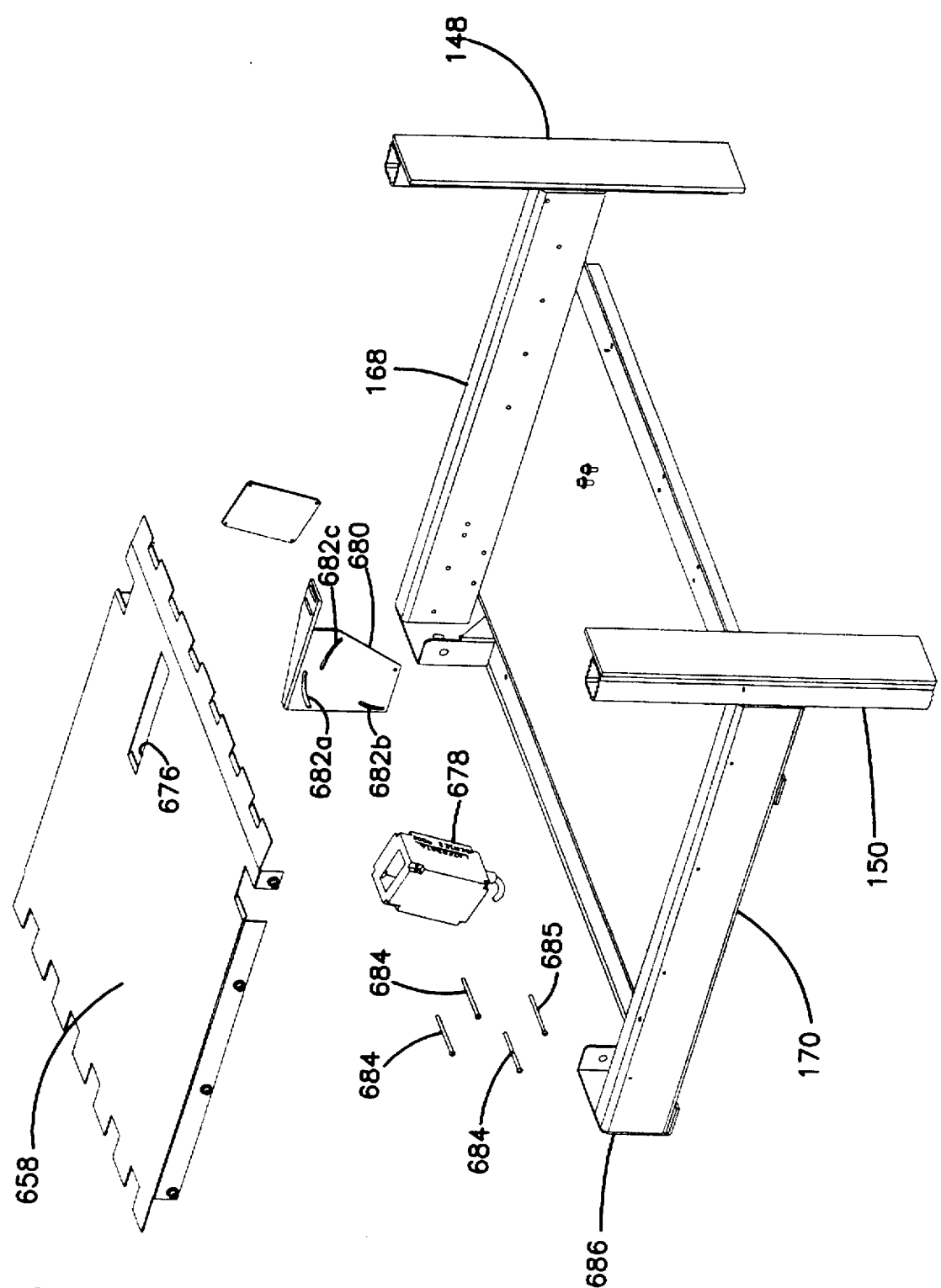

Referring to FIG. 16, an alternative embodiment of platen 658 and base 659 define a hole 676. Hole 676 is not open to chamber 661 so that it does not effect the strength of the attractive vacuum force that is created proximate the perforations 665 in the six track belts 662.

A scanning device 678 is mounted on a bracket 680, which has slots 682a, 682b, and 682c. Bracket 680 is mounted to the bottom of platen 658 at a position that is proximate hole 676. Scanning device 678 is attached to bracket 680 with screws 684 that extend through curved slots 682a, 682b, 682c. Thus, scanning device 678 is adjustable by moving the screws 684 through the slots 682a, 682b, and 682c. Additionally, scanning device 678 pivots around mounting screw 685. Moving the scanning device 678 relative to the slots 682a, 682b, and 682c allows the scanning device 678 to be properly focused. An alternate location for the scanning device 678 is within the first track assembly door itself. In that position, the scanning device 678 would be monitoring the printed side of the sheet, which is the side that will be printed.

In a specific embodiment, the scanning device 578 is a bar code scanner that detects a bar code image preprinted on each sheet of the print medium. In this embodiment, the rear face of the sheet is pre-printed with the bar code so that the sheets are continuously being scanned as they pass through the first track assembly 112.

The scanning device 678 transmits the scanning results to the control system, which can then determine whether the sheet of print medium is properly oriented, i.e., not upside down or turned in the wrong direction. In these scenarios, the scanning device 678 will not detect a bar code.

The control system can also determine whether the proper type of print medium document was fed from the collator 100, which effects whether the proper collation sequence occurs. In this scenario, the scanning device 678 will detect the wrong bar code. A commercially available bar code scanner that can be used to implement the scanning device 678 is model 9000, manufactured by Laser Data, Inc.

In this scenario, the programmed controller generates first identification signals. Each identification signal is associated with a particular retainer 106a–106h and represents the type of sheet being held by the associated retainer. The scanning device 678 generates a second identification signal representative of the bar code. The programmed controller compares the first and second identification signals and generates an error signal indicating the retainer is holding the incorrect type of sheet if the first and second identification signals do not match.

If the retainer from which the sheets are picked contain two types of pre-collated sheets, the scanning device 678 will generate alternating signals. The control system can use these alternating signals to distinguish between the two alternating types of sheets being picked. One situation in which pre-collated stock is used is for printing checkbooks that include carbon stubs.

Figure 17:
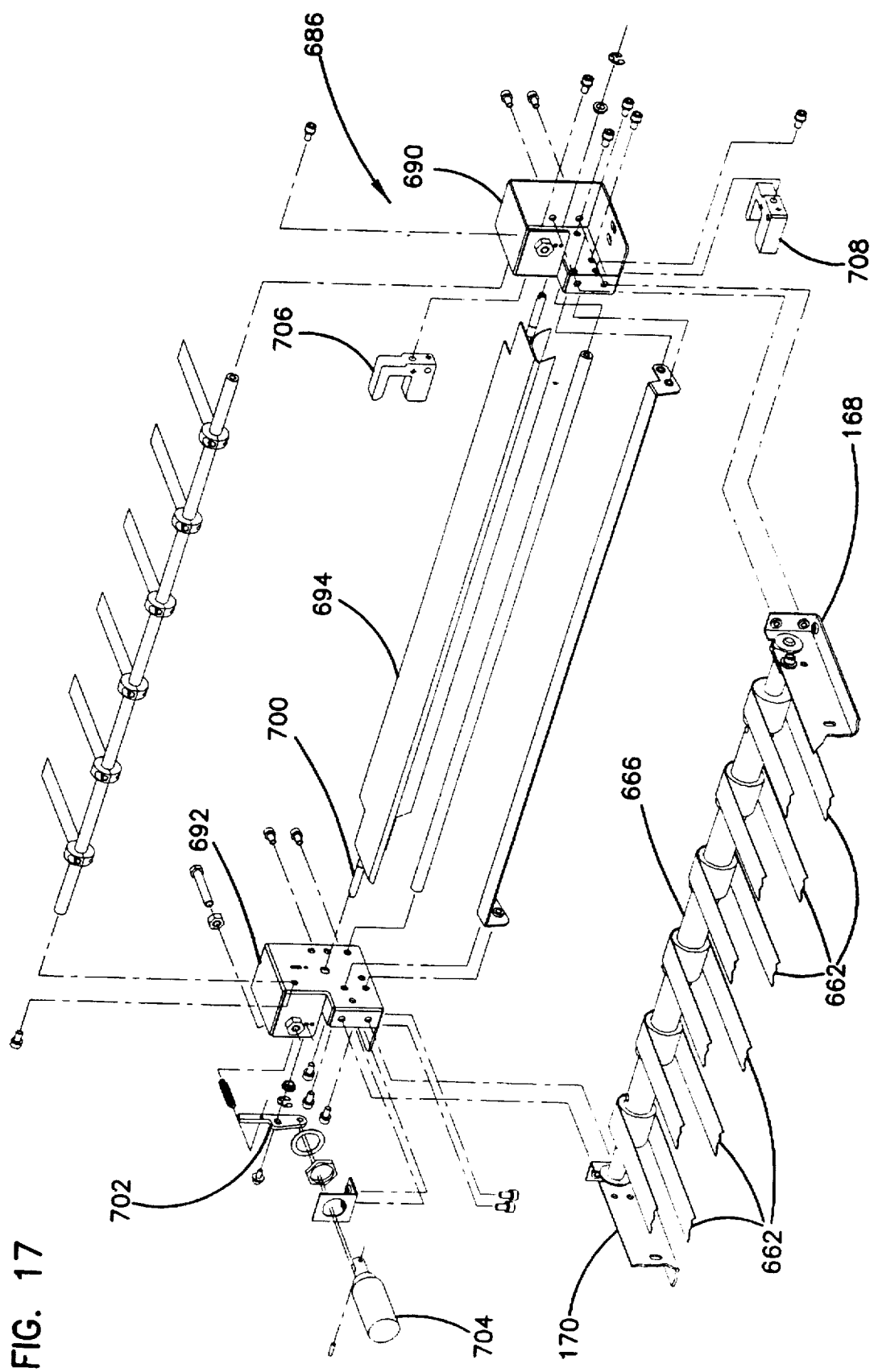
FIG. 17 is an illustration of a diverter assembly that is a component of the output track shown in FIGS. 13 and 14.

Referring now to FIG. 17, a diverter 686 is attached to a trailing edge 688 of the first track assembly 112. The diverter 686 includes a first bracket 680 attached to the first horizontal beam 168 and a second bracket 692 attached to the second horizontal beam 170. A platen 694 is pivotally connected between first and second brackets 690 and 692. Platen 694 is positioned proximate the rear roller assembly 666.

A pin 700 projects from platen 694 and extends through second bracket 692. A lever 702 is connected to pin 700. In turn, a solenoid 704 is connected to the lever 702. The solenoid 704 is linked to the control system. When the solenoid 704 is actuated, it moves the lever 702 which causes the platen 694 to pivot. When the platen 694 pivots, it obstructs the output from the conveyor formed by the upper six and lower six track belts 672 and 662. Thus, a sheet of print medium being transported through the first track assembly 112 will strike the platen 694 and be ejected or directed downward and off the substantially planer path so that it does not enter the printer 102. The platen 694 is positioned between the output from the first track assembly 112 and the input to the printer 102.

If a sheet is ejected by the diverter, the programmed controller will cause the collator 100 to re-present a sheet of the same type as the evicted sheet. Thus, a break in the predetermined order of sheets is prevented.

Additionally, a paper sensor 706 is mounted on the first bracket 690 and positioned between the platen 694 and the six upper and six lower track belts 672 and 662. Thus, the paper sensor 706 can sense sheets of print medium being transported out of the first track assembly 112. An additional paper sensor 708 is attached to the bottom of first bracket 690 and oriented so that it detects a document that is diverted by the platen 694 as it moves downward and off the substantially planer path.

A bin, not shown, can be positioned to received documents that the platen 694 diverts from the first track assemblies. Paper sensors 706 and 708 are substantially similar to the paper sensor 428 described above. Both paper sensors 706 and 708 are linked to the control system.

In operation, the six track belts 662 and the vertical track assembly should transports the sheets fast enough to establish a sufficient spacing between the sheets being transported. If an error is detected, therefore, the sheet can be diverted before the next sheet is picked from one of the retainers. In this situation, the control system can cause the same type of sheet that was diverted to be repicked and thus preserve any predetermined sequence of sheets that are required to run the job. If the retainer from which the diverted sheet retains two types of pre-collated sheets, the programmed controller will also cause the next subsequent sheet to be diverted so that the proper order of alternating types of sheets is preserved.

D. Registration System

Figure 18:
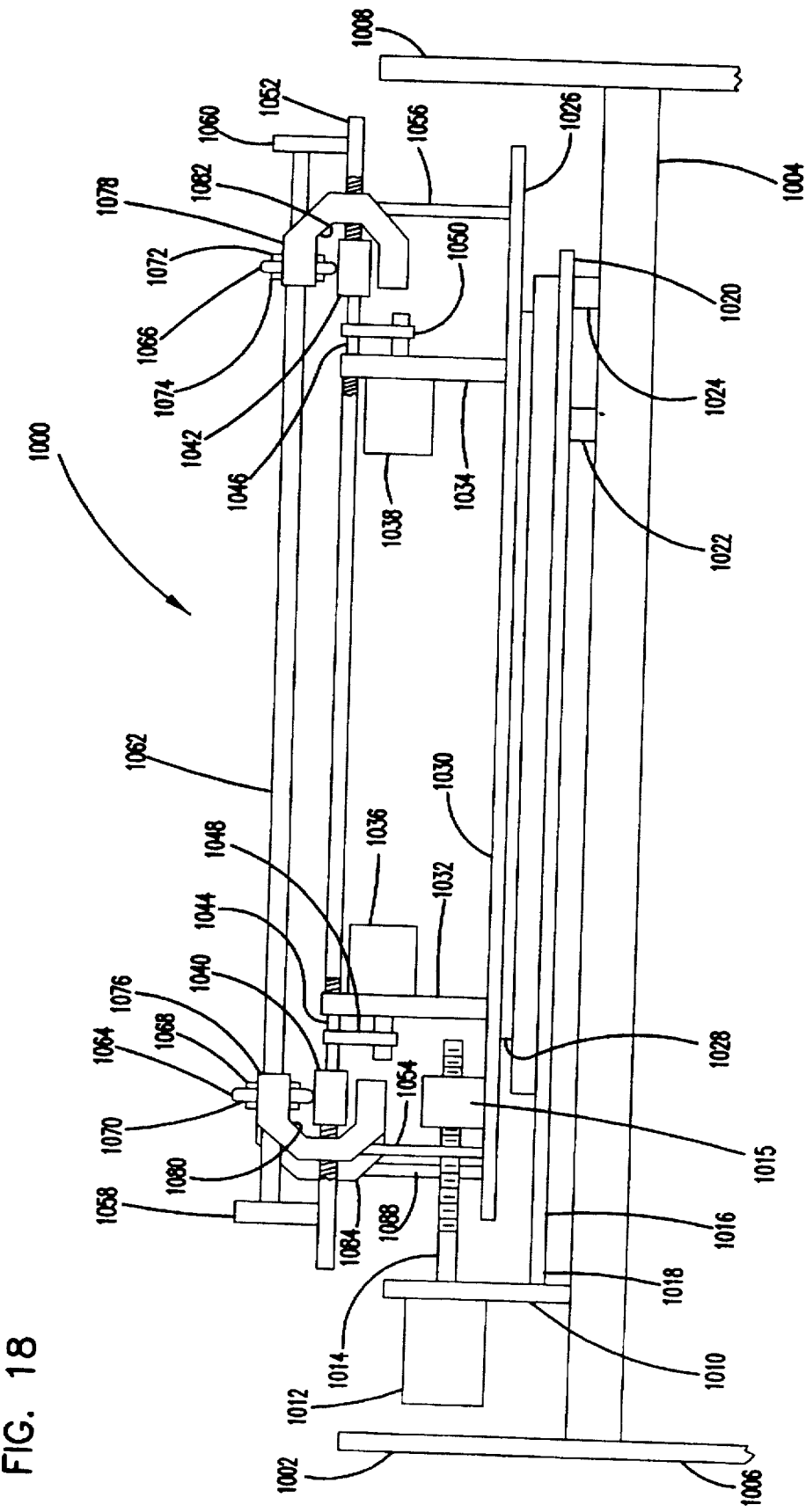
FIG. 18 is a front elevational view of a registration system used in the printing system shown in FIG. 1.
Figure 19:
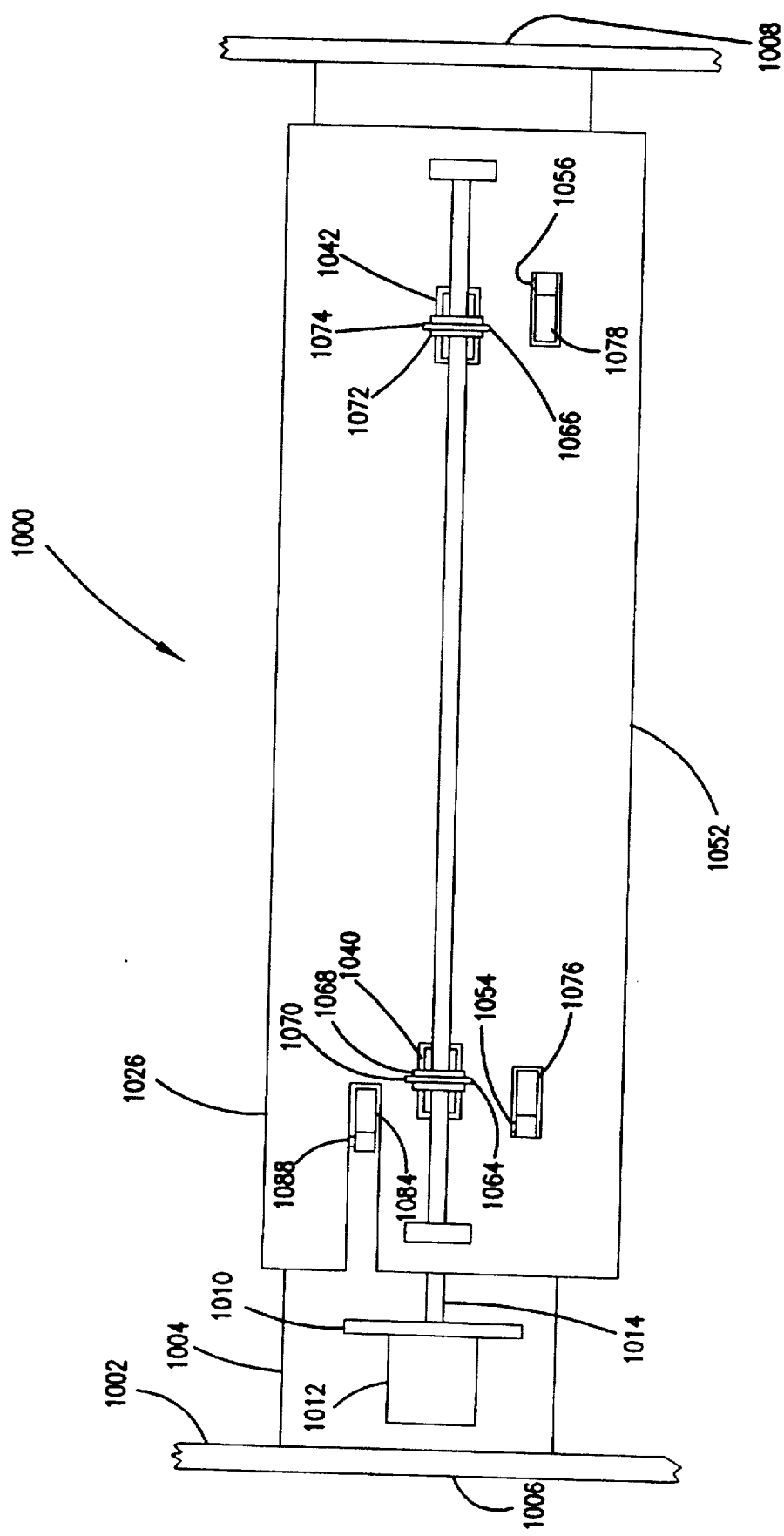
FIG. 19 is a top plain view of the registration system shown in FIG. 18.

Referring now to FIGS. 18 and 19, a registration system, generally shown as 1000, positions the sheet being transported along the path so that the sheet is properly aligned with the printer 102 and a print engine within the printer. This function is very important, especially when the sheet is a preprinted form and the printer 102 is adding new characters that need to be properly aligned on the form. The registration system 1000 adjusts both the skew and lateral position of the sheet.

The registration system includes a frame 1002 that has a horizontal member 1004 extending between first and second vertical members 1006 and 1008. A vertical motor bracket 1010 is mounted on the horizontal member 1004 and supports a carriage motor 1012. The carriage motor 1012 drives a ball screw mechanism 1014 that includes a nut 1016. The carriage motor 1012 and ball screw mechanism 1014 form a motor arrangement. Additionally, a lower rail 1016 has one end 1018 connected to the vertical motor bracket 1010 and an opposite end 1020 supported by mounts 1022 and 1024. The lower rail 1016 supports a carriage 1026.

The carriage motor 1012 is linked to and controlled by a servo controller (not shown). In turn, the servo controller is linked to the control system. One type of servo controller that can be used is model number PRO 450 controller, which is manufactured by Reliance Electric of Eden Prairie, Minn. This servo controller may include an amplifier such as model number BSA 15, which is also manufactured by Reliance Electric. Such servo controllers are well known in the art.

The carriage 1026 includes an upper rail 1028 that slidable engages the lower rail 1016. A horizontal plate 1030 is mounted on the upper rail 1028, and first and second motor brackets 1032 and 1034 are mounted on the horizontal plate 1030. The first and second motor brackets 1032 and 1034 support first and second stepper motors 1036 and 1038, respectively. The first and second stepper motors 1036 and 1038 are linked to the control system.

First and second lower rollers 1040 and 1042 are connected to first and second rods 1044 and 1046, respectively, which are rotatably mounted on the first and second motor brackets 1032 and 1034, respectively. First and second belts 1048 and 1050 transmit motive power from the first and second stepper motors 1036 and 1038, respectively, to the first and second lower rollers 1040 and 1042, respectively. The diameter of the first and second lower rollers 1040 and 1042 is approximately ±0.0005 of an inch of each other.

A platen 1052 is supported above the horizontal plate 1030 by brackets 1054 and 1056. Flanges 1058 and 1060 extend upward from the platen 1052, and a rod 1062 extends between the flanges 1058 and 1060. First and second upper rollers 1064 and 1066 are rotatably mounted on the rod 1062 such that the first upper roller 1064 engages the first lower roller 1040 and the second upper roller 1066 engages the second lower roller 1042. The first upper roller 1064 and the first lower roller 1040 form a first roller pair. The second upper roller 1066 and the second lower roller pair 1042 form a second roller pair.

The first upper roller 1064 includes a central roller 1068 that is surrounded by an o-ring 1070, which provides a tapered rim and minimizes the contact area between the first upper roller 1064 and the first lower roller 1040. Similarly, the second upper roller 1066 has a central roller 1072 and an o-ring 1074. An advantage of minimizing the contact between the upper rollers 1064 and 1066 and the lower rollers 1040 and 1042 is that the sheet being registered will more easily move when the skew is being adjusted.

The first and second roller pairs are positioned on opposite sides of the path and form a roller arrangement. The first roller pair will grip or pinch one side of the sheet and the second roller pair will grip or pinch the opposite side of the sheet. First and second sensors 1076 and 1078 are connected to the platen 1052 and are positioned proximate the first and second roller pair, respectively. Each sensor 1076 and 1078 includes a gap 1080 and 1082, respectively, and has a light emitter/detector arrangement (not shown) such that the sensors 1076 and 1078 can detect the presence or absence of a sheet in the gaps 1080 and 1082. Thus, the first and second sensors can detect the leading and trailing edges of the sheet as it is being transported along the path. The first and second sensors 1076 and 1078 are linked to the control system.

A third sensor 1084 is substantially similar to the first and second sensors 1076 and 1078. However, the third sensor 1084 is mounted on a bracket 1088, which is connected to the horizontal member 1004 of the frame 1002. Thus, the third sensor 1084 does not move with the carriage 1026. The third sensor 1084 is linked to the servo controller. The third sensor 1084 is slightly offset from the first sensor 1076. Thus, the third sensor 1084 can be used to register the side edge of the sheet being transported.

In operation, the first and second stepper motors 1036 and 1038 rotate at a substantially similar and predetermined speed so that the first and second roller pairs rotate and transport the sheets at approximately the same speed as the printer 102. Thus, the first and second roller pairs will slow the sheets being transported along the first track assembly 112 and reduce the gap between consecutive sheets picked from the collator 100 so that the gap is compatible with the print engine that is used in the printer 102.

As the sheet is being transported, it will pass through the first and second roller pairs and the leading edge will trip the first and second sensors 1076 and 1078. There is angular error if the sheet is skewed. In this first position, the leading edge of the sheet is not perpendicular to the path and will trip the first and second sensors 1076 and 1078 at different times.

The control system can measure the interval between the moments when the first and second sensors 1076 and 1078 are tripped. In response, the control system will create a speed differential between the first and second stepper motors 1036 and 1038 by increasing the speed of one stepper motor 1036 or 1038 and decreasing the speed of the other stepper motor 1038 or 1036. The controller will also cause a phase differential between steps in the first and second stepper motors 1036 and 1038.

The magnitude of the speed change for the first and second stepper motors 1036 and 1038 is approximately the same so that the mean speed of the sheet will remain substantially the same as it is being rotated. Once the sheet is shifted to a second position wherein the leading edge is substantially perpendicular to the transport path, the first and second stepper motors 1036 and 1038 are returned to substantially the same speed and the phase differential between the steps is returned to approximately zero.

The registration system 1000 also shifts the sheet from side to side so that the sheet's side edge is placed in a predetermined position that is aligned with the printer 102. When the leading edge of the sheet is detected by either the first or the second sensors 1076 or 1078, the control system will activate the servo system and the carriage motor 1012 will move the carriage 1026 toward the third sensor 1084. When the third sensor 1084 detects the side edge of the sheet, it will send a signal to servo controller. The servo controller will then stop moving the carriage 1026 and the lateral position of the sheet will be properly aligned with the printer 102.

An alternative form of lateral registration is to move the carriage 1026 laterally until the third sensor 1084 detects the sheet and then move the carriage 1026 in the opposite direction until the sheet moves out of the third sensor's 1084 detection. In another alternative embodiment, a sensing device that generates an analog signal could be used in place of the third sensor. A charge-coupled device (CCD element) is an example of such an alternative sensing device.

E. Printer

As discussed above, the printer 102 receives sheets from the collator 100 that are transported via the first track assembly 112. The printer 102 contains a print engine and mechanisms to position and prepare sheets for printing. The printer 102 can be modelled as either a digital press or a printer. Digital press architecture models offset printing methods and duplicates an image or a set of images over several pages. The majority of information printed by a digital press does not change, and the data that does change from page to page tends to be sequential or related in some manner. Because there is little change, the digital press model does not place heavy requirements on computing hardware. The digital press model is also compatible with most of the equipment that is currently used in the production of checks and other financial forms.

One skilled in the art will appreciate that printer architecture may provide more flexibility than digital press architecture and can be used for other types of applications. One skilled in the art will further appreciate that other types of printers such as an offset press can be used in place of an electronic printer.

One advantage of the printer 102 is that all of the printing occurs while the print medium is in the substantially planer path. The printer 102 does not take the sheet out of that path, and its print medium does not bind or twist around drums or rolls. As discussed above, maintaining a substantially planer path reduces the chance that the print medium becomes deformed and get jammed in the printer 102. Thus, manufacturing efficiency and quality control are increased.

The printer 102 is connected between the first and the second track assemblies 112 and 114. After printing, the printer transports the sheet to the second track assembly 114, which carries the sheet to the stacker 104.

F. Second Track Assembly

Referring back to FIG. 15, the second track assembly 114 is similar to the first track assembly 112. However, the second track assembly 114 does not use an attractive vacuum force to secure the sheet to the six track belts 662. Rather, six upper track belts 672 are positioned above the platen 658, are substantially parallel to the lower six track belts 662, and lay against the lower six track belts 662. The upper six and lower six track belts 672 and 662 form a conveyor for transferring the document from the collator 100 to the printer 102. Frictional forces move the sheet as the six track belts 662 are rotating. The frictional forces also transmit motive power from the six track belts 662 to the six upper track belts 672. The six upper track belts are mounted in a door that lays over platen 658.

In this second track assembly 114, the attractive vacuum force is not necessary and thus the six track belts 662 do not need to define the apertures. Additionally, the base and the blower are not required.

G. Stacker

Figure 20:
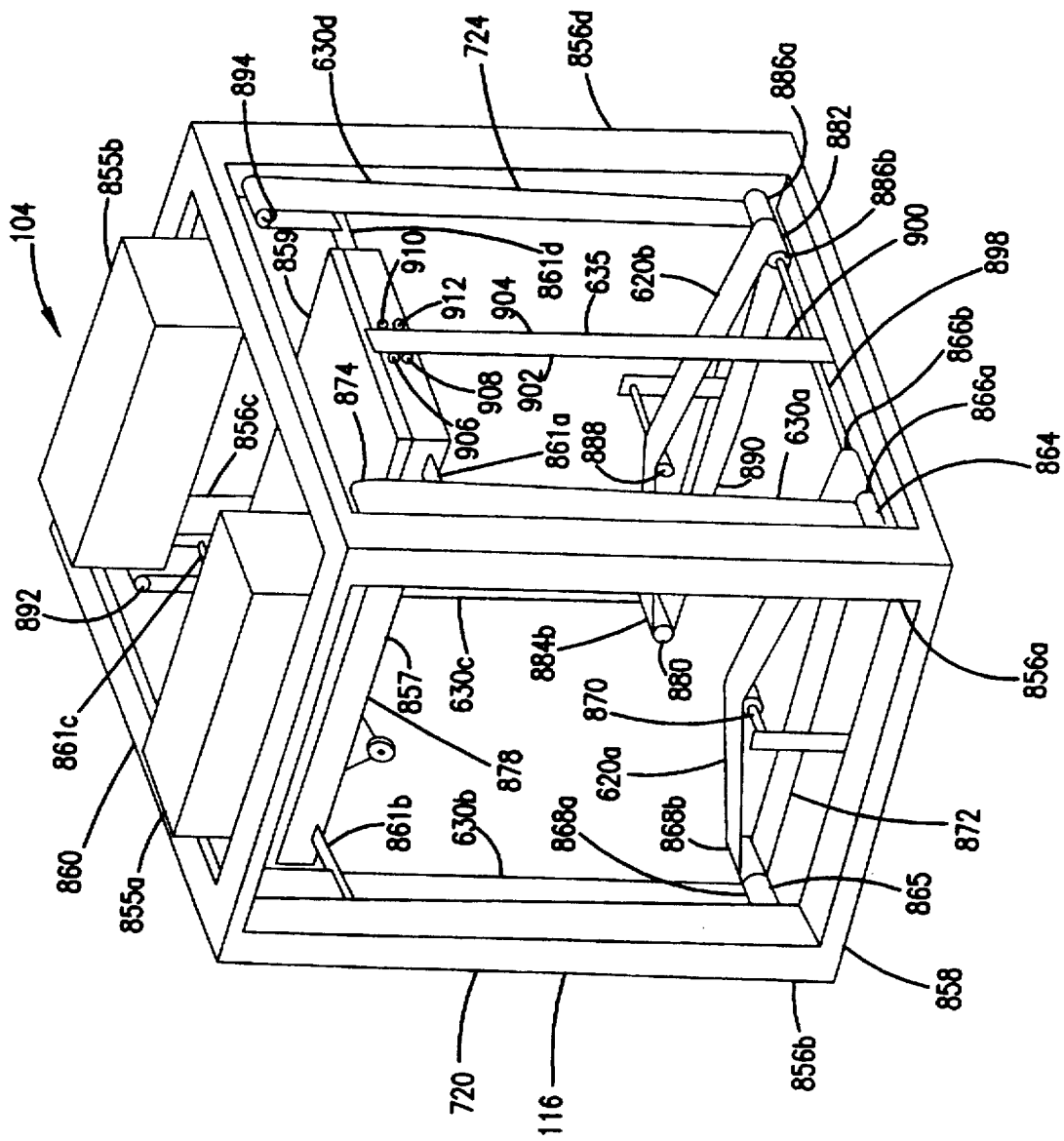
FIG. 20 is an illustration of an elevator assembly that is a component of the stacker module shown in FIG. 1.

Referring now to FIG. 20, stacker 104 has several structures including a frame 720 that forms a support structure, an elevator assembly 724, and paper handling assemblies 855a and 855b. Frame 720 forms base 116 of stacker 104 and includes legs 856a–856d, base unit 858, and top unit 860. Base unit 858 does not have a number between the lower portions of legs 856c and 856d, thereby enabling a dolly 862 to be wheeled into and out of base 116.

Elevator assembly 724 includes a dolly frame 857 for supporting a dolly 859. Dolly frame 857 has four brackets 861a–861d positioned proximate to such of its four corners. The elevator assembly 724 includes a drive mechanism. The drive mechanism includes two belting systems 620a and 620b. Belting system 620a includes first and second lower pulleys 864 and 865, which are operably connected to the lower portions of the legs 856a and 856b, respectively. Pulley 864 has an inner spool 866a and an outer spool 866b. Similarly, pulley 865 has an inner spool 868a and an outer spool 868b. Belting system 620a also includes a first intermediate pulley 870. Drive belt 872 extends around outer spool 866b of pulley 864, outer spool 868b of pulley 865, and first intermediate pulley 870.

First upper pulley 874 and second upper pulley (not shown) are rotatably connected to the upper portion of the legs 856a and 856b, respectively. A first suspension belt 630a is operably connected to inner spool 866a of pulley 864 and extends upward and around first upper pulley 874. The first suspension belt 630a then comes downward where it is operably connected to a bracket 861a of dolly frame 857. A second suspension belt 630b is operably connected to inner spool 868a of pulley 865 and extends upward and around second upper pulley 876. The suspension belt 630b then comes downward where it is operably connected to bracket 861b of dolly frame 857.

In operation, the drive belt 872 rotates, which causes the first and second lower pulleys 864 and 865 to rotate either clockwise or counter clockwise. If the first and second lower pulleys 864 and 865 rotate counter clockwise, they let out first and second suspension belts 630a and 630b, respectively. This action causes a first side ridge 878 of dolly frame 857 to lower. If the drive belt 872 moves in the opposite direction, the first and second lower pulleys 864 and 865 take in the first and second suspension belts 630a and 630b, respectively, and cause the first side edge 878 of dolly frame 857 to raise.

Belting system 620b is substantially identical to belting system 620a. Belting system 620b includes a third lower pulley 880 having an inner spool (not shown) and an outer spool 884b and a fourth lower pulley 882 having an inner spool 886a and an outer spool 886b; second intermediate pulley 888; drive belt 890; third and fourth upper pulleys 892 and 894; and third and fourth suspension belts 630c and 630d, which are operably connected to brackets 861c and 861d, respectively, of dolly frame 857. Additionally, belting system 620b operates in a similar manner to belting system 620a in order to raise and lower second side edge 896 of dolly frame 857. A drive shaft 898 is connected between first and fourth lower pulleys 864 and 882.

As discussed above, motive force is provided by a motor (not shown) that is connected to second intermediate pulley 888 of belt system 620b. When the motor shaft rotates, it causes the second intermediate pulley 888 to rotate and move drive belt 890. Drive shaft 898 transmits motive power from fourth lower pulley 882 to first lower pulley 864 and activates first belting system 620a.

Dolly 859 forms a platform and is loaded on dolly frame 857 so that when suspension straps 630a–630d raise dolly frame 857, dolly 859 is also raised. When loaded on the dolly frame 857, the dolly 859 is located symmetrically in the center of the four suspension belts 630a–630d. The dolly 859 is positioned in this way to suspend the loading, which may not be centered on the dolly 859. If the dolly frame 857 was not suspended at its corners and the load is not centered, the dolly 859 may have a tendency to tip. Suspending the frame 857 at its corners minimizes this tendency to tip.

Additional stability for the dolly frame 857 and dolly 859 is provided by track structure 635. Track structure 635 includes a beam or rail 900 that is substantially vertical and extends from the upper portion of frame 720 to the base unit 858 of frame 720. Beam 900 has a first V-shaped edge 902 and a second V-shaped edge 904. First wheel 906 is operably connected to the dolly frame 857 and has a V-shaped groove (not shown) along its edge that engages first V-shaped edge 902 of beam 900. A second wheel 908 is substantially similar to first wheel 906 and also engages first V-shaped edge 902 of beam 900. Third and fourth wheels 910 and 912 are substantially similar to first wheel 906 and engage second V-shaped edge 904 of beam 900.

Figure 21:
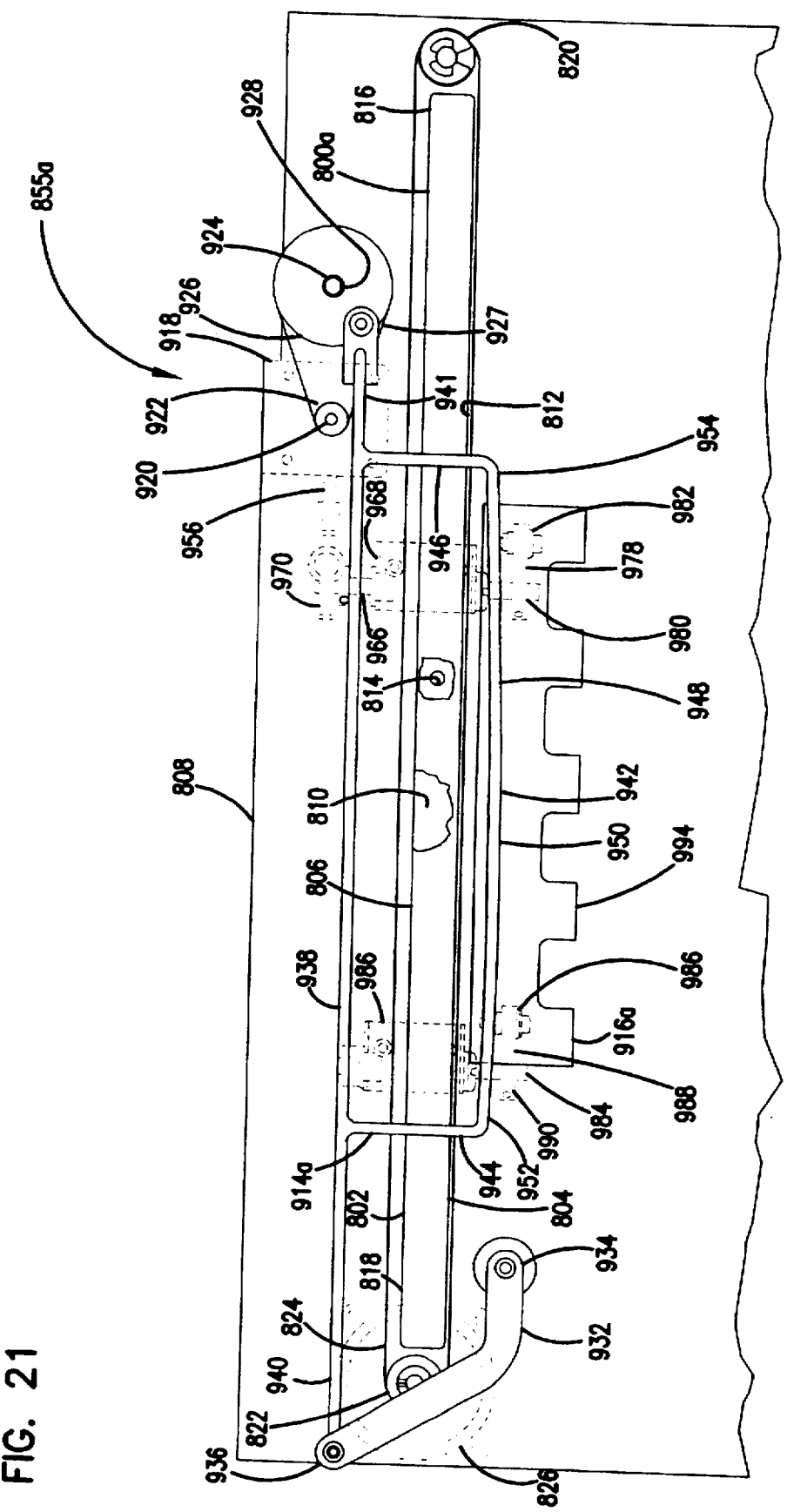
FIG. 21 illustrates a side view of a paper handling assembly that is shown in FIG. 20.
Figure 22:
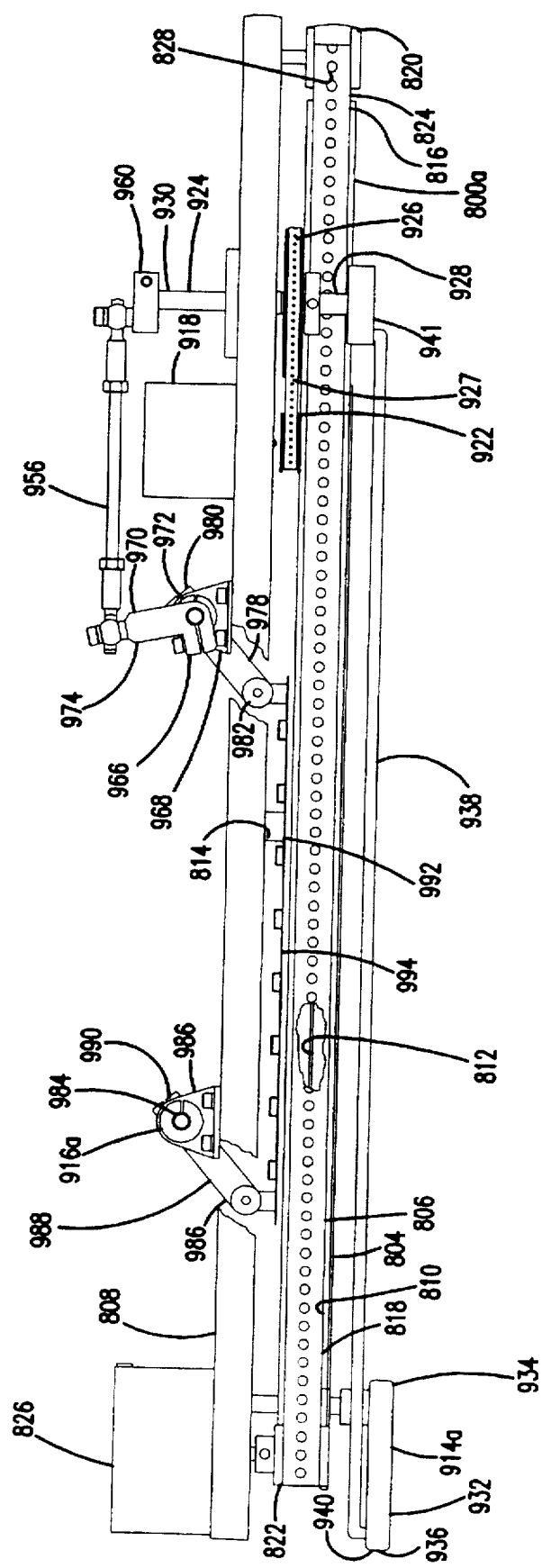
FIG. 22 illustrates a top view of the paper handling assembly shown in FIGS. 20 and 21.

Referring to FIGS. 21 and 22, the paper handling assembly 855a includes an inverted-conveyor assembly 800a, a rocker or recirculating assembly 914a, and a jogging assembly 916a that are substantially similar to one another. Inverted-conveyor assembly 800a includes an elongated tubular member or manifold 802 that has a lower surface 804, an upper surface 806, and has a square profile. Elongated tubular member 802 is mounted on backing plate 808. Additionally, elongated tubular member 802 defines a cavity 810 and a slot 812 that extends along a substantial portion of the elongated tubular member 802 and passes from the cavity 810 to the lower surface 804. Elongated tubular member 802 also defines a main port 814 that is in fluid communication with an air compressor, not shown.

Elongated tubular member 802 has two oppositely disposed ends 816 and 818. First and second rollers 820 and 822 are rotatably connected to backing plate 808 and positioned proximal to oppositely disposed ends 816 and 818, respectively. Conveyor belt 824 extends around first roller 820, along top surface 806, around second roller 822, and along lower surface 804. The conveyor belt 824 has a lower portion that defines a bottom surface and extends along the lower surface 804 of elongated tubular member 802. The bottom surface of the conveyor belt 824 is proximate the substantially planer path in which the sheets travel.

A stepper motor 826 is connected to first roller 820 and provides motive force to rotate first roller 820 and hence conveyor belt 824. Operation of stepper motor 826 and rotation of the conveyor belt 824 are described in more detail below.

Conveyor belt 824 defines a plurality of perforations or openings 828 that extend along substantially the entire length of conveyor belt 824. Perforations 828 are adjacent to and in alignment with slot 812 when they are proximate the lower surface 804 of elongated tubular member 802. Thus, conveyor belt 824 substantially blocks slot 812, except for the perforations 828. The air compressor draws air from the cavity 810 via main port 814. Drawing air from cavity 820 forms a vacuum at the perforations 828 that are adjacent to the slot 812.

Inverted-conveyor assembly 800a cooperates with rocking assembly 914a, which separates the suspended sheet from the conveyor belt 824. Referring to FIGS. 19 and 20, rocking assembly 914a includes a stepper motor 918 that is mounted on backing plate 808. Stepper motor 918 has a drive shaft 920 that projects through backing plate 808. A drive sprocket 922 is mounted on drive shaft 920. A secondary shaft 924 projects through backing plate 808 and can rotate. A pulley 926 is mounted on one end 928 of secondary shaft 924 and a belt 927 wraps around drive sprockets 922 and pulley 926. A cam 960 is mounted on an oppositely disposed end 930 of secondary shaft 924.

A lever 932 has a lower or first end 934 pivotally connected to back plate 808 and an upper or second end 936 that can pivot accurately around the lower end 934. A recirculation member is connected between a cam 960, which forms a crank, and the lever 932. The recirculating member includes a cross member 938 having a first end 940 operably connected the upper end 936 of the lever 932 and a second end 941 operably connected to the pulley 926 proximate its circumference. A stripper bar 942 has first, second, and third portions 944, 946, and 948, respectively. First portion 944 is operably connected to cross member 938 and extends downward. Second portion 946 is operably connected to cross member 938 and extends downward. Third portion 948 has a lower edge, extends between the lower end of first portion 944 and the lower end of second portion 946, and is positioned below cross member 938. The lower edge of third portion 948 is slightly arcuate so that its middle portion 950 is slightly lower than its end portions 952 and 954.

In operation, stepper motor 918 causes drive sprocket 922, belt 927, and pulley 926 to rotate. As pulley 926 rotates, it moves the first end 940 of cross member 938 in a circular motion. As a result, cross member 938 moves up and down as well as laterally. Second end 941 of cross member 938, which is connected to lever 932, moves along an arcuate path. When the cross member 938 is in its upper most position, the third portion 948 of the stripper bar 942 is positioned above the lower surface 804 of the elongated tubular member 802. When cross member 938 is in its lowest position, third portion 948 of stripper bar 942 is below the bottom surface 804 of elongated tubular member 802.

Movement of the cross member 938 and stripper bar 942 is synchronized with movement of the conveyor belt 824. When third portion 948 of stripper bar 942 is above the lower surface 804 of the elongated tubular member 802, the conveyor belt 824 makes one complete cycle so that it transports a sheet from the second output track 114 to the end of the substantially planer path. After the sheet is at the end of the substantially planer path, the cross member 938 moves downward to its lowest position, which causes the third portion 938 of the stripper bar 942 to drop below the conveyor belt 824. This action separates the sheet from the attractive vacuum force described above. The sheet then falls onto a stack on dolly 859.

The rocking assembly 914a provides a sinusoidal reciprocating motion for the third portion 948. The curvature in the third portion 938 of the stripper bar 942 works in concert with this sinusoidal reciprocating motion to create a smooth rolling line of contact between the third portion 938 and a top surface of the sheet being held against the conveyor belt 824 by the attractive vacuum force. As a result, a smooth removal of the sheet is achieved without introducing a wave front or a shock wave in either the lateral or the travel directions of the sheet. The sheet remains substantially flat as it is stripped and remains substantially flat until it is in the vicinity of the top of the stack.

Maintaining the sheet in a substantially flat position improves the quality of jogging, discussed below, by allowing more contact along the edges of the sheet. By keeping the sheet under control, the jogging assembly 916a has a better line of contact with the edges of the sheet.

Jogging assembly 916a helps to place the sheet squarely on top of the stack on dolly 859 and includes a first vertical shaft 966 mounted to back plate 808 by bracket 968. An upper lever 970 has one end 972 attached to first vertical shaft 966 and an opposite end 974 projecting radially outward. Linkage 956 is connected between opposite end 974 of upper lever 970 and cam 960. A lower lever 978 also has one end 980 connected to first vertical shaft 966 and an opposite end 982 radiating outward. The upper and lower levers 970 and 978 are radially oriented to one another at an obtuse angle.

A second vertical shaft 984 is mounted to back plate 808 by bracket 986. A lever 988 has one end 990 connected to second shaft 984 and an opposite end 986 radiating outward. Lever 988 is oriented so that it is substantially parallel to lower lever 978. A rod 922 is connected between lower lever 978 and opposite end 986 of lever 988. Brush 994 is operably connected to rod 992 and extends downward.

As pulley 926 rotates to move the rocking assembly 914a, it causes secondary shaft 924 and cam 960 to also rotate. As the cam 960 rotates, it moves linkage 956 back and forth in a lateral direction. This action drives upper lever 970 back and forth, which rotates first vertical shaft 966 and causes lower lever 978 to rotate. The opposite end 982 of lower lever 978 moves along an arcuate path and causes rod 992 and brush 994 to move away from the back plate 808. Lever 988 moves in a similar manner to lower lever 978. As brush 994 continues to move away from the back plate 808, it comes into contact with the edge of the sheet that fell from the conveyor belt and pushes the sheet into alignment with the stack of previously fallen sheets. As cam 960 continues to rotate, it causes the first and second vertical shafts 966 and 984 to move in the opposite direction, which causes rod 992 and brush 994 to move away from the back plate.

Figure 23:
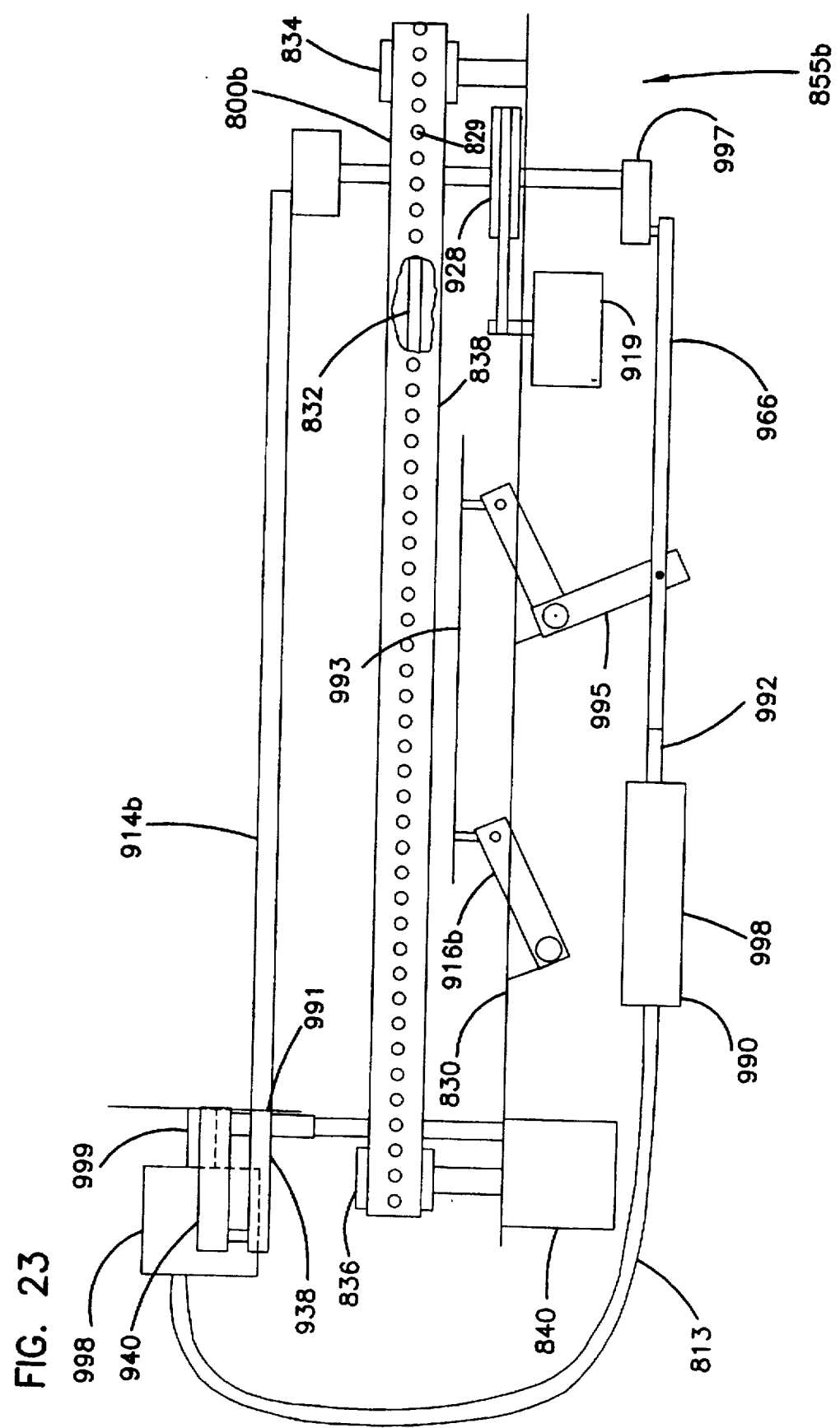
FIG. 23 illustrates a partial top view of another paper handling assembly shown in FIG. 20.

Paper handling assembly 855b is substantially similar to paper handling assembly 855a and includes inverted-conveyer assembly 800b, rocking assembly 914b, and jogging assembly 916b. Referring to FIG. 23, the primary difference relates to jogging assembly 916b, which has a linkage 966, a cam 997, a brush 993, an upper lever 995, a stepper motor 919, and a pulley 925. Jogging assembly 916b includes pump 998 mounted on a back plate 830. Pump 988 has a cylinder 990 and a piston 992. Linkage 996 is connected between piston 992 and cam 997. Linkage 996 is also connected to upper lever 995 at a point between piston 992 and cam 997. A hose 813 provides fluid communication between piston 992 and a secondary cylinder 998, which is engaged by secondary piston 999. A secondary brush 991 is mounted on secondary piston 999.

As linkage 996 is being pushed, it causes pump 998 to force a gas into secondary cylinder 998. Secondary piston 999 then moves outward and presses secondary brush 991 against a leading edge of the fallen sheet and aligning it with a leading edge of the stack of previously fallen sheets on the dolly 859.

Brush 993 and secondary brush 991 cycle out of phase with one another. Thus, secondary brush 991 is withdrawn from the leading edge of the sheet when brushes 993 and 994 are in contact with the side edges of the sheet. Similarly, secondary brush 991 is in contact with the leading edge of the sheet when brushes 993 and 994 are withdrawn from the side edges of the fallen sheet of paper.

Additionally, secondary stepper motors 918 and 919 are each linked to the control system and are synchronized to one another, which keeps rocking assemblies 914a and 914b in sync. In order to maintain stepper motors 918 and 919 in synch, pulleys 926 and 925 each include a halo-affect sensor and magnet combination (not shown), which the control system senses to determine when the pulleys 926 and 925 reach a home position.

If one of the pulleys 926 or 925 does not reach its home position at the appropriate time, stepper motor 918 or 919, respectively, will seek to put the pulley 926 or 925, respectively, into its home position and in synch with its corresponding pulley 925 or 926, respectively. Only one cycle is interrupted if the pulleys 926 and 925 are immediately synchronized. As a result, there is not any cumulative effect of running the pulleys 926 and 925 out of synch. The drive pulleys can become out of sync if something physically interrupts the motion of either rocking assembly 914a or 915b or the motion of either of the jogging assemblies 916a or 916b.

Inverted-conveyor assembly 800b of paper handling system 855b is substantially similar to inverted vacuum conveyor 800a and includes a backing plate 830, elongated tubular member 832, rollers 834 and 836, conveyor belt 838 with perforations 829, and stepper motor 840. Inverted vacuum assemblies 800a and 800b are substantially parallel to one another so that they can transport oppositely disposed edges of the print medium. Additionally, the distance between inverted vacuum assemblies 800a and 800b is adjustable so that the stacker 104 can accommodate different sizes of sheets. The distance is adjusted by sliding backing plate 830, which is mounted on a carriage, of inverted vacuum assembly 800b toward or away from inverted vacuum assembly 800a.

In use, a sheet of the print medium travels along the planer path, is fed out of the second track assembly 114, and is positioned proximate the perforations 828 and 829 of conveyor belts 824 and 838, respectively. The vacuum formed adjacent to the perforations 828 and 829 forms an attractive force that secures the sheet against the conveyor belts 824 and 838 as it is fed from the second track assembly 114 and suspends the sheet so that it essentially stays in the substantially planer path. As the conveyor belts 824 and 838 rotate, they transport the sheet to the end of the substantially planer path at which time stepper motors 826 and 840 stop rotating.

When the stepper motors 826 and 840 and the conveyor belts 824 and 838 stop rotating, the sheet is suspended over the dolly. The sheet is then caused to separate from the vacuum formed along the perforations 828 and 829 of the conveyor belts 824 and 838, respectively, and falls into a stack on the dolly. The stepper motors 826 and 840 go through one complete cycle when driving the conveyor of belts 824 and 838 and transporting a sheet. During that cycle, the conveyor belts 824 and 823 move the sheet from the second track assembly 114 to the end of the substantially planar path.

At the beginning of the cycle, the stepper motors 826 and 840 drive the conveyor belts 824 and 838, respectively, at a beginning speed that is approximately 10% faster than the speed of the second track assembly 114. The stepper motors 826 and 840 then ramp up to a higher speed, which widens the gap between the sheets. The speed of the stepper motors 826 and 840 then ramp down to a complete stop at the end of the cycle. Widening the gap between the sheets, as described above, provides time to position the sheet over the stack, release it from the attractive vacuum force, and allow it to fall onto the stack.

The stepper motors 826 and 840 are both linked to the control system, which controls the motors' 826 and 840 acceleration, speed, and deceleration. Additionally, the stepper motors 826 and 840 are controlled in sync so that the conveyor belts 824 and 838 are driven at substantially the same speed.

Although only three modules are described in particularity, one skilled in the art will realize that other modules can be used in addition to or in place of the collator, printer, and stacker. Examples include a post collator, a slave collator, and a finishing machine.

H. Control System

Figure 24:
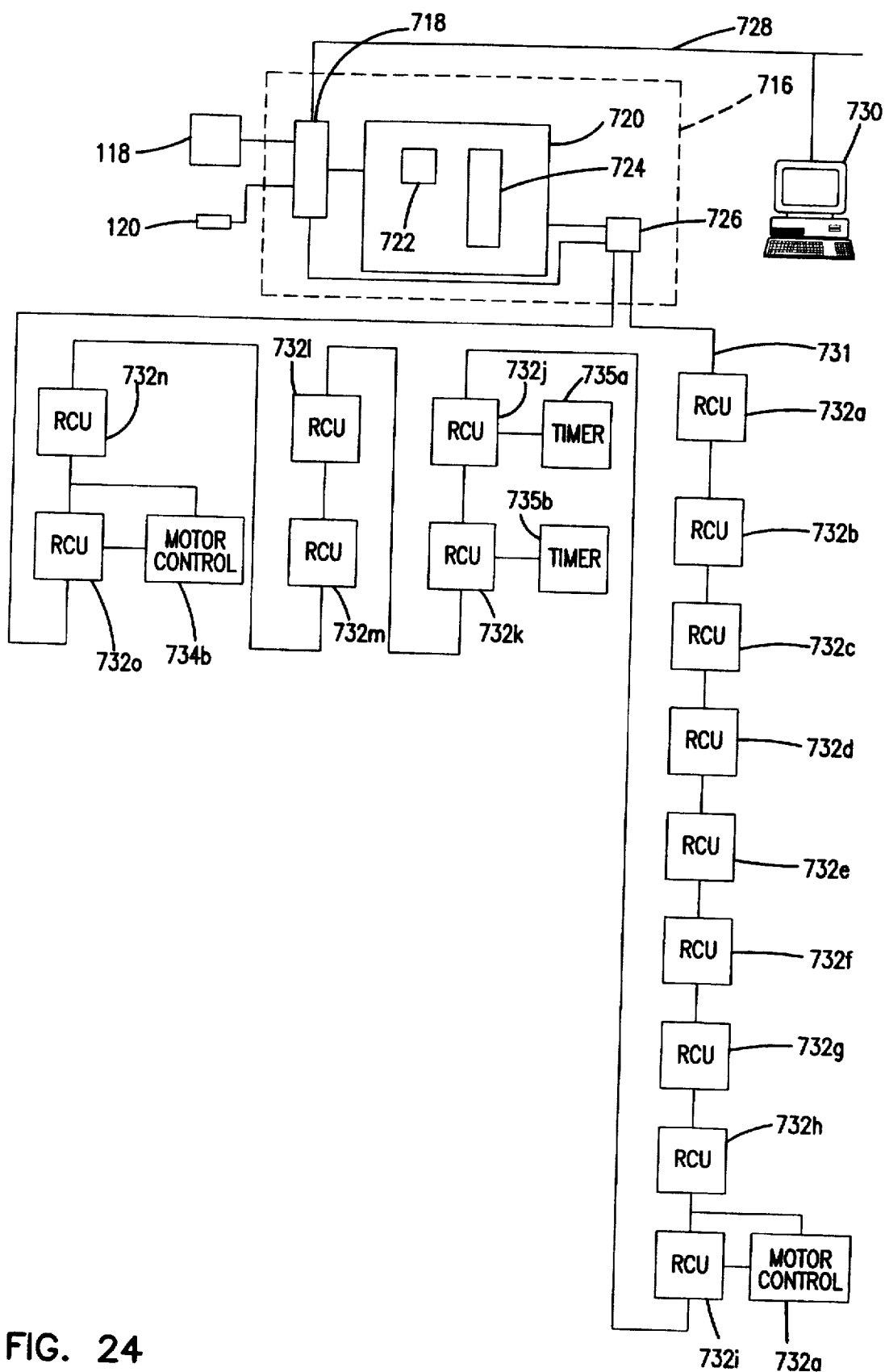
FIG. 24 is a functional block diagram of the programmable controller.

Referring to FIG. 24, the programmable controller includes a central control unit 716, a plurality of remote control units 732a–732o, motor-control daughter boards 734a and 734b, and timer daughter boards 735a and 735b. The central control unit 716, which is a system controller, can be implemented using an IBM-compatible personal computer having a microprocessor 718, which is a first processor, and a coprocessor board 720. Coprocessor board 720 includes a co-microprocessor 724, which is a second processor, and RAM 722. The microprocessor 718 and co-microprocessor 724 communicate through RAM 722. The control unit 716 also includes a serial communication controller 726 that is linked to both the microprocessor 718 and the coprocessor board 720. The serial communication controller 726 provides a communication interface between the central control unit 716 and a daisy chain-type local area network (daisy chain network) 731. Additionally, touch screen 118 and floptical disk drive 120 are communicatively linked to microprocessor 718 and provide a user interface for central control unit 716.

The microprocessor 718 allows an operator to create and edit jobs for running on the printing system described herein. Additionally, microprocessor 718 creates and rasterizes print images that are printed by printer 100. The print images are created from format and image data that can be input from the system manager 730 or downloaded from remote sites such as customer locations.

Co-microprocessor 724 performs real-time functions, can be implemented using a 80188 type coprocessor, and receives sequence table and retainer configuration information from the microprocessor 718. Co-microprocessor 724 uses this information to schedule picks from the various retainers 106a–106h. Additionally, the co-microprocessor 724 determines error recovery strategies, generates error recovery signals, and records mechanical performance. Examples of errors to which the co-microprocessor 724 will respond include an empty retainer, a failure to pick a sheet from a retainer, a jammed sheet, overlapping sheets were picked from a retainer, a retainer is holding the incorrect type of sheets, and the sheets are improperly positioned within the retainer.

Remote control units (RCU) 732a–732o and motor-control daughter boards 734a and 734b are coupled to the daisy chain network 731. RCUs 732a–732i form a collator controller and are physically located in the collator 100. RCUs 732a–732h control the elevator assemblies 176a–176h, respectively, and pick mechanism assemblies 180a–180h, respectively. RCU's 732j and 732k control the first and second stepper motors 1036 and 1038, respectively. RCU 732i controls track assembly 112, vertical track 532 of the collator 100, and the carriage motor 1012. Control of the carriage motor 1012 is via the servo controller. RCUs 732l and 732m form a printer controller and provide control for the printing mechanisms in the printer 102. RCUs 732n and 732o form a stacker controller and provide control for the stacker 104. The central control unit 716, RCUs 732a–732o, motor-control daughter boards 734a and 734b, and the timer daughter boards 735a and 735b form the programmed controller.

In an alternative embodiment, the carriage motor 1012 could be a stepper motor that is directly controlled by an RCU. In this alternative embodiment, the servo controller is not required and the third sensor 1084 would directly interface with the RCU.

An advantage of this architecture is that each retainer 106a–106h (i.e., each pick mechanism assembly 180a–180h and associated elevator assembly 176a–176h) is controlled by a separate RCU 732a–732h and can function independently. The collator 100 does not have to pick sheets from all of the retainers simultaneously and the level of the paper trays 190 within the retainers can be independently adjusted. As a result, the collator 100 can pick sheets from various retainers 106a–106h in a variety of different sequences. For example, the collator 100 could repeatedly pick sheets from a single retainer, pick sheets from a first retainer until it is empty and then pick sheets from a second retainer, pick sheets from alternate retainers, pick sheets from specified retainers in a predetermined sequence.

Because the level of the paper trays 190 can be independently adjusted, another advantage is that a single collator can be configured with retainers having different capacities. For example, the collator 100 might have some retainers having a 500-sheet capacity and some retainers having a 1000-sheet capacity.

The motor-control daughter board 734a is linked to both the daisy chain network 731 and RCU 732i. As described in more detail below, the motor-control daughter board 734a provides control for track motor 556 and provides an interface for the sensors located in first output track assembly 112. Similarly, motor-control daughter board 734b is linked to RCU 732m and the daisy chain network 731. Motor-control daughter board 734b provides control for the motor (not shown) that drives elevator assembly 714 in the stacker 104. Timer daughter boards 735a and 735b are linked to RCUs 732j and 732k, respectively.

Additionally, central control unit 716 is coupled to a local area network 728, which can be any type of conventional network. A system manager 730 is also linked to local area network 728. System manager 730 is an IBM compatible personal computer, which monitors and controls multiple printing systems as described herein. System manager 720 also provides snapshots of the current status of various modules such as the collator 100, printer 102, stacker 104. Additionally, the system manager 730 generates job lists and allows users to create and edit collation sequences, printer jobs, images for printing, and fonts. Another advantage of system manager 730 is that it can be configured to display mechanical performance statistics of the various modules and also efficiency statistics of operators.

Figure 25:
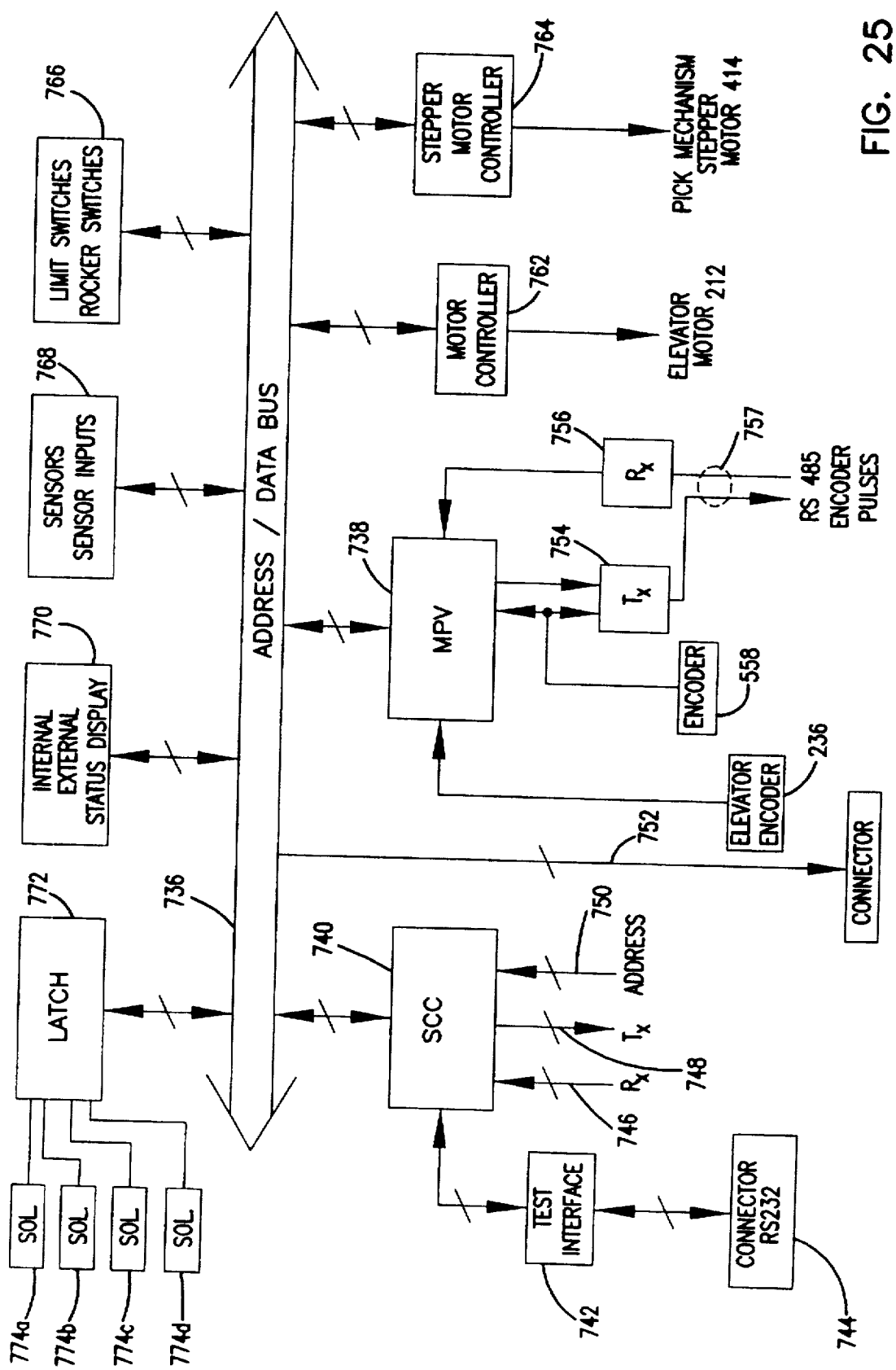
FIG. 25 is a functional block diagram of a remote control unit shown in FIG. 24.

Referring to FIG. 25, RCU 732a includes a serial communication controller (SCC) 740, a microprocessing unit 738, a motor controller 762, a stepper motor controller 764, a sensor interface 768, a switch interface 766, external/internal status display 770, a latch 772 and interface circuitry for solenoids 774a–774d, a connector 752 for either a motor-control daughter board 734a or 734b or a timer daughter board 735a or 735b, and an address/data bus 736.

SCC 740 provides an interface to daisy chain network 731, which includes a receive twisted pair 746, a transmit twisted pair 748, and an address bus 750. SCC 740 is linked to test interface 742. Test interface 742 provides an interface for test equipment and communicates according to the RS 232 protocol. Test equipment can be connected to connector 744. As will be described in more detail below, daisy chain network 731 includes a third twisted pair 757 for transmitting track encoder pulses. One type of SCC that can be used is model 85C30, which operates at 8 MHz.

Microprocessing unit 738 is linked to the address/data bus 736 and includes a microprocessor such as an 80188 model, a 32K×8 static RAM, and a programmable readable memory. Microprocessing unit 738 provides processing power for RCU 732a and includes a microprocessor (not shown), a static RAM (not shown), and a PROM (not shown). Elevator motion encoder 236 is linked to microprocessing unit 738. In the case of RCU 732i, track encoder 558 is linked to both the microprocessing unit 738 and driver 754. Driver 754 and receiver 756 provide an interface between microprocessing unit 738 and the third twisted pair 757. Third twisted pair 757 provide a dedicated communication link for transmitting encoder pulses from the track encoder 558 to the central control unit 716 and the RCUs 732a–732h in the collator 100. In this configuration, the encoder pulses a communication without being delayed by other messages that are being transmitted along the daisy chain network 731.

Motor controller 762 and stepper motor controller 764 are linked to the address/data bus 736, but are optically isolated. Motor controller 762 is linked to and controls motor 212 of elevator assembly 176a. One type of motor controller that can be used is model 33033 for controlling a brushless DC motor. Stepper motor controller 764 is linked to and controls stepper motor 414 of pick mechanism assembly 180a. One type of stepper motor controller that can be used is model L297.

Switch interface 766 is linked to the address/data bus 736. The switches that are connected to switch interface 766 include upper and lower limit switches 206 and 208, safety switches 210a–210d, and rocker switches (not shown). Each elevator assembly 176a–176h has an associated pair of rocker switches that an operator can use to move the elevator assembly 176a–176h up or down.

Sensor interface 768 is linked to address/data bus 736. Paper sensors 203 and 428, multi-item detector 432, and hall-effect sensor 424 are connected to sensor interface 768.

Internal/external status display 770 is linked to the address/data bus 736, driven by an octal flip flop (not shown), and enabled by an 8-bit latch (not shown). Internal/external status display 770 includes an internal set of eight light-emitting diodes (not shown) and an external set of eight light-emitting diodes (not shown). Both sets of diodes are arranged in a vertical bar graph and display identical codes that a technician can use for diagnostic purposes. The external set of diodes are visible to an operator. The internal set of diodes are mounted directly on the RCU circuit board.

Figure 26:
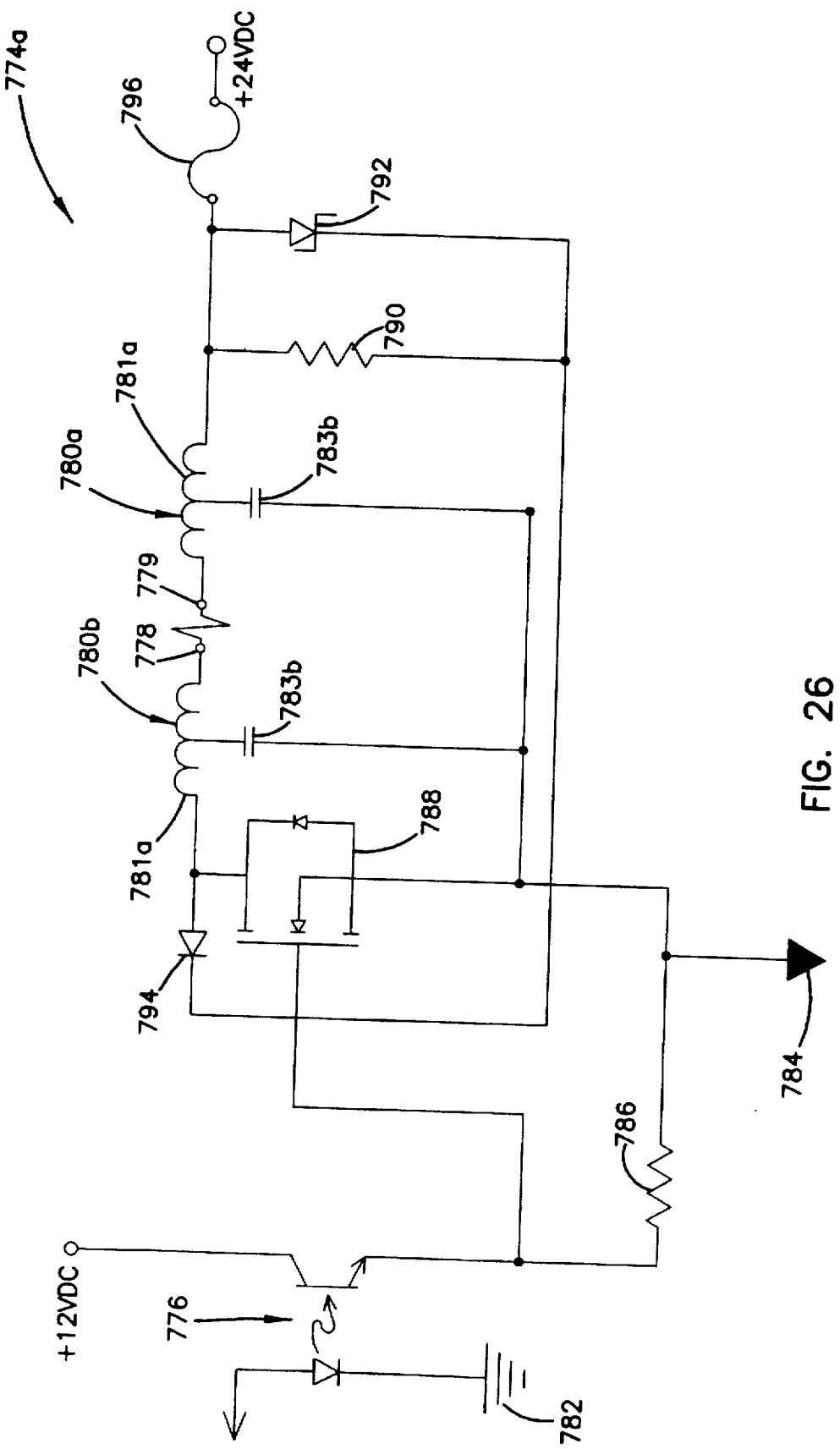
FIG. 26 is a functional block diagram of solenoid circuitry shown in FIG. 25.

Latch 772 is linked to address/data bus 736 and provides an interface to solenoid control circuits 774a–774d, each of which are substantially similar and control a separate solenoid. Referring to FIG. 26, solenoid control circuit 774a isolates solenoid 778 between first and second T-type EMI suppression filters (suppression filters) 780a and 780b. Inductive coil 781a of the first suppression filter 780a provides a path from a 24 volt DC power supply to a first terminal 779 of solenoid 778. Inductive coil 781b provides an electrical path from a second terminal 777 of solenoid 778 to the drain of N channel enhancement-mode MOSFET transistor (MOSFET transistor) 788. The source of MOSFET transistor 788 is connected to a ground plane 784 that is separate and isolated from the system ground 782. The gate of MOSFET transistor 788 is connected to an emitter of an optical isolator 776. A resistor 786 provides an electrical path between the emitter of optical isolator 776 and the ground plane 784. First suppression filter 780a also includes a capacitor 783a that is linked between inductive coil 781a and the ground plane 784. Similarly, second suppression filter 780b has a capacitor 783b that is connected between inductive magnetic coil 781b and the ground plane 784. Diode 794, resistor 790, and zener diode 792 provide voltage and current regulation for solenoid 778. The 24 volt power supply is isolated by fuse 796.

In order to activate solenoid 778, microprocessing unit 738 will send a signal to latch 772 via the address/data bus 736. Latch 772 will activate optical isolator 776, which will create a voltage difference between the gate and source of MOSFET transistor 788. The voltage difference will close the circuit between second suppression filter 780b and the ground plane 784. As a result, current will flow from the 24 volt DC power supply through inductive magnetic coil 781a, solenoid 778, and inductive magnetic coil 781b. Capacitors 783a and 783b will simultaneously become charged. This configuration and operation of first and second suppression filters enable solenoid 778 to actuate quicker than if the solenoid 778 was connected directly between the 24 volt power supply and the ground plane 784.

RCUs 732a–732o are detachably mounted programmable circuits. RCUs 732b–732o are substantially similar to RCU 732a. Additionally, motor-control daughter board 734a is connected to connector 752 of RCU 732i in the collator 100. Motor-control daughter board 734b is connected to connector 752 of RCU 732o in the stacker 104. Timer daughter boards 735a and 735b are similarly connected to RCUs 732j and 732k, respectively.

Figure 27:
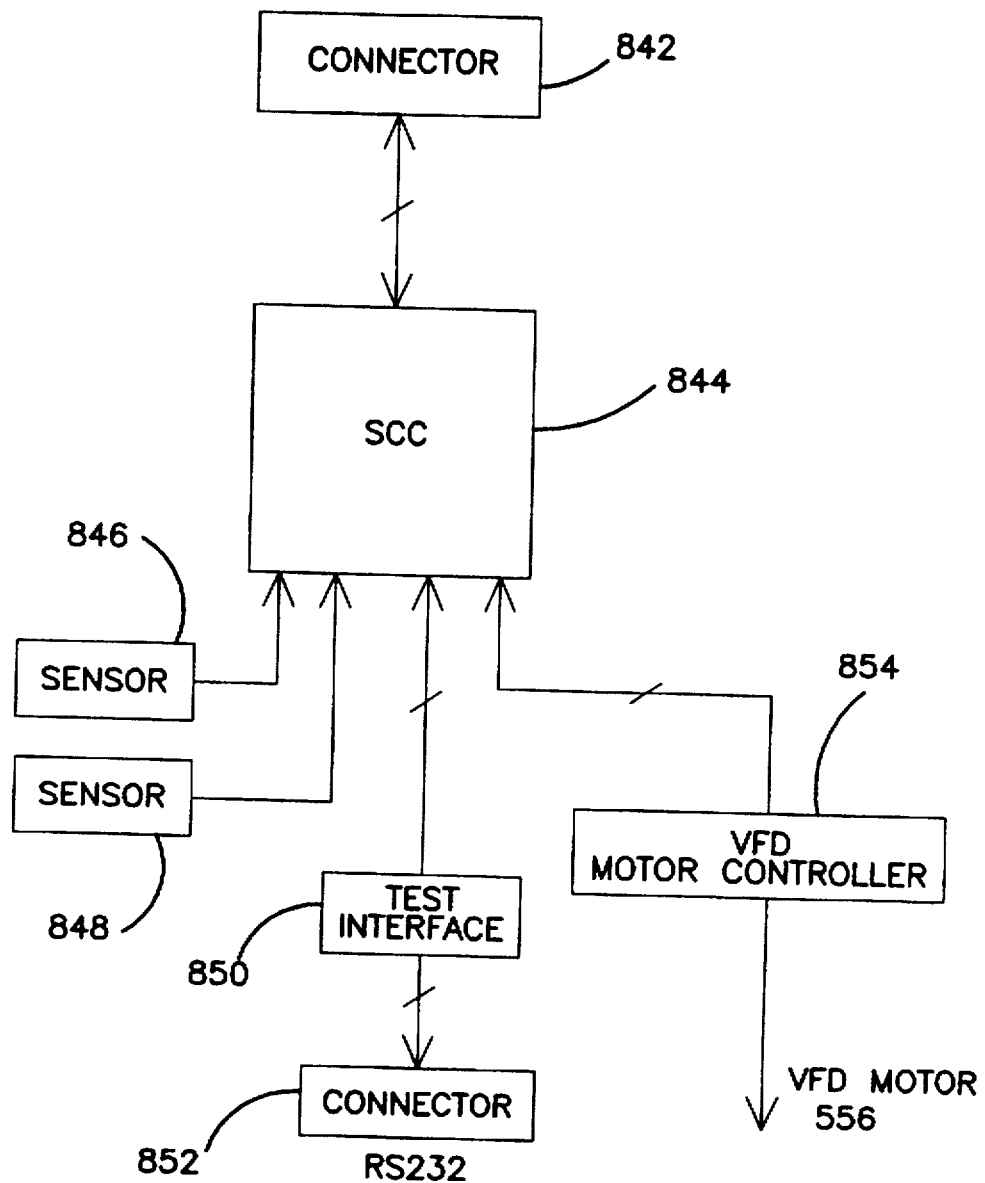
FIG. 27 is a functional block diagram of a motor-control daughter board shown in FIG. 24.

Referring now to FIG. 27, motor-control daughter board 734a includes a connector 842, an SCC 844, a variable frequency drive (VFD) motor controller 854, a test interface 850, and a connector 852. Main connector 842 is configured to interface with connector 752 of remote control unit 732i and is linked to serial communication controller 844. Serial communication controller 844 provides an interface between the remote control unit 732h and the VFD motor controller 854, test interface 850, and paper sensors 674, 706, and 708 and scanning device 678 that are located in first track assembly 112. VFD motor controller provides control of track motor 556. Test interface 850 is linked to connector 852 and provides an interface to test equipment. Test interface 850 provides communication according to the RS 232 protocol.

Motor-control daughter board 734b is substantially similar to motor-control daughter board 734a and controls the elevator motor of stacker 104. Motor-control daughter board 734b is not described in detail for purposes of brevity and clarity.

Figure 28:
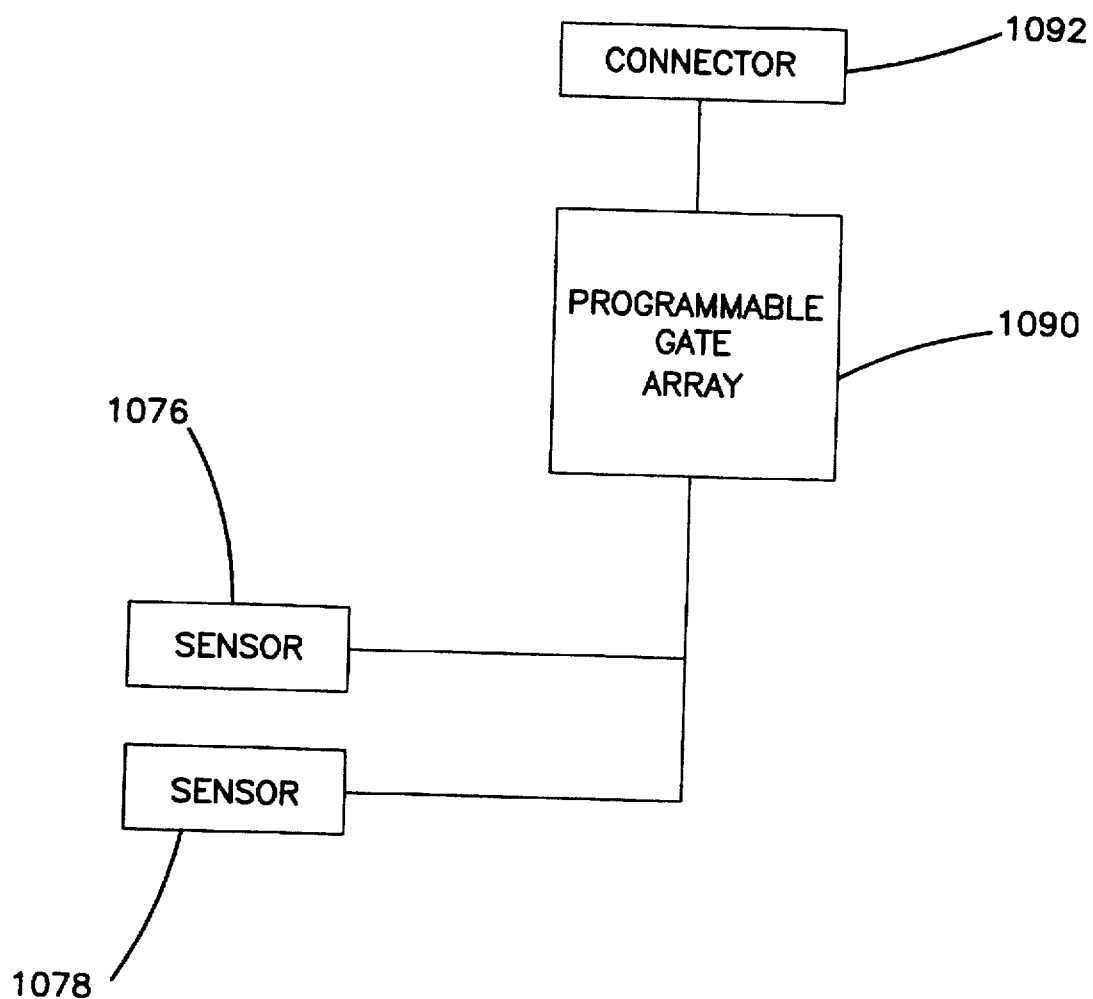
FIG. 28 is a functional block diagram of a timer daughter board shown in FIG. 24.

Referring to FIG. 28, the timer daughter board 735a includes a programmable gate array 1090 that is linked to a connector 1092. The connector 1092 is attached to connector 752 of RCU 732j. One type of programmable gate array that can be used is chip number ISPLSI 1016, which is manufactured by Lattice Corporation. In turn, the first and second sensors 1076 and 1078 are linked to the programmable gate array 1090. The timer daughter board 735b is substantially identical to the timer daughter board 735a and is also similarly linked to the first and second sensors 1076 and 1078.

The timer daughter boards 735a and 735b perform substantially identical functions and operate in parallel. When either the first or second sensor 1076 or 1078 detects the leading edge, it generates a signal that is detected by the programmable gate array 1090. In response to the signal, a counter internal to the programmable gate array 1090 begins to count. The counter continues to count until either the other sensor 1078 or 1076 detects the leading edge of the sheets and generates a signal or the counter overflows.

The programmable gate array 1090 is configured to operate on a 2 MHz clock. In contrast, RCUs 732j and 732k operate on a 4 MHz clock and thus increment the first and second stepper motors 1036 and 1038 on that basis. Thus, the count made by the programmable gate array 1090 corresponds to only half the number of steps made by the first and second stepper motors 1036 and 1038 and one half the time interval between triggering the first and second sensors 1076 and 1078.

Once the counter stops counting, the programmable gate array 1090 sends an interrupt signal to the RCUs 732j and 732k and then communicates the count to the RCUs 732j and 732k. The RCUs 732j and 732k use this information to calculate the change in speed and phase of the first and second stepper motors 1036 or 1038, respectively, required to rotate the sheet and correct the angular error.

RCU's 732j and 732k then adjust the speed and phase of the first and second stepper motors 1036 and 1038, respectively, until the angular error of the sheets is corrected. Once the leading edge of the sheet is substantially perpendicular to the path, the RCU's 732j and 732k return the first and second stepper motors 1036 and 1038, respectively, to their default speed.

When correcting angular error, RCU 732j will increase the speed of the first stepper motor 1036 and RCU 732k will decrease the speed of the second stepper motor 1038 if the second sensor 1078 detects the leading edge before the first sensor 1076. Similarly, RCU 732j will decrease the speed of the first stepper motor 1036 and RCU 732k will increase the speed of the second stepper motor 1038 if the first sensor 1076 detects the leading edge of the sheet before the second sensor 1078 detects the leading edge. The RCU's 732j and 732k will not adjust the speed and phase of the first and second stepper motors 1036 and 1038, respectively, if there is not a detectable time interval between the moments that the first and second sensors 1076 and 1078 detect the leading edge of the sheet.

An advantage of this architecture is that all of the calculations are accomplished in the time domain, which negates the need to convert the count to distance. Another advantage is that the count does not need to be divided by two in order to determine the velocity change required by each of the stepper motors 1036 and 1038. The reason that dividing the count is not required is that the clock speed of the programmable gate array is half that of the RCUs 732j and 732k. The count only corresponds to one half the steps made by the stepper motors 1036 and 1038 and thus one half the angular error of the sheet. Thus, the number of mathematical operations required by the RCUs 732j and 732k is reduced.

Reducing the number of required calculations in turn reduces the response time of the RCUs 732j and 732k. Thus, the delay between detection of the leading edge of the sheets and speed and phase adjustment of the first and second stepper motors 1036 or 1038 is minimized and angular error of the sheet is adjusted very quickly. Such a quick response time is very important when the sheets are being transported along the path very quickly and there is only a short time period in which the sheet engages the registration system 1000.

Although adjusting the speed of both the first and second stepper motors 1036 and 1038 is discussed, it is contemplated that angular error could also be corrected by adjusting the speed of only one of the stepper motors 1036 or 1038.

Appendix A sets forth additional detail regarding operation software that can be implemented in the programmable controller and that can control error detection and recovery. Appendix B sets forth additional detail regarding circuitry that can be used for remote control units 732a–732m. Appendix C sets forth circuitry that can be used for motor-control daughter boards 734a and 734b. Appendix D sets forth code that can be used to program the programmable gate array 1090 if chip number ISPLSI 1016 is used.

Those skilled in the art will readily recognize that these and various other modifications and changes may be made to the present invention without strictly following the exemplary embodiments and applications illustrated and described herein, without departing from the true spirit and scope of the present invention which is set forth in the following claims.

APPENDIX A

1. Overview

1.1 What it does

The NOVA print system controller is responsible for controlling the entire print operation from job creation through imaging, collation, and error recovery. It is not a monolithic entity. Instead, it has three parts running on different hardware platforms and charged with different tasks.

1.2 The parts of the system

The parts of the system are described below, and illustrated in diagram 1.

1.2.1 The PC

The PC is a Windows NT application which provides connectivity with the outside world; runs a graphical touch-screen user interface; records and displays system history; and rasterizes pages. The software platform for this program is the Windows NT multitasking operating system.

1.2.2 The coprocessor

The coprocessor is a single-board computer which resides in the controller PC. Because the PC itself is too busy to hand real-time collator events, the coprocessor takes over these responsibilities. It is responsible for scheduling picks from hoppers; handling errors such as jams and double picks; and accumulating system history data which needs to be relayed to the PC for recording. The platform for this software is the C-Executive multitasking real-time operating system from JMI, Inc. The coprocessor does not directly control the motors and actuators on the system. Instead, it sends messages to Remote Control Units (RCUs), which are single-board computers similar to the coprocessor but located remotely in the system.

1.2.3 The system manager

The system manager runs on an off-line PC networked to the print system. It will run a Windows program which will allow a user to perform off-line tasks as the printer is running. Using the System Manager, users will be able to:

- display a snapshot of the status of the print system (who's signed on, which job is being run, and so on)
- display graphs and pie charts illustrating the mechanical performance of the system
- display the history of the users' efficiency on the system
- create and edit jobs
- create and edit format files
- schedule jobs to be run In addition to the above, the System Manager will be able to call third-party software which can:

- edit text files
- edit fonts
- edit images
- edit forms

1.2.4 Job flow through the system.

The flow of job data through the system is flow-charted below:

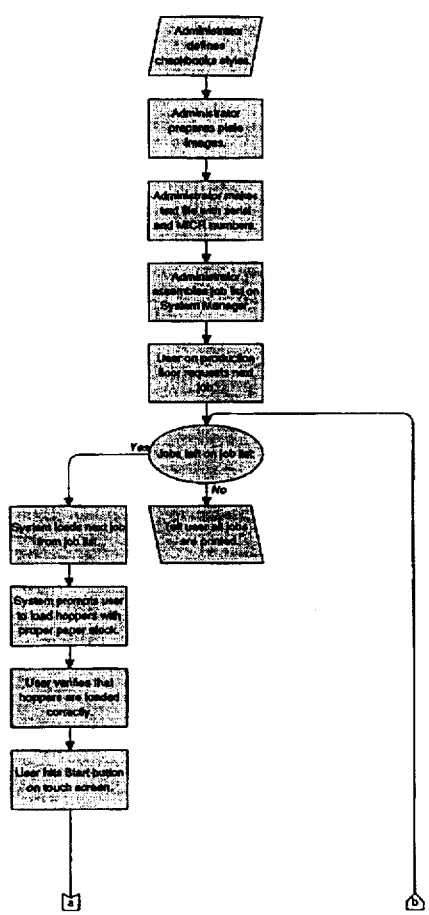
Typical Check Production Process on NOVA

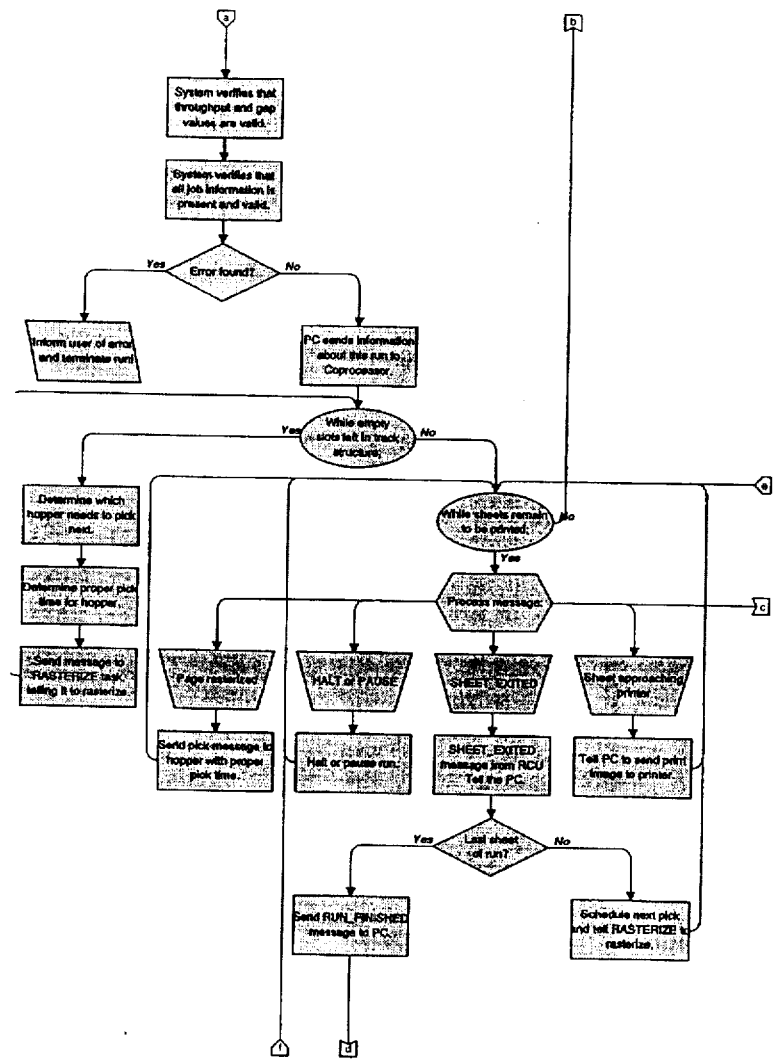

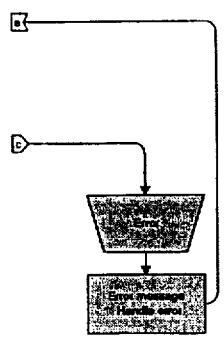

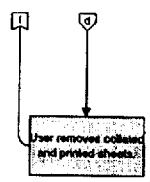

2. Communications between the parts of the system

2.1 Communications between the PC and the Coprocessor

The System Manager is connected to the PC by means of a local-area network. We do not specify what sort of network is used. Any network which makes a remote drive accessible to Windows NT is acceptable.

2.2 Communications from the PC to the coprocessor, and from the coprocessor to the RCUs

2.2.1 Hardware Architecture

The product consists of three components; a Personal Computer (PC), a coprocessor, and several Remote Control Units (RCUs). The Coprocessor is a 80188-based single board computer that plugs into the AT bus in the PC. The RCUs are custom single board computers also based on the Intel 80188 that are distributed within the product for specific control functions.

The PC and COPROCESSOR are physically connected through dual-port memory located on the COPROCESSOR. This dual-port memory is accessible to both the COPROCESSOR and the PC. The COPROCESSOR accesses this memory as the upper 8Kb of memory in its 1Mb address space. The PC accesses this memory via I/O instructions.

The COPROCESSOR and RCUs are physically connected through an SDLC serial communications link implemented with a Serial Communications Controller (SCC) on each end and two pairs of wires. The COPROCESSOR transmits on one wire pair and all RCUs transmit on the other. Each pair of wires is used to transmit a differential signal. The Digital Phased-Lock Loop (DPLL) circuitry of the SCC is used to derive the clock of the received signal.

Three versions of the SCC are supported. These parts include the AMD Am85C30, the Intel 82530, and the Zilog Z85230.

The SDLC data transmission operates at 125K baud.

2.2.2 Description

The communications software allows messages to be passed between any of the three hardware components of the system as well as between individual COPROCESSOR tasks. The only restriction is that RCUs may not send messages to other RCUs. Communications are accomplished through a pair of software functions. Messages may be sent or received via the SendMsg or GetMsg functions respectively. Please refer to the manual pages for details on
use of these functions.

2.2.3 Messages

A message consists of source and destination addresses, message type, message size, and optionally, a message body. The message size indicates the size of the message body. Information may be communicated in the message through use of the message type and message body. The maximum message size between the PC and COPROCESSOR is slightly less than 4K bytes. The maximum message size to and from the RCUs is 495 bytes.

2.2.4 Addressing

Each message contains both a source and destination address. The source address identifies the sender of the message. The destination address identifies the intended message recipient. Each address is composed of a primary address and secondary address. The primary address is either COPROCESSOR, PC, or RCU. The meaning of the secondary address is specific to each of the possible primary addresses.

The secondary address for the COPROCESSOR corresponds to a COPROCESSOR task id. The RCU secondary address is the SDLC address for the RCU of interest. The PC secondary address is not used.

The COPROCESSOR is located at SDLC address 0. RCUs may use SDLC addresses in the range 1 - 254. SDLC address 255 is reserved by the SCC as the broadcast address.

2.2.5 Message Frames

The message frame is the format of the message at the lowest communication level. Message frames contain all of the information passed through the GetMsg and SendMsg interface routines plus frame type, frame sequence, and SDLC addressing information. The user of the GetMsg and SendMsg functions never see the message frames. They are assembled by SendMsg and disassembled by GetMsg.

2.2.6 Software Architecture

2.2.6.1 COPROCESSOR

The COPROCESSOR uses the C-Executive real-time operating system as the software platform. The COPROCESSOR communications software consists of two device drivers, two message routing tasks, an array of RCU online information, per-task message queues, and several arrays of open file descriptors.

2.2.6.1.1 Device Drivers

Of the three hardware components in the system, the COPROCESSOR is the only one that has physical connectivity to all of the other two components - the
PC and the RCUs. The two device drivers in the system correspond to each of these physical connections; there is one for the SDLC link to the RCUs and one for the dual-port memory interface to the PC. Communication from
COPROCESSOR tasks to the PC or any of the RCUs is via the HostDrv or SCCDrv device drivers respectively.

2.2.6.1.2 Message Queues

Each task on the COPROCESSOR has an associated message queue. Each task receives all of its messages from its own message queue. Tasks do not use the device drivers directly. Message queues are accessed via the open, close, read, write interface. Messages are written to the message queues by the message routers.

2.2.6.1.3 File Descriptor Arrays

Each task has several file descriptors open for communications; one for receiving messages from its message queue, one for sending messages to the PC, one for sending messages to the RCUs, and an array of them for writing to any of the other COPROCESSOR tasks. All of these file descriptors are invisible to the tasks and are maintained by the message routers.

The message routers allocate these file descriptors as arrays. There are four arrays. Conceptually, these arrays are defined as follows.

```
int ccuReadFds[maxTaskCount];       /* per-task read message queue */
int ccuWriteFds[maxTaskCount][maxTaskCount];/* per-task write msg queues */
int pcFds[maxTaskCount];            /* per-task write PC */
int rcuFds[maxTaskCount];           /* per-task write RCU */
```

The ccuReadFds, pcFds, and rcuFds arrays are indexed by the task Id of the calling task as returned by the getpid function. The ccuWriteFds is indexed by the the caller's task Id and the task Id of the task it wishes to send the message to.

2.2.6.1.4 Message Routers

Two C-Executive tasks are used to route messages from the RCUs and PC to the C-Executive task addressed in the destination sub address field of the message. One task routes messages from the PC and the other routes messages from the RCUs. These message routers also provide for direct communication between the PC and RCUs. The name of the message router task is MsgRouter. A parameter passed to it at startup configures it for either PC or RCU.

Each message router reads messages from either the HostDrv or SCCDrv device driver. If the destination address is Coprocessor then the message is written to the message queue of the task specified in the destination sub-address. If the PC message router reads a message destined for the RCU then it passes the message to the write routine of the SCCDrv device driver. Likewise, if the RCU message router reads a message destined
for the PC then it passes the message to the write routine of the HostDrv device driver.

2.2.6.1.5 RCU Online Array

At system startup the SCC driver constructs an array of available RCUs. The name of this array is rcuOnline. Each entry in the array in the range 1 - 254 corresponds to an RCU on the serial line. A value of FALSE indicates that the RCU did not respond to the initial Poll Request and was marked offline. A value of TRUE indicates that the RCU responded to the initial Poll Request and is available for use.

The SCC driver will not attempt to communicate with RCUs marked offline.

2.2.6.2 PC

The PC uses the Microsoft Windows NT operating system to host the user interface front end to the system. The communications software consists solely of the PCGetMsg and PCSendMsg functions to communicate with the COPROCESSOR.

2.2.6.3 RCU

The RCU uses no operating system at all; the application software runs directly on the hardware. The RCU communications software consists of the RCUGetMsg and RCUSendMsg functions plus the SCC module.

2.2.6.4 Ring Buffers

Ring buffers (a.k.a. circular buffers) are used to buffer messages in the system. A ring buffer consists of the RingBuffer data structure plus the message buffer itself. The message buffer immediately follows the RingBuffer data structure in memory. The RingBuffer data structure contains head, tail and size members. The head and tail members are the head and tail of the buffer and contain the offset within the buffer to the head and tail. These offsets are the offsets from the first byte of the message buffer. The size member is simply the number of bytes allocated for the message portion of the buffer.

Messages are inserted at the head of the buffer, i.e. at the offset pointed to by the head variable. Each time a message is inserted into the buffer the head offset is advanced past that message. Thus the head offset always points to the next available slot in the buffer. The tail offset points to the next message to be read from the buffer. After a message is removed from the tail, the tail offset is advanced to the next message to be removed. The buffer is empty when the head and tail offsets are equal. The buffer is full when the tail offset is one less than the head offset.

Both the head and tail pointers wrap around from the end of the buffer back to the beginning.

2.2.7 PC/COPROCESSOR Communications

PC/COPROCESSOR communications are implemented with the coprocessor's dual-port memory. This dual-port memory is 8Kb in size. The lower 4K of memory is used to pass messages from the COPROCESSOR to the PC. A small portion at the top of this region is used as a status window and to contain semaphores for accessing the dual-port memory. The remainder of this region is used to pass messages from the PC to the COPROCESSOR.

The dual-port memory regions used to pass messages take the form of ring buffers. These ring buffers are protected by semaphores since they are accessed by both the PC and the COPROCESSOR.

*2.2.7.1 PC Strategy*

The PC operates in polled mode. All communications operations are accomplished by polling either the input or output ring buffers in the COPROCESSOR's dual-port memory. The software components used to implement PC communications include only the PCGetMsg and PCSendMsg functions.

2.2.7.1.1 PCGetMsg

The PCGetMsg function performs the following steps.

1. copy the COPROCESSOR-to-PC ring buffer header from the COPROCESSOR dual-port memory
2. check for message header
   a. return ENOTFOUND if no message header and no timeout
   b. return ETIMEOUT if no message header and timeout expired
3. copy the message header into local memory
4. return EBUG if the message size contained in the message header is larger than the amount of data left in the ring buffer
5. allocate memory for the message body
6. copy in the message body
7. acquire the COPROCESSOR-to-PC semaphore
8. update the ring buffer tail pointer
9. release the semaphore
10. copy message header fields into the PCGetMsg return parameters

2.2.7.1.2 PCSendMsg

The PCSendMsg function performs the following steps.

1. return EARG if message size < 0
2. copy in the PC-to-COPROCESSOR ring buffer header from the COPROCESSOR dual-port memory
3. return ETOOBIG if the message is larger than the ring buffer
4. if the ring buffer is full
    a. return EFULL if no timeout specified
    b. wait for room or return ETIMEOUT if timed out
5. convert the SendMsg parameter list into a message frame
6. copy the message frame into the ring buffer
7. acquire the PC-to-COPROCESSOR semaphore
8. update the ring buffer head pointer
9. release the semaphore
10. interrupt the COPROCESSOR

2.2.7.1.3 COPROCESSOR Strategy

The COPROCESSOR communications software is event driven - there are no polled operations. The software components used to implement COPROCESSOR/PC communications include the HostDrv C-Executive device driver and the CCUGetMsg and CCUSendMsg functions.

2.2.7.1.3.1 HostDrv Device Driver

The HostDrv device driver manages COPROCESSOR access to the ring buffers in the COPROCESSOR's dual-port memory, fields interrupts from the PC, and synchronizes CCUGetMsg requests with incoming messages. C-Executive tasks access the HostDrv services via the open, close, read, write, and ioctl system calls.

2.2.7.1.3.1.1 ioctl

The ioctl call is used to get the next message header from the ring buffer.
The following steps are performed to accomplish the ioctl.

1. return EOUTOFSYNC if the next data in the ring buffer is a message body rather than a message header
2. return ENOTFOUND if there is not enough data in the ring buffer to form a message header
3. copy the message header from the ring buffer to the tasks's address space
4. acquire the PC-to-COPROCESSOR semaphore
5. update the ring buffer tail pointer 6. release the semaphore 2.2.7.1.3.1.2 read The read call is used to read the next message body from the ring buffer.
The following steps are performed to accomplish the read.

1. return EOUTOFSYNC if the next data in the ring buffer is a message header rather than a message body
2. return EARG if the caller's read size does not exactly match the message size
3. return EBUG if the message size contained in the message header is larger than the amount of data left in the ring buffer
4. copy the message body from the ring buffer to the task's address space
5. acquire the PC-to-COPROCESSOR semaphore
6. update the ring buffer tail pointer
7. release the semaphore 2.2.7.1.3.1.3 write The write call is used to send one message to the PC. The following steps are performed to accomplish the write.

1. return ETOOBIG if the message is larger than the ring buffer
2. return EFULL if there is not enough room in the ring buffer for the message
3. copy the message into the ring buffer
4. acquire the COPROCESSOR-to-PC semaphore
5. update the ring buffer head pointer
6. release the semaphore

2.2.7.1.3.2 CCUGetMsg

The CCUGetMsg function performs the following steps.

1. convert timeout parameter to form required by the C-Executive readtm system call
2. return ENOTFOUND if no timeout and message queue is empty
3. call readtm to read message header with timeout
4. if message size > 0 read message body

2.2.7.1.3.3 CCUSendMsg

The CCUSendMsg function performs the following steps.

1. set up input file descriptor for either CCU, PC, or RCU
2. increment frameSize for SDLC address if destination is RCU
3. convert parameter list to message frame 4. issue write system call to send the message

2.2.8 COPROCESSOR/RCU Communications

The COPROCESSOR and RCUs communicate via SDLC. The COPROCESSOR has a dedicated transmit line, but the RCUs must share a line. COPROCESSOR/RCU communications use a link-level protocol state machine to ensure reliable communications. The COPROCESSOR may transmit messages at any time, but each RCU can only transmit in response to a Poll Request. The RCUs are polled to avoid collisions on their shared transmit line.

The COPROCESSOR and RCUs share as much communications code as possible. This shared software includes all of the SCC and ring buffer software and several link-level protocol routines.

2.2.8.1 SCC Module

The SCC module performs all programming of the SCC chip including initialization, reads, writes, and interrupt servicing. All data transfer operations are performed by DMA Channel 0 of the Intel 80188. This module also contains ring buffer management software and drives the link-level protocol state machine.

The SCC chip is programmed for SDLC operation at 125K baud which is the maximum baud rate. Address Search Mode is used so that each RCU will only receive messages addressed to it. In this mode, the first byte of each frame identifies the SDLC destination address. An SCC programmed for this mode only receives frames whose first byte matches the address it is programmed for. The exception to this is the SDLC broadcast address; all SCCs respond to 255 which is the broadcast address.

All of the protocol processing except for the initiation of message transmission from the COPROCESSOR occurs in the SCC interrupt service routine.

The SCC module provides the following routines to other parts of the communications software.

1. SCCGetMsgHdr  - get the next message header from the input ring buffer
2. SCCGetMsgBody - get the next message body from the input ring buffer
3. SCCRead       - program the next SDLC read
4. SCCWrite      - program the next SDLC write

2.2.8.2 SCC Ring Buffers

The SCC module uses two ring buffers named sccInputRingBuffer and sccOutputRingBuffer for incoming and outgoing messages respectively.

Both ring buffers are used on the RCU side, but only sccInputRingBuffer is used on the COPROCESSOR side. The COPROCESSOR side does not use sccOutputRingBuffer because it is only used to buffer outgoing messages in preparation for sending them in response to a Poll Request. Only the RCUs receive Poll Requests.

The input ring buffer is used to receive all frame types but only message and broadcast frames are saved by advancing the head pointer. All other frames are overwritten. Both input and output ring buffers have a pad at the end of their data area of size MAX_FRAME_SIZE. This pad exists so that all transfers may be programmed as a single DMA operation. The baud rate is too high to allow for the processor to be interrupted and re-program the DMA in the middle of a transfer.

For read operations the incoming frame may be read in across the ring buffer boundary into the pad area. When the entire frame has been received the interrupt service routine notices the overlap and copies the extra data back to the beginning of the ring buffer and adjusts the pointers accordingly.

For write operations on the RCU, the RCUSendMsg function copies the frame into the ring buffer and overflows into the pad if necessary. If overflow occurs, the overflowed data is also copied into the beginning of the ring buffer so that the ring buffer is always logically correct.

2.2.8.3 Link-Level Protocol

2.2.8.3.1 Frame Types

The unit of transmission is the frame. At minimum the frame contains the destination SDLC address and a frame type. The frame types are defined in protocol.h and include the following:

```
Message      - contains a message
Broadcast    - contains a broadcast message
ACK          - message acknowledgement
NAK          - negative message acknowledgement
Poll Request - sent to RCU to request any messages it may have queued
No Msg       - sent to COPROCESSOR in response to Poll Request if no messages are
queued
```

All frame types other than the Message and Broadcast frames contain only the SDLC address and frame type. Message and Broadcast frames contain the SDLC address, the message header, and optionally a message body.

The Message and Broadcast frames are considered data frames. The other frames are considered control frames.

The control frames have the following format.

```
SDLC address        - one-byte SDLC address
frame type          - one-byte frame type
```

The data frames have the following format.

| | |
|---|---|
| SDLC address | - one-byte SDLC address |
| frame type | - one-byte frame type |
| frame sequence | - one-byte sequence number |
| source address | - two-byte source primary address |
| source sub-address | - two-byte source sub-address |
| destination address | - two-byte destination primary address |
| destination sub-address | - two-byte destination sub-address |
| message type | - two-byte message type |
| message size | - two-byte message body size |
| optional message body | - optional message body |

2.2.8.3.2 Synopsis

The link-level protocol is such that the COPROCESSOR serves as the master and the RCUs respond as slaves. Since the relationship between the COPROCESSOR and RCUs is not peer-to-peer, their State Machines are not the same.

Messages are sent in either direction. The COPROCESSOR may transmit messages at any time but the RCU only transmits messages in response to Poll Requests.
Messages are acknowledged by the receiving end either with an ACK or NAK to signify successful receipt of the message or failure. Messages are re-sent in response to a NAK. The RCU will re-send messages indefinitely but the COPROCESSOR has a fixed retry limit of 10.

Broadcast frames are not acknowledged. Only the COPROCESSOR sends broadcast frames.

The COPROCESSOR periodically polls each of the RCUs marked as online in the rcuOnline array. Each RCU is polled by sending it a Poll Request frame.
The RCUs respond to the Poll Request by either sending a No Message frame indicating it has no message to send, or by sending the next available message in its output ring buffer.

The COPROCESSOR initiates an RCU polling sequence in response to expiration of its Poll Interval Timer. The RCU polling sequence is simply the polling of each RCU marked as online in the rcuOnline array. After the last online RCU is polled the Poll Interval Timer is programmed to expire in 20 milli-seconds. Thus there is a 20 milli-second delay between each RCU polling sequence.

The COPROCESSOR uses timeouts to avoid locking up the Protocol State Machine in the event that an RCU fails to respond or if the response is lost. There are two timeouts, one for acknowledgements, and one for response to Poll Requests. A Poll Request response timeout is treated exactly as if the
RCU responded with a No Message, causing the COPROCESSOR to poll the next available RCU. Acknowledgement timeouts are treated exactly as if a NAK were received. The message is resent up to the retry limit.

The RCU has no timeouts. The RCU relies on its State Machine to avoid protocol lock-up problems.

2.2.8.3.3 Protocol State Machine

The link-level protocol is implemented as a table-driven state machine.
The COPROCESSOR and RCUs each have their own tables. The table is a doubly-dimensioned array of type TransitionTableEntry. The array is indexed
by current state and event. This index pair returns a TransitionTableEntry
whose members include next state and transition action. The current state
is the state that the machine is currently in. The event is some event that occurred such as
NAK or timeout. The next state is the next state to transition to if the specified action
completes successfully.

2.2.8.3.4 COPROCESSOR Protocol

The COPROCESSOR is always in one of three states. These states are:

| | |
|---|---|
| CCU_S_IDLE | - waiting for a task to send a message or for the Poll Interval Timer to expire |
| CCU_S_WAIT_FOR_ACK | - waiting for an acknowledgement for the last message sent |
| CCU_S_WAIT_FOR_POLL | - waiting for a response to the last Poll Request sent |

The set of events that cause the CCU State Machine to change states include:

| | |
|---|---|
| CCU_E_BROADCAST | - task wants to send Broadcast |
| CCU_E_WRITE | - task wants to send a message |
| CCU_E_POLL | - Poll Interval Timer has expired |
| CCU_E_RCVD_GOOD_MSG | - a message frame was received |
| CCU_E_RCVD_BAD_MSG | - a garbled frame was received |
| CCU_E_RCVD_ACK | - an ACK frame was received |
| CCU_E_RCVD_NAK | - a NAK frame was received |
| CCU_E_RCVD_NOMSG | - a No Message frame was received |
| CCU_E_TIMEOUT | - a timeout has occurred |

The set of transition actions executed upon CCU state changes include:

| | |
|---|---|
| CCU_A_NO_ACTION | - do nothing |
| CCU_A_SEND_BROADCAST | - send broadcast frame |
| CCU_A_SEND_MSG | - send message frame |
| CCU_A_SEND_ACK | - send ACK frame |
| CCU_A_SEND_NAK | - send NAK frame |
| CCU_A_SEND_POLL_REQUEST | - send Poll Request frame |
| CCU_A_MARK_OFFLINE | - mark RCU offline |

Please refer to the COPROCESSOR Protocol State Diagram for further information.

2.2.8.3.5 RCU Protocol

The RCU is always in one of two states. These states are:

RCU_S_READ - waiting for message, broadcast, or Poll Request
RCU_S_WAIT_FOR_ACK - waiting for acknowledgement, but will respond to all frame types The set of events that cause the RCU State Machine to change states include:

RCU_E_POLLREQ_AND_MSG - received Poll Request and a message is available to send
RCU_E_POLLREQ_AND_NOMSG - received Poll Request and no message is available to send
RCU_E_RCVD_ACK - received ACK frame
RCU_E_RCVD_BAD_MSG - received garbled message
RCU_E_RCVD_BROADCAST - received broadcast frame
RCU_E_RCVD_GOOD_MSG - received message frame
RCU_E_RCVD_NAK - received NAK frame The set of transition actions executed upon RCU state changes include:

RCU_A_NO_ACTION - do nothing
RCU_A_SEND_ACK - send ACK frame
RCU_A_SEND_MSG - send message frame
RCU_A_SEND_NAK - send NAK frame
RCU_A_SEND_NOMSG - send No Message frame Please refer to the RCU Protocol State Diagram for further information.

2.2.8.3.6 Frame Sequence Number

The frame sequence number is incremented for each message request from a COPROCESSOR task, but is not incremented for frames that are re-transmitted.
The frame sequence number is an unsigned character and so increments through the range of 0 to 255.

Upon receipt of a message or broadcast frame the frame sequence number is compared to the sequence number of the previous message or broadcast frame received. The frame is discarded if the sequence numbers match, otherwise the frame is saved. The exclusion of consecutive frames with matching sequence numbers provides protection against duplicate frames.

2.2.8.4 Fundamental Constants

The protocol.h header file contains several constant definitions that configure the behavior of the link-level protocol. These constants include.

| constant | value | description |

| | | |
|---|---|---|
| MAX_RETRIES | 10 | - the maximum retry count |
| POLL_INTERVAL | 2 | - number of clock ticks between RCU polling sequences |
| RCU_BASE | 1 | - lowest-numbered RCU configured |
| RCU_COUNT | 254 | - number of RCUs |
| INITIAL_STATE_TIMEOUT | 2 | - timeout in clock ticks for first RCU polling sequence used to build the rcuOnline array |
| STATE_TIMEOUT | 5 | - timeout in clock ticks used after rcuOnline has been built |

Note that the clock interrupt rate on the COPROCESSOR is 100Hz resulting in 1 clock tick every 10 milli-seconds.

2.2.8.5 COPROCESSOR Strategy

The software components used to implement the COPROCESSOR side of COPROCESSOR/RCU communications include the SCCDrv C-Executive device driver, the SCC module, the CCUGetMsg and COPROCESSORSendMsg functions, and the message routers.
The SCCDrv device driver and message routers are described below.
Please refer to section 8 for a description of CCUGetMsg and CCUSendMsg and section 9.1 for a description of the SCC module.

2.2.8.5.1 SCCDrv Device Driver

The SCCDrv initiates message transmission activity and synchronizes C-Executive tasks with the Protocol State Machine and incoming messages.
C-Executive tasks access the SCCDrv services via the open, close, read, write, and ioctl system calls.

2.2.8.5.1.1 ioctl

The SCCDrv ioctl call performs the following steps.

1. call SCCGetMsgHdr to get the message header
2. return status if status not equal ENOTFOUND
3. wait
4. repeat step 1

2.2.8.5.1.2 read

The SCCDrv read call performs the following steps.

1. call SCCGetMsgBody to get the message body 2. return bufSize if status equal ESUCCESS or
3. return status if status not equal ENOTFOUND
4. wait
5. repeat step 1

2.2.8.5.1.3 write

The SCCDrv write call performs the following steps.

1. return EOFFLINE if the destination RCU is marked offline
2. return ETOOBIG if the frame is > MAX_FRAME_SIZE - 2
   (2 bytes are reserved for the CRC)
3. block waiting for any current writers to complete
4. set message header frame type to FRAME_TYPE_MSG or FRAME_TYPE_BROADCAST
5. disable interrupts
6. block waiting for proper state to start the write operation
7. start the write
8. wait for write completion
9. enable interrupts
10. return status

2.2.8.6 RCU Strategy

The software components used to implement the RCU side of COPROCESSOR/RCU communications include the SCC module and the CCUGetMsg and CCUSendMsg functions.

2.2.8.6.1 RCUGetMsg

The RCUGetMsg function performs the following steps.

1. call SCCGetMsgHdr
2. return ENOTFOUND if ENOTFOUND and no timeout
3. repeat step 1 if ENOTFOUND and timeout
4. set return parameters from message header
5. if message size > 0 get the message body by calling SCCGetMsgBody

2.2.8.6.2 RCUSendMsg

The RCUSendMsg function performs the following steps.

1. force destination address to COPROCESSOR if destination address is PC
2. convert parameter list to message frame
3. load the destination SDLC address
4. return ETOOBIG if message size > output ring buffer size 5. return EFULL if message size > output ring buffer free space
6. disable interrupts
7. copy message to output ring buffer
8. copy any message overflow from pad to beginning of ring buffer
9. enable interrupts

2.2.9 Statistics

The software maintains statistics related to link-level protocol and SCC activity. A global data structure named statistics contains this information. The following is an enumeration of the members of the statistics data structure.

```
badSeqNbr          - bad frame sequence number
badFrameSize             - unexpected frame size
markedOffline             - RCU marked offline
rcvdAck            - received ACK frames
rcvdBadData        - received frame with corrupted  data
rcvdBadFrameType   - received bad frame type
rcvdBroadCast      - received broadcast frames
rcvdMsg            - received message frames
rcvdNak            - received NAK frames
rcvdNoMsg          - received No Message Available frames
rcvdPollRequest    - received Poll Request frames
retriesExceeded    - number of retries exceeded
ringBufferFull     - input ring buffer became full
sccErrors          - SCC errors
sccInterrupts - SCC interrupts
sentAck            - sent ACK frames
sentBroadCast      - sent broadcast frames
sentMsg            - sent message frames
sentNak            - sent NAK frames
sentNoMsg          - sent No Message Available frames
sentPollRequest    - sent Poll Request frames
ticks           - incremented each clock tick
waitForAckTimeout  - CCU_S_WAIT_FOR_ACK timeouts
waitForPollTimeout - CCU_S_WAIT_FOR_POLL timeouts
```

This information is kept on both the COPROCESSOR and RCUs. The statistics data structure may be examined by the debugger, or in the case of the COPROCESSOR, may be displayed by the dumpstats command on the PC.

2.2.10 Ping

A diagnostic task is resident on the PC for loopback tests and to send COPROCESSOR diagnostic information to the PC. The name of this task is Ping. Ping interprets the message type as a command to perform. The following is a list of Ping command types.

MT_PING_PING           - return message back to sender
MT_PING_DUMP_RCU_TABLE  - return the rcuOnline array
MT_PING_DUMP_STATISTICS - return the statistics data structure
MT_PING_DUMP_SCC_STATUS - return the SCC error buffer
MT_PING_DUMP_TRANSITIONS - return the link-level transition buffer

2.2. Error Log

The task level components in the COPROCESSOR such as the CCUGetMsg and CCUSendMsg functions and the Message Routers use the ErrLog function to log errors to the PC on occurrence of unexpected error conditions. These messages have a message type of MT_ERRLOG as defined in msg.h.

Fig. 1 The parts of the system controller
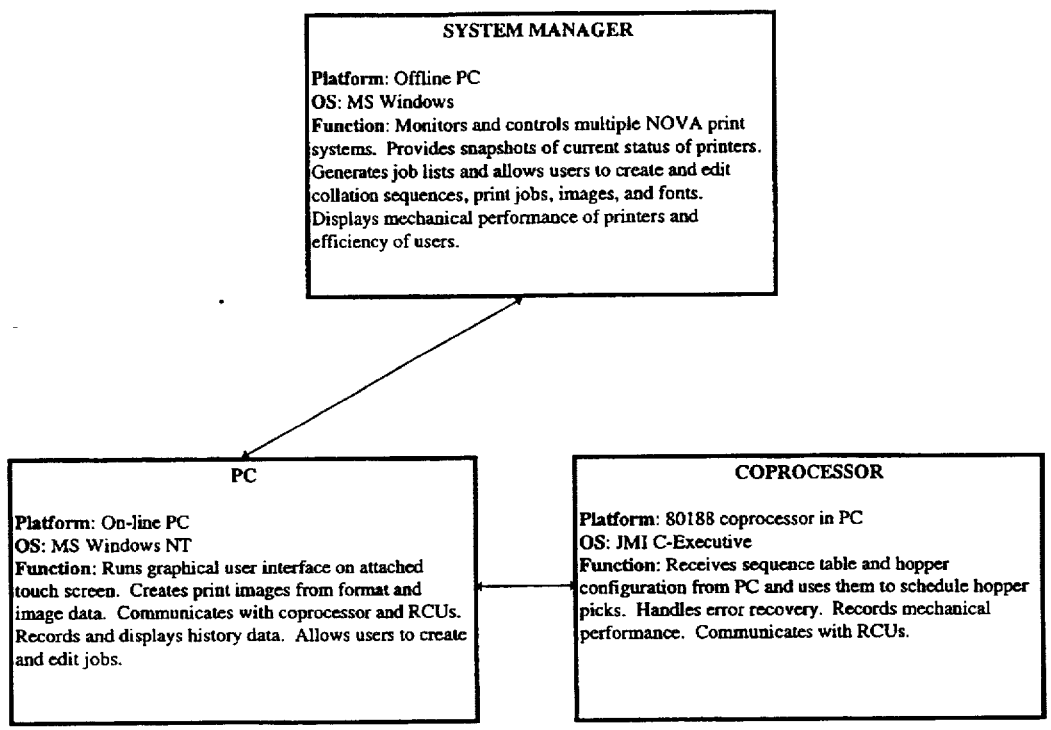

3. Operator interaction -- the User Interface

3.1 Signing on

The first thing the user needs to do after turning on the collator is sign on to the system. To sign on, the user selects a user name from the list box and then presses the "Sign on" button. At this point, an on-screen keyboard appears, prompting the user to enter his password. If the user enters the proper password, he is allowed onto the system. At sign-on time, his security level is retrieved. This security level establishes his privileges on the system.

3.2 Selecting a job

To run the collator, the user will first need to select a print job. A job describes which sheets of paper to collate, the order in which to collate them, and the appearance of the printed pages. Jobs can be selected in either of two ways. First, they can be selected individually at run time. In this case, the system presents a list box containing all the jobs currently defined. The user can choose any of these jobs, and then establish the number of times the job is to be run. After this job is run, the user can choose any other jobs for subsequent runs. The second way to select jobs is to create a list of them ahead of time. In this case, the user loses the ability to choose any job. Instead, he simply indicates that he is ready to run a new job. The system searches the job list to find the first job that hasn't been run yet. Regardless of how the job was selected, after a job's information has been loaded, the User Interface will present a load screen which will prompt the user as to which stock types are to be loaded into which hoppers. One hopper will always be selected as the active hopper, and the name of its stock type will be printed in large text so as to be readable to an operator loading the collator. The user can choose other hoppers as the active hopper either by pressing the hopper icon on the screen or by pressing the rocker switch on that hopper after its elevator has been lowered.

3.3 Starting, pausing, and halting

After a job has been loaded and the load screen displayed, the user can start the printing job by pressing the Start button on the main screen. After a job has been started, pressing the Pause button will tell the collator to stop gracefully, picking additional sheets if necessary to preserve collation order, and waiting until all sheets have left the track before turning the track off. Pressing the Halt button will stop all picking immediately and shut off the track without first clearing sheets. Unless there's an emergency, the run should be stopped with the Pause button. As the run progresses, the sheet count will be incremented each time a sheet exits the system. In general, this is the only activity the user sees until all books are printed and the machine stops. Several abnormal conditions can be signaled on the screen, however. These are described below.

3.4 Abnormal conditions

3.4.1 Hopper empty

The most likely abnormal condition is a hopper being emptied. When this happens, the collator will lower the elevator of the empty hopper and try to find another hopper loaded with the same form. If it succeeds, it will switch over to the new hopper and the screen will display a banner indicating which hopper has been emptied. If another hopper goes empty while the banner is displayed, additional hopper names can also be viewed. If the user loads an empty hopper while the system continues to pick from an alternate hopper, the name corresponding to the re-filled hopper will be removed; if no other hoppers are empty, the entire banner will be erased.

If no alternate hopper is found for an empty hopper, the system will need to pause itself. In this case, after all sheets have left the track the load screen will appear. The load screen will display an icon for each hopper installed, with the empty hopper blinking and drawn with no paper stack. As usual, one hopper will be selected and the name of the form it contains will be printed in large text.

3.4.2 Jam

Jams will also be displayed from the main screen. When the track jams, it will stop immediately and the user interface will display the jam screen. A graphic representation of the track will appear, with blinking red hatching indicating the locations of jams. At this point the user can remove from the track sheets which are jammed to the point where they can't move. After removing these sheets, he has the option of letting the system clear the track. It does so by opening the diverter and turning on the track for a fixed amount of time.

3.4.3 Other conditions

Several other conditions could also be displayed. In these cases, a message will appear.

3.5 Styles

Styles are the most important element of the NOVA printer. The styles screen allows you to create, modify, save, and delete styles.

3.5.1 Save style

The first option is "Save style". Pressing on this button will simply save the current style under its current name. (If a name hasn't yet been selected, the system will prompt the user for one). Saving a style is the only way to record changes.

3.5.2 Save style as

The second option, "Save style as" also allows the user to save a style, but this time under a new name. The user interface will prompt for a style name and the current style is saved under that name.

3.5.3 Sequencing

The user will be able to establish the sequence in which forms are picked. Sequencing is established by form name, not by hopper; it is the hopper configuration that establishes which hoppers hold which forms. Form names can be picked in any order and in any quantity. Additionally, a series of form names can be embedded in a loop with any arbitrary count. Finally, one portion of the sequence table can be specified to constitute on book. A "book" is defined as the part of the sequence table which is repeated the number of times specified at run time. The remainder of the table is run only once. The default definition of a book is the entire table: each entry in the table gets repeated. But if the user wants one or more entries run only once before the multiple books, or one or more entries run once after the multiple books, he can specify that only a portion of the table is to be repeated.

3.5.4 Hopper configuration

Creating a sequence table does not specify which hoppers are to be picked from; it only specifies which forms are to be picked. To associate a particular form with one or more hoppers, the user needs to create a hopper configuration. This is done by selecting in turn each form mentioned in the sequence table and specifying which hopper are to hold that form. Each form can be loaded into any number of hoppers (but at least one), and the first hopper specified to hold a given form is regarded as the primary hopper: it is the first hopper the collator looks at when searching for a hopper which contains this form.

3.5.5 Stock table

This option allows a user to edit the stock table. The stock table simply indicates which stock types are loaded into the hopper for this job. This information is used to prompt the user at load time, and to tell the system about the physical characteristics of the paper.

3.5.6 Sheet orientation

This option lets the user to specify the orientation of the sheets in the hopper. This is optional. Its only purpose is to allow the system to remind the user at load time which way paper is to be loaded into the hoppers.

3.5.7 Edit job list

Another option on the Jobs screen is "Edit job list". This option allows the user to add jobs to or delete jobs from the job list, or change the details of jobs already on the list. The following information must be specified for each job on the job list:

- the checkbook style to user
- the number of books to run
- a comment for this run (this is optional)
- the name of the text file to use (if not specified, the default text file is used
- the name of the text structure file (if not specified, the default text structure file is use)

26

3.5.8 Delete style

The final option on the Jobs screen is "Delete job". This option allows the user to delete jobs that are no longer needed.

3.6 Setup

Each system will be a bit different from other systems: it will have different hoppers installed, use a different scan code type, and pick forms with different names and attributes. The setup screen lets the user customize his system.

3.6.1 Add form

When specifying job sequences and hopper configurations, the user is not required to type in the name of forms or stock types. These names need to be specified only once on the setup screen. Thereafter, they can simply be selected from a list box. To add a new form name, the user simply types in the name of the form on the on-screen keyboard. This name will then be saved.

3.6.2 Add stock type

The user adds a stock type by typing in the new stock name on the on-screen keyboard. Since a stock name refers to a particular type of paper rather than an abstract print image, several attributes will also need to be recorded. These are:

- sheet length
- sheet width
- scan code (if used)
- whether sheets are interleaved

3.6.3 Delete form

Forms can be deleted when they are no longer needed.

3.6.4 Delete stock type

Stock types can be deleted when they are no longer needed.

3.6.5 Edit stock type attributes

The user can change stock type attributes such as length and width after creating a stock type.

3.6.6 Select job mode

On the Setup screen, the user can specify whether he wants to select each job individually or use a job list.

3.6.7 Change file drive\path

As it operates, the NOVA system writes to and reads from several files which record information and about the setup and history of the machine. By default, these files are stored on the same logical drive and in the same directory as the collator software itself. A user may wish to store these files somewhere else, however. This is most likely if the collator is attached to a network. In this way, the job list can be maintained and the operation of the collator monitored from a site removed from the collator itself. To tell the system where to store its files, the user chooses "Change file drive/path" button on the Setup screen. He is then prompted to enter the new drive and/or file path which is to precede the file name.

3.6.8 Hopper setup

This screen should only be used by a customer engineer while he is changing your hopper arrangement. It allows him to specify the number, location, and quantity of the hoppers installed on the system. It also allows him to specify the orientation of this system: whether it moves paper from right to left or left to right.

3.6.9 Default text file

If the user selects each job, or if an entry on the job list doesn't specify which text file is used, the system uses the default text file. The name of the default text file is defined here.

3.6.10 Default text structure file

If the user selects each job, or if an entry on the job list doesn't specify which text structure file is used, the system uses the default text structure file. The name of the default text structure file is defined here.

3.6.11 System throughput

The user can choose the throughput in pages per minute

3.6.12 Inter-sheet gap

The user can select the inter-sheet gap in inches

3.7 Audit

The audit screen displays selected information about one or all runs on the collator -- information such as the time the run began and ended, the total number of sheets picked, and the individual totals of each sheet type.

3.8 Performance

The performance screen displays the mechanical performance of the system, either for the last job run or for the entire history of the machine. The upper section of the text window describes the system as a whole: information such as how many sheets have been picked and how many exited. The bottom half of the text window displays the performance history of one hopper -- the hopper highlighted in red on the left-hand portion of the screen. To view the history of another hopper, the user simply presses its icon. This hopper will now be highlighted in red, and its performance history displayed. Once a hopper is chosen, the bottom portion of the screen will display the requested history. The display windows uses bar graphs to give you a graphic display of the performance of this hopper: the higher the bar graph, the more problems the hopper has experienced. In addition, the number of each kind of failure is printed above the display window, and the exact percentage of picks which failed in a particular way is printed just above the bar graph.

3.9 Management reports

Management reports allow the user to evaluate the performance of individual users. Reports can be generated for:

- a user's lifetime performance
- a user's performance by shift
- a user's performance by run

3.10 Track maintenance

The track maintenance screen allows the user to test the system's track. On the screen, the user can:

- turn the track on or off
- set the track speed (for maintenance mode only)
- turn the diverter on or off
- monitor the state of track sensors
- calibrate sensors

3.11 Hopper maintenance

The hopper maintenance screen allows the user to test the system's hoppers. On the screen, the user can:

- turn the collator's compressor on or off
- raise or lower the elevator of any hopper
- turn the vacuum on or off for any hopper
- turn the air knife on or off for any hopper
- activate the pick mechanism for any hopper
- monitor the state of any hopper's sensors

3.12 Stacker maintenance

The stacker maintenance screen allows the user to test the system's stacker. On the screen, the user can:

- turn the track on
- activate the stripper bars
- monitor the state of any hopper's sensors

3.13 Printer maintenance

The printer maintenance screen allows the user to test the system's printer track. On the screen, the user can:

- turn the track on
- monitor the state of any hopper's sensors

4. Startup

4.1 Downloading code

With the exception of very simple bootload code saved in PROMs (Programmable Read-Only Memory) on the RCUs, all software code for the NOVA printer is stored on the PC's hard disk. At startup time, the PC first goes though its normal initializations, and after starting the Windows NT operating system, it first loads the software for the coprocessor from the hard disk and sends it to the coprocessor, which then begins to run. Next, the PC code reads a configuration file which specifies which pieces of software are to be loaded to which RCUs. It then reads each piece of software in turn and uses the CTC network to send the code to the respective RCUs, which then begin to run.

5. Jobs

The job is the fundamental unit of system operation. The sequence of events from the time the operator presses the Start button until the last sheet has been collated and printed constitutes one job. The NOVA print system controller allows the user to create and edit objects that describe the makeup and appearance of the stack of paper created by a single print job. This description need only be created once; it is saved and can be retrieved any number of times thereafter.

5.1 Creation and editing jobs

Jobs can be created and edited either on the print system's touch screen or on the off-line system manager. In either case, no keyboard typing is necessary. Instead, the user simply chooses from a list of options by pressing (or clicking on) objects on the screen.

5.2 Using a job list versus selecting each job

Jobs can be selected in either of two ways. First, they can be chosen individually at run time. Second, a job list can be created ahead of time, either on the system manager or on the collator touch screen. After a job list has been created, the system can query it before each run and find the first job on the list which hasn't already been run.

6. Job definition

The parts of the job, and their hierarchical relationships, are illustrated in Figure 2.

Figure 2. The Job Definition Hierarchy

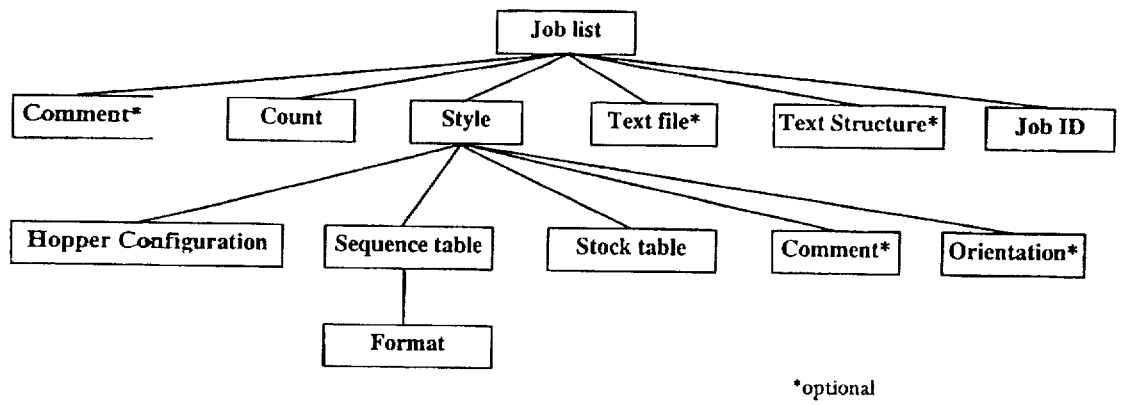

*optional

6.1 Job list

A job list is a list of jobs queued up ahead of time for later execution. When the user chooses Get Next Job, the printer retrieves the first job on the list which hasn't been run yet. Each entry in the job list includes:

- Comments for the user relating to this particular run
- A count of how many times to run the job
- The checkbook style
- The text file name (This is optional. If not included, the default text file is used.)
- The text structure name (This is optional. If not included, the default text structure is used.)
- A unique ID number identifying this job

6.1.1 Checkbook style

The checkbook style defines the makeup and printed appearance of one type of checkbook. It has three parts, as listed below:

6.1.1.1 Sequence table

A sequence table describes the collation sequence for a job. Three types of lines appear in it: form lines, repeat lines, and read lines. A form line consists of the form name to be picked followed by the number of times it is to be picked. The following line:

DEPOSIT 5 specifies that five DEPOSIT forms are to be picked in a row. It does not specify which hopper to pick from; the hopper configuration makes this specification.

32

Repeat lines allow the user to embed nested loops in the sequence table. Without repeat lines, the sequence table would be stepped through only once from top to bottom. Repeat lines instruct the system to repeat a portion of the table multiple lines. The following fragment illustrates a repeat:

```
LABEL1    0
DEPOSIT1
REORDER1
LOOP1     2
```

This fragment would pick one DEPOSIT and one REORDER form, and then repeat this sequence of two forms two more times, for a total of six picks.

READ lines specify that the next record of the current text file is to be read.

6.1.1.1.1 Format file

Each entry in the sequence table must have a corresponding format file of the same name. This file defines the location and appearance of items on a single form type. All measurements in the file are specified in inches to four decimal points of accuracy. A format file has two parts. The first part specifies parameters for the entire form:
- width
- height
- rotation (0 or 90 degrees)
- x_offset
- y_offset After the page-wide parameters come multiple format lines, each specifying either one line of text or one image. Each text format line has the the following fields:

data_index  link  x  y  justification font_name  font_height  font_width

The data_index field specifies which line of the current data record is being referenced. The link field specifies which line contains the serial number to be linked into a MICR line. The x and y values define the location of the line of text relative to the top lefthand corner of the page. The justification field can be either 'L' (Left), 'C' (Center), or 'R' (Right). The font name defines the font typeface and the font height and width the height and width of the font to be used.

An image format line uses the following fields:

data_index  x  y  justification  height  width

The data_index field specifies which line of the current data record is being referenced. This field will contain the name of the image file. The x and y values define the location of the image. The justification field can be either 'L' (left justified), 'C' (center justified), or 'R' (right justified). The height and width refer to the height and width on the page. If either or these values is less than 0, the original size of the image in that dimension is unchanged. Otherwise, the image is stretched or compressed to the desired size.

In addition to the above fields, a number of Boolean attributes can be specified:

| Attribute | Meaning |
|---|---|
| is_image | the data field is the name of an image, not text to print |
| is_micr | the data is a MICR line (and may include N's for linking) |
| autoincrement | the data should be incremented by one each time it is printed |
| autodecrement | the data should be decremented by one each time it is printed |
| underline | the text should be underlined |
| bold | the text should be printed in bold font |
| italic | the text should be italicized |
| strikeout | the text should be struck out |
| relative_positioning | the x value is relative to the right edge of the preceding field, and the y value is relative to the bottom edge of the preceding field |
| rotated | this field is rotated 90 degrees |
| data_increment | the field number (not the value in the field) is to be increment for each page |

6.1.1.2 Hopper configuration

The hopper configuration specifies which form types are loaded into which hoppers. "Form" refers to the appearance of the printed page, not the stock to load. The stock type is specified in the stock table.

6.1.1.3 Stock table

This specifies which particular type of paper stock is loaded into the hoppers. It has two functions: it lets the user define the physical properties of the paper used in a run, and it enables the system to prompt the user as to which paper stock to load at the beginning of a job and when hoppers go empty.

6.1.1.4 Orientation

This is simply an indication of which way paper is to be loaded into hoppers for this style.

6.1.2 Text file

This is raw text data. If the text file name isn't specified in a particular job, the system default is used.

6.2 Text structure file

This file refers to the current text file and specifies:

- Whether ASCII or EBCDIC is used
- Whether the individual fields are delimited or arranged in record structures

- Whether a wide character set is being used
- Which character(s) delimit fields (if applicable)
- Which character(s) delimit records (if applicable)
- The structure of records (if applicable)

If the text format file name isn't specified in a particular job, the system default is used.

6.3 Image file(s)

Images in one of a number of native formats. Currently, these are TIFF, PCX, DCX, BMP, GIF, DIB, TARGA, WPG, WMF (Windows metafile), PICT, JPEG, EPS, and CTC

7. Imaging capabilities

The system's imaging capabilities are effectively defined by the format file. A format file describe the appearance a printed page in an abstract way; the details of what the page actually looks like can't known until the user specifies the text and images to be used for a given job. So, for instance, a typical line from the format file would specify that whatever text is found in field sixteen of the current data record is to be printed in bold Courier font 0.2" high one inch form the left-hand edge of the page and two inches from the top of the page. The following sections describe the printing details that can be specified in the sequence table.

7.1.1 The page as a whole

The format file which describes the page provides several parameters for the page as a whole. The page can be rotated 90 degrees for landscape printing, and it can be offset by any amount up, down, left, or right.

7.1.2 Printing text

Text can be positioned anywhere on the printable page. To preserve device independence, printing positions are specified in inches. In this way, the same format file can be used with printers having different print resolutions. Text can be left, center, or right justified.

Text can be printed in any font that has been installed on the system. Any TrueType font -- or any font that can be converted to TrueType (including PostScript Type 1, PostScript Type 3, and Nimbus Q) -- can be installed. Any font can be scaled to any height and width at run time. In addition, special attributes can be specified for each field of text. Any field can be:

- underlined
- bolded
- italicized
- printed with a strikeout

A line of text can be specified as a MICR line. In this case, the height and width are set to pre-established MICR standards, positioning is done character-by-character to ensure proper spacing, and the MICR text can be linked to a serial number.

A numeric line can be autoincremented or autodecremented.

Text can be positioned relative to the field immediately before it. For instance, the user could specify that line 3 of text is to be positioned 0.1" below the bottom of line 2, or that it be positioned 1" to the right.

An individual field can be rotated 90 degrees clockwise.

A field can be specified as a data increment field. In this case, the data field used is incremented once for each page. For instance, the text on the first field might come from field 5, the text on the second page from field 6, and so on. (This could be useful if only one or two fields change from page to page).

7.1.3 Printing images

Like text, images can be positioned anywhere on the printable page, and can be left, center, or right justified.

The NOVA printer can decompress the following image types at run time:
- BMP
- GIF
- JPG
- PCT
- PCX
- TGA
- TIF
- WPG
- CTC In addition, any image which can be converted to a native image format prior to the run can be used. (This is how we would handle PostScript.)

Images can be scaled to any height and width at run time. Alternately, their original dimensions can be maintained.

An image can be positioned relative to the field immediately before it. For instance, the user could specify that image 3 is to be positioned 1" below the bottom of 2, or that it is to be positioned 2" to the right.

An individual image can be rotated 90 degrees clockwise.

8. Creating a print image

The PC tasks involved in printing are illustrated in Figure 3. Algorithms for for major printing algorithm are also flow charted in section 12.

Figure 3. Printing tasks

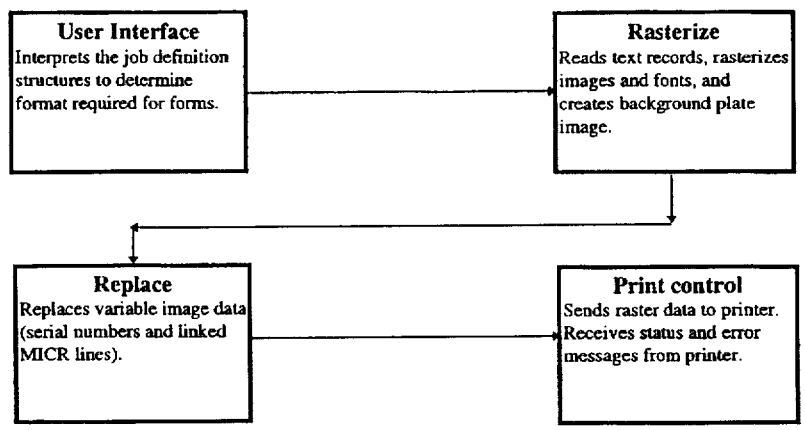

8.1 Rasterizing the plate image

The NOVA printer is a digital press: it replicates the actions of a traditional offset press. Consequently, the first task in printing is to create a plate image. The plate image is the fixed portion of the image that does not change from page to page. In the case of checkbooks, this would typically be the customers' names and addresses and bank logos. This task is performed by a PC task called RASTERIZE. The following pseudocode illustrates the algorithm of this task:

```
Do forever
        Wait for the User Interface task to place a page request on the RASTERIZE queue
        Get the details on this form (its ID, which format to use, and so on)
        If a plate buffer has already been created for this form
                identify it
        else
                find an empty plate buffer
        Create and initialize an print data array to hold text and image info
        If the current format file has already been loaded
                reference the format file
        else
                load the new format file
        Determine the offset needed to center the image For each line in the format file
                Pick up the data field referred to in the format file
                If this field is blank
                        continue
```

```
If this format line is an image line
    If this image has not already been rasterized
        Locate the image file
        If the image file can't be found
            return an error and stop printing
        Rasterize the image and save its raster data
        Add information about this image to the print data array Else if this format line is a line of text
    If this font has not already been rasterized
        Get a font handle from Windows NT
    If this is fixed text
        Add information about this image to the print data array
End or format file loop For each line in the print data field
    If this is a text field
        if the font is different from that used for the previous field
            select the new font
    If this page or field is rotated
        rotate the bitmap
    Get the dimensions of this line of text or image
    Set the x and y values for this field, adjusting for relative positioning and
                                            justification Move the raster bits for this text or image to the plate bitmap Record the current x and y position
End of print data loop
End of infinite loop
```

8.2 Replacing variable text

The plate image is filled in once by the RASTERIZE task before any page using this plate image are picked. Subsequent pages use the same plate image, but different variable text. The job of replacing variable text falls to the REPLACE task. Because it is generally impossible to replace all necessary data in the time between one sheet's exiting the printer and the next sheet's entering, variable data is replaced one print band at a time. A print band is a vertical section of the page (currently it is one half). After the printer has printed the first band on the page, that portion of the plate bitmap is released, since it is now safe to change it. Thus, the REPLACE thread can work on replacing the top half of the bitmap while the bottom half is being printed. The algorithm of the REPLACE task is illustrated below:

```
Do forever
    Wait for the RASTERIZE task to place a rasterized page on the REPLACE queue
    Get the details on this form
    Find the plate image whose variable data needs to be replaced
    Find the format file used for this image (it will have been loaded by RASTERIZE)
    Create and initialize an print data array to hold text and image info
```

```
For each printing band
        Wait for the PRINTCTL task to indicate that this band has been printed
        Reserve this band so the PRINTCTL doesn't try to print it For each line in the format file
                Pick up the data field referenced by the format field
                If we're not dealing with a new data record AND this field is fixed text
                        ignore it If this format line is an image line
                        Find the image (RASTERIZE will have rasterized it)
                        Add information about this image to the print data array Else if this format line is a line of text
                        If this is an incrementing or decrementing field
                                increment or decrement the number
                        If this is a linked MICR line
                                fill in the linked number Remember the first and last changing positions in the field
                Find the font for this format line (RASTERIZE will already have
                        rasterized it)
                Fill in information about this line in the print data array
        End of format loop For each line in the print data field
                If this is a text field
                        if the font is different from that used for the previous field
                                select the new font
                        If this page or field is rotated
                                rotate the bitmap
                        Get the dimensions of this line of text or image
                        Set the x and y values for this field, adjusting for relative positioning
                                and justification
                        If this field is smaller than the one on the previous page
                                clear out the overlapping area
                        Move the raster bits for this text or image to the plate bitmap Record the dimensions of this field
                Record the current x and y position
        End of print data loop
    End of band loop
End of infinite loop
```

8.3 Interaction between imaging and picking

Because we can't be certain how long it will take to load and rasterize fonts and images, a sheet can't be picked until its plate image has been rasterized. This notification is sent from the RASTERIZE task to the HOPPER task on the coprocessor in the form of a PAGE_RASTERIZED message. Only after the HOPPER task receives this message does it mark a sheet as ready to be picked.

8.4 Sending the image to the printer

The task responsible for sending image data to the printer is called PRINTCTL. PRINTCTL has the following algorithm:

Do forever
    Wait for the REPLACE task to place a page on the PRINTCTL queue
    If the variable text for this page hasn't been replaced yet
        return an error
    Call the NT print driver to send the image data to the printer
End

9. Collating sheets

9.1 The PC's responsibilities

The collation sequence begins when the user selects a particular job to run and then presses the Start button. At this point, it initiates the following algorithm:

Set the attributes for all the sheets in the jobs (length, weight, scan code, interleave)
Set the track speed for this job, based on the desired gap and throughput
If the requested gap and throughput aren't possible
    warn the user
Update history information
Send a message to the Track RCU telling it to set the proper track speed
Initialize printing variables and structures
Tell the Track RCU to turn on the track
Tell the Track RCU to turn on the compressor
Send the hopper configuration and sequence table to the coprocessor
Send the RUN message to the coprocessor with the following parameters:
- gap
- bar code scanning (on or off)
- track speed
- pick rate Wait for messages from the coprocessor (sheet exited, jam, system error, run paused or finished)

9.2 The Coprocessor's responsibilities

After the PC sends the RUN message to the coprocessor, it cedes control of the running of the system to the coprocessor itself. It is the coprocessor that actually schedules picks, sends pick requests to the hoppers at the proper time, and handles error recovery. Three tasks run simultaneously on the coprocessor: the SEQUENCE task, the TRACK task, and the HOPPER task. Each of these tasks is entirely event driven: that is, they sit in infinite loops waiting for notification of an event, and then act on that event. In the process, they may send messages to other tasks on the coprocessor, the PC, or the RCUs signaling events that these components need to deal with. The messages that can be signaled, and the handling arguments for these message events, are listed below for each of the three tasks.

9.2.1 The Sequence task

The Sequence task is responsible to scheduling the sequence of hopper picks. It maintains a structure called the Track which records the pertinent information about each scheduled pick.

case message is HOPPER_ARRANGEMENT
    Record the hopper arrangement -- the number, capacity, and positions of the
        hoppers installed on the system case message is HOPPER_CONFIGURATION
    Record the hopper configuration -- which forms are loaded into which hoppers case message is SEQUENCE_TABLE
    Record the sequence table -- the collation sequence of the forms in the hopper
        configuration case message is RUN
    Record the parameters included in the RUN message from the PC
    Make sure all the hoppers are still on line
    Initialize necessary run variables
    Disable all picks for the moment Fill up the Track structure with picks, including proper pick times
    Set sequence pointer to top of sequence table
    While Track structure is not full AND sheets remain to be scheduled
        If sequence pointer is at end of sequence table
            No sheets remain to be scheduled If this sequence line is blank
            Ignore this line
            Increment the sequence pointer to the next line Else if this is a READ line
            Remember that a new data record is being used
            Increment the sequence pointer to the next sequence line Else if this is a LOOP statement and we've exhausted the loop count
            All picks have been scheduled Else if the loop count for a nested loop has been reached
            Increment the sequence pointer Else if this is a label marking the end of a loop
    Increment the sequence pointer Else if this is a loop statement AND the loop isn't exhausted
    Move the sequence pointer to the beginning of the loop Else this is a form name
    Find all the non-empty hoppers which contain the requested form
        name
    If one hopper is defined as primary
        Choose that hopper
    else
        Choose the hopper with the best performance history Fill in this track entry with relevant information
        Calculate the proper pick time
        If this is the first sheet in the queue
            Set its pick time to the current pick time
        else
            Determine the index of the sheet that exits prior to this
                one
            Calculate the distance the previous sheet must travel to exit the
                track and travel one gap length
            Calculate the distance the current sheet must travel to exit the
                track
            Set the pick time of the current sheet to the time the previous
                sheet leaves the track (that is, current track location plus
                distance to exit) minus the time it takes this sheet to leave the
                track.

If the result of the above calculation is less than the current track
            location
            set the result to the current track location Send a RASTERIZE_PAGE message to the RASTERIZE task on
            the PC telling it to rasterize this page Increment the sequence pointer End of track entry information section Send CONFIGURE messages to the RCUs telling them the details of this run
Tell the stacker and the printer to turn on their tracks
Make sure all the elevators are raised
Send an INITIALIZE message to all RCUs, synchronizing everyone's track
    click count at 0
Send a message to the HOPPER task telling it to send PICK_AT messages to
    all hoppers used End of RUN message

```
case message is PAUSE
    For each pick entry in the Track structure
        Disable this pick
        If this sheets hasn't been picked yet
            If this sheet should have exited before a sheet already in the track
                Enable this pick
    End of pick entry loop Send PICK_FLUSH messages to all the hoppers, telling them to cancel their
            pending picks and request new ones While more sheets are still in the system's track
        Wait for all sheets to exit Reset pick times in anticipation of re-start
    Send a RUN_PAUSED message to the PC
End of PAUSE message case message is HALT
    Mark all pending picks in the track as disabled
    Send messages to all hoppers telling them to cancel any pending picks
    Send messages to the stacker and the printer telling them to stop immediately
    Reset pick times in anticipation of re-start case message is SHEET_EXITED
    Tell the PC so it can update the sheet total on the main screen
    Increment the queue front pointer of the Track structure
    Add a new pick to the Track schedule (if there is one) to replace the one that just
            finished
```

9.2.2 The HOPPER task

```
case message is TRACK_UPDATED
    FOR each installed hopper
        Send a PICK_FLUSH message telling it to cancel its current pick and request
                another case message is PICK_ACKNOWLEDGE
    Record that this pick has started
    Examine the TRACK structure to find the next ready pick for this hopper (if there
        is one)
    Send out the next pick for this hopper case message is PICK_COMPLETE
    Record that this pick is complete and the sheet is in the track
    Send a LOOK_SHEET to the track RCU telling it when to expect a sheet
    Record this event for the system history case message is PICK_FLUSH
```

43

Examine the TRACK structure to find the next ready pick for this hopper (if there is one)
Send out the next pick for this hopper case message is PAGE_RASTERIZED
Record that this form is now ready to be picked

9.2.3 The TRACK task case message is SHEET_EXITED
make sure the sheet didn't exit the track out of order
send a LOOK_SHEET message to the printer telling it when to expect a sheet

10. When something goes wrong -- error recovery

The NOVA print system has numerous sensor for detecting error conditions such as misfeeds, double picks, and jams. Whenever possible, the system recovers without halting the run and demanding operator intervention. This recovery might involve using the system's diverter. The diverter is a mechanism in the track which can remove a sheet of paper from the paper path and dump it into a reject bin. Sheets are diverted if:

- our collation sequence would otherwise have been violated
- the system was using the bar code scanner and the sheet's bar code didn't match the user-supplied value
- the sheet was double picked with another hopper
- for any other reason, it should not exit the system The following sections detail our error recovery schemes for errors

10.1 Hopper empty

This is detected by a hopper. The empty hopper sends a PICK_ERROR message to the HOPPER task with a type of HOPPER_EMPTY. The HOPPER task sets hopper_error flag to HOPPER_EMPTY and marks the TRACK structure entry which refers to the next sheet that would have been picked from this hopper. The recovery process itself is handled by the SEQUENCE task. It performs the following algorithm:

Search the TRACK structure to determine which entry had the problem
Disable all pending picks and send PICK_FLUSH messages to the hoppers telling them to cancel their pending picks and request new ones
Record the event for the system history
Look for an alternate hopper holding the same form as the empty hopper
If no alternate is found
    Divert any sheets that would have exited before the sheet that would have been picked from the empty hopper
    Send a message to the PC. The PC will pause the run and inform the user a form is exhausted
else For each entry in the TRACK structure which references the empty hopper
    Replace the empty hopper with the alternate hopper
    Adjust the pick time to reflect the new hopper position
    Send a message to the PC telling it one hopper is empty

10.2 Misfeed

This is detected by a hopper. The empty hopper sends a PICK_ERROR message to the HOPPER task with a type of NO_PICK. The HOPPER task sets hopper_error flag to NO_PICK marks the TRACK structure entry which refers to the sheet that misfed. The recovery process itself is handled by the SEQUENCE task. It performs the following algorithm:

Search the TRACK structure to determine which entry had the problem
Disable all pending picks and send PICK_FLUSH messages to the hoppers telling
    them to cancel their pending picks and request new ones
Adjust the pick times to reflect the misfeed
As each hopper responds to the PICK_FLUSH response
    If the hopper indicates that the sheet had already been picked
        Divert the sheet to avoid collation corruption
    Send the adjusted pick time to the hopper

10.3 Double picks

Like hopper empty and misfeeds, double picks are detected by a hopper. The offending hopper sends a PICK_ERROR message to the HOPPER task with a type of DOUBLE_PICK. The HOPPER task sets hopper_error flag to DOUBLE_PICK and marks the TRACK structure entry which refers to the sheet that doubled. The recovery process itself is handled by the SEQUENCE task. It performs the following algorithm:

Search the TRACK structure to determine which entry had the problem
Send a message to the track RCU telling it to divert the doubled sheet
Disable all pending picks and send PICK_FLUSH messages to the hoppers telling
    them to cancel their pending picks and request new ones
Adjust the pick times to reflect the double pick
As each hopper responds to the PICK_FLUSH response
    If the hopper indicates that the sheet had already been picked
        Divert the sheet to avoid collation corruption
    Send the adjusted pick time to the hopper

10.4 Hopper jams

Hopper jams are detected by a hopper. The jammed hopper sends a PICK_ERROR message to the HOPPER task with a type of HOPPER_JAM. The HOPPER task sets hopper_error flag to HOPPER_JAM and marks the TRACK structure entry which refers to the sheet that doubled. The recovery process itself is handled by the SEQUENCE task. It performs the following algorithm:

Search the TRACK structure to determine which entry had the problem

Disable all pending picks and send PICK_FLUSH messages to the hoppers telling
them to cancel their pending picks and request new ones
Adjust the pick times in anticipation of a restart. The pick times of the earliest sheet
that hasn't been picked is set to 0, and other subsequent sheets are set
accordingly.
Send a message to the PC telling about the jam. The PC will halt the run

10.5 Track jams

Track jams can be detected by the hoppers, the track RCU, the printer RCU, or the stacker RCU. The RCU that detected the jam sends a JAM message to the TRACK task. The TRACK task sets track_error flag to JAM and marks the TRACK structure entry which refers to the sheet that jammed. The recovery process itself is handled by the SEQUENCE task. It performs the following algorithm:

Send a SHUTDOWN message to the TRACK board telling it to stop the track and
compressor immediately
Disable all pending picks and send PICK_FLUSH messages to the hoppers telling
them to cancel their pending picks and request new ones
Search the TRACK structure to determine which entry had the problem
Adjust the pick times in anticipation of a restart. The pick times of the earliest
sheet that hasn't been picked is set to 0, and other subsequent sheets are
set accordingly.
Send a message to the PC telling about the jam. The PC will halt the run

11. Recording and displaying system history

As the system runs, it records a great deal of information about its mechanical performance, print jobs run, and the history of individual users. The following information is saved and can be displayed on the PC.

11.1 Mechanical performance for both lifetime and the last job run

- Sheets picked
- Sheets exited
- Sheets diverted
- Jam totals, split up by jam location
- Total jams
- Sheets/jam
- For each hopper
    Total picks
    Number of hopper jams, and percentage of total picks
    Number of double picks, and percentage of total picks
    Number of misfeeds, and percentage of total picks

11.2 Management report for lifetime, by shift, and by user

- User profile (not needed for lifetime report)
    User name
    User number
    Security level
    Last logon date
    Last logon time
    Last logoff time

- Shift information (for shift reports only)
    Start time
    End time

- Run report
    Total time
    Sheets picked
    Sheets per hour
    Run time (and percentage of total time)
    Idle time

- Number of jams
    Sheets per jam
    Time spent clearing jams (and percentage of total time)
    Number of jams that weren't cleared in 45 seconds

- Empty hopper stops
    Time for empty hopper stops (and percentage of total time)

- Operator pauses
    Time for operator pauses (and percentage of total time)

- Maintenance stops
    Time for maintenance stops (and percentage of total time)

11.3 Job-by-job audits

- User name
- Start time
- End time
- Total time
- For each form type
    number picked
    number that jammed
    number diverted
    number printed
    number that exited the machine
- Total jams

11.4 Message log for exceptional events

11.5 Jam log
- User name
- Time and date
- Location of jam
- Reason for jam (sheet didn't reach sensor, sheet covered sensor too long, etc.)

11.6 Daily performance summaries
- Same information as lifetime and last job reports

11.7 CE maintenance records
- name of CE
- time and date
- service performed

11.8 Events recorded

In order to generate the above reports, we record the following events in the history database:

| EVENT | INFORMATION NEEDED |
|---|---|
| JOB_FINISHED | machine name, job name, user, time and date started time and date ended, job id, number of jams in each possible jam location, total jams, duration<br>for each hopper, number of jams, misfeeds, and doubles<br>for each form, number picked, number jammed, number diverted, number printed, number exited<br>time spent jammed, number of hopper empty pauses, time spent waiting for empty hoppers, time spent running, number of jams not cleared in 45 seconds, number of pauses, time spent paused<br>sequence table used |
| USER_SIGNON | machine name, user, time and date, security level |
| USER_SIGNOFF | machine name, user, time and date, security level |
| JAM | machine name, job name, user, start time and date, end time and date, job id, location, reason for jam, job name, stock type |
| RUN_PAUSED | machine name, user, start time and date, end time and date, job name, job id |
| HOPPER_EMPTY | machine name, job name, user, start time and date, end time and | date, hopper, form name

MAINTENANCE machine name, CE name, start time and date, end time and date, service performed LOG machine name, user name, time and date, details of exceptional event

12. Flow charts of major algorithms

RASTERIZING THE PLATE IMAGE
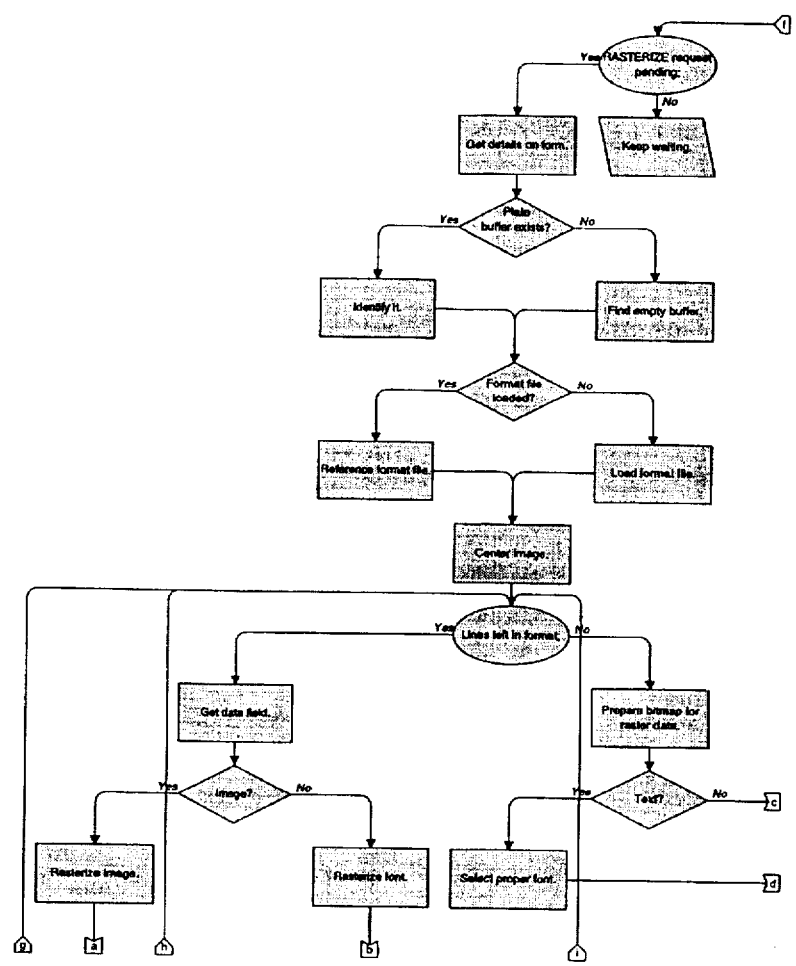

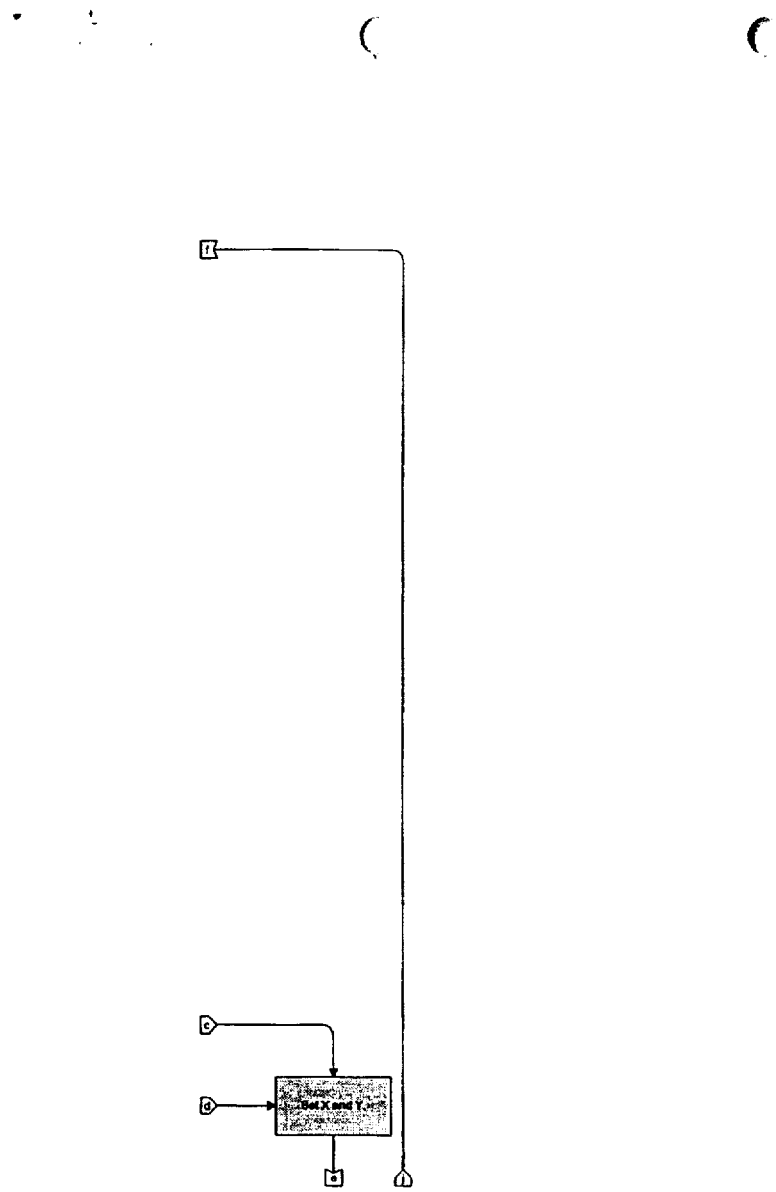

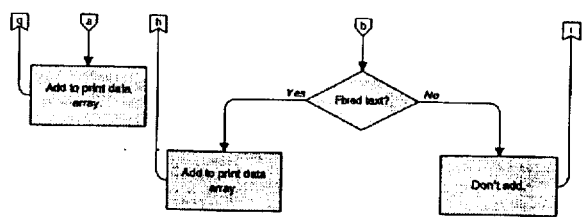

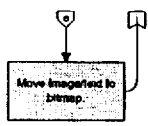

REPLACING VARIABLE TEXT
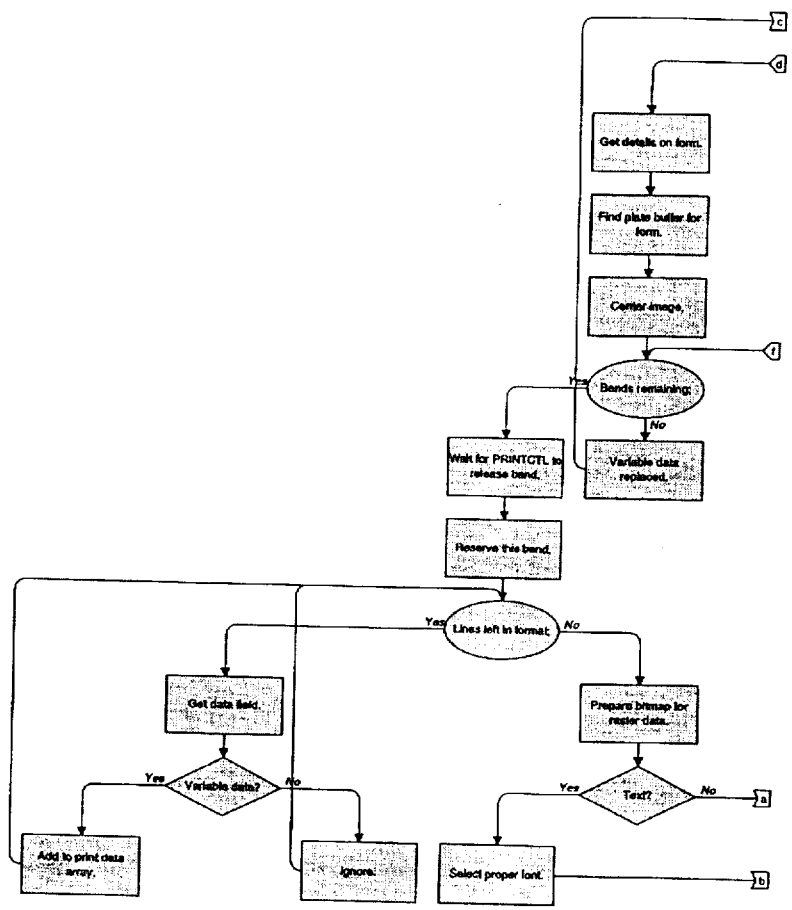

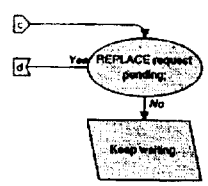

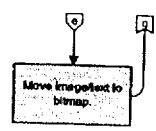

COLLATING SHEETS
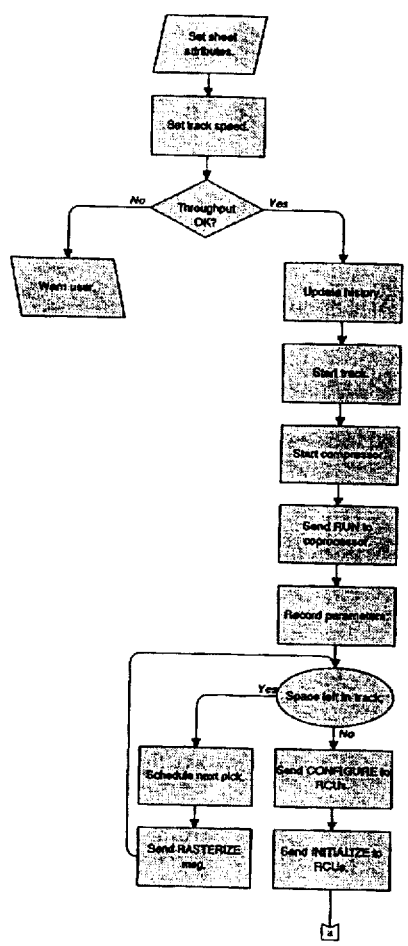

APPENDIX B
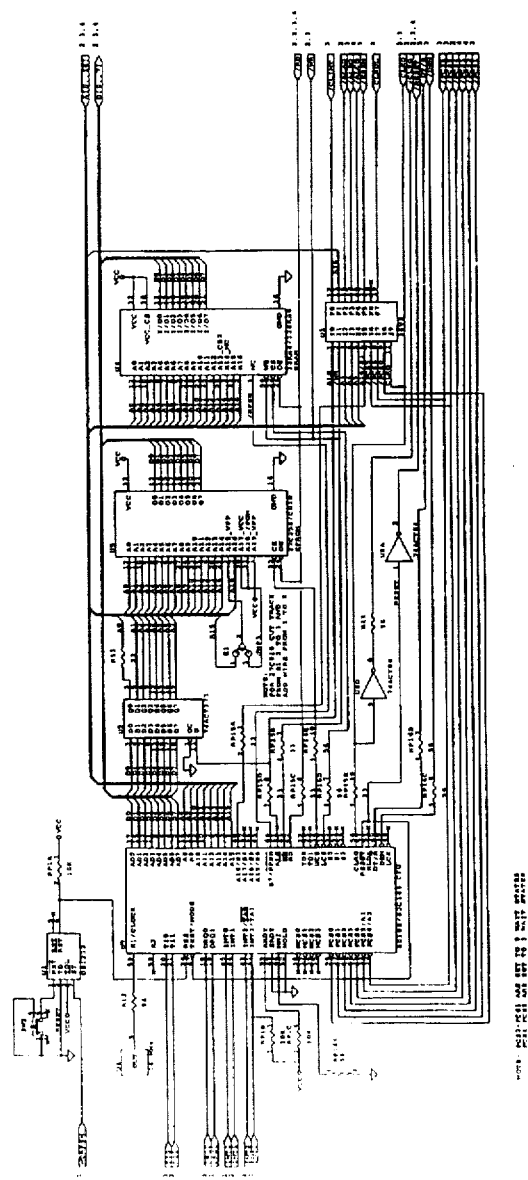

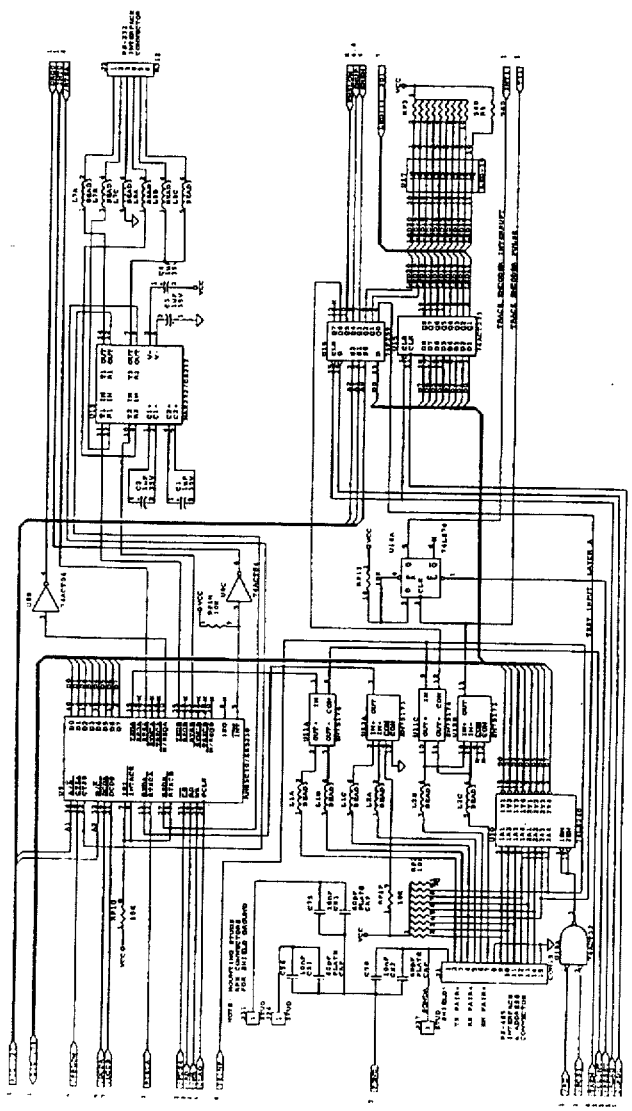

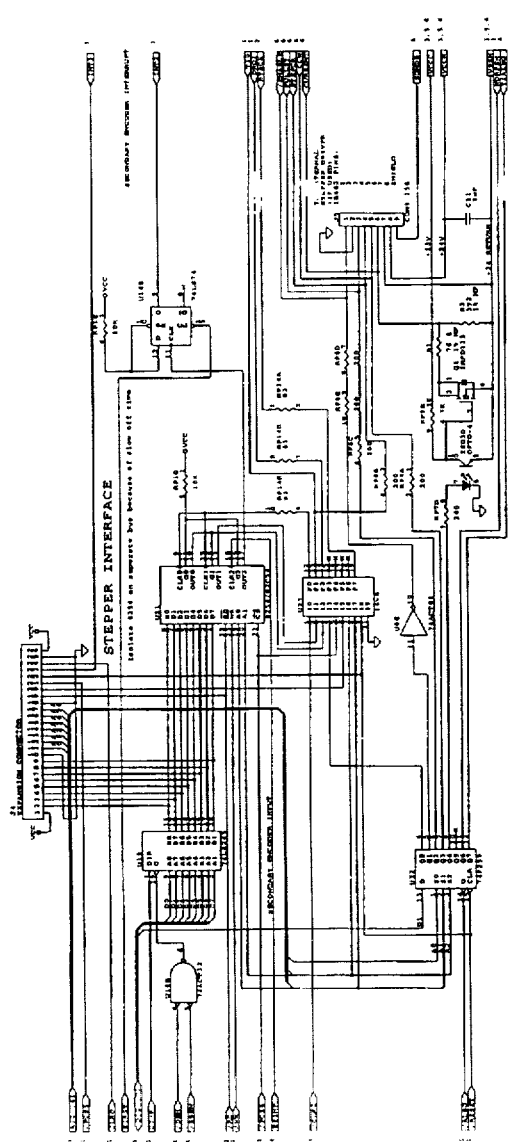

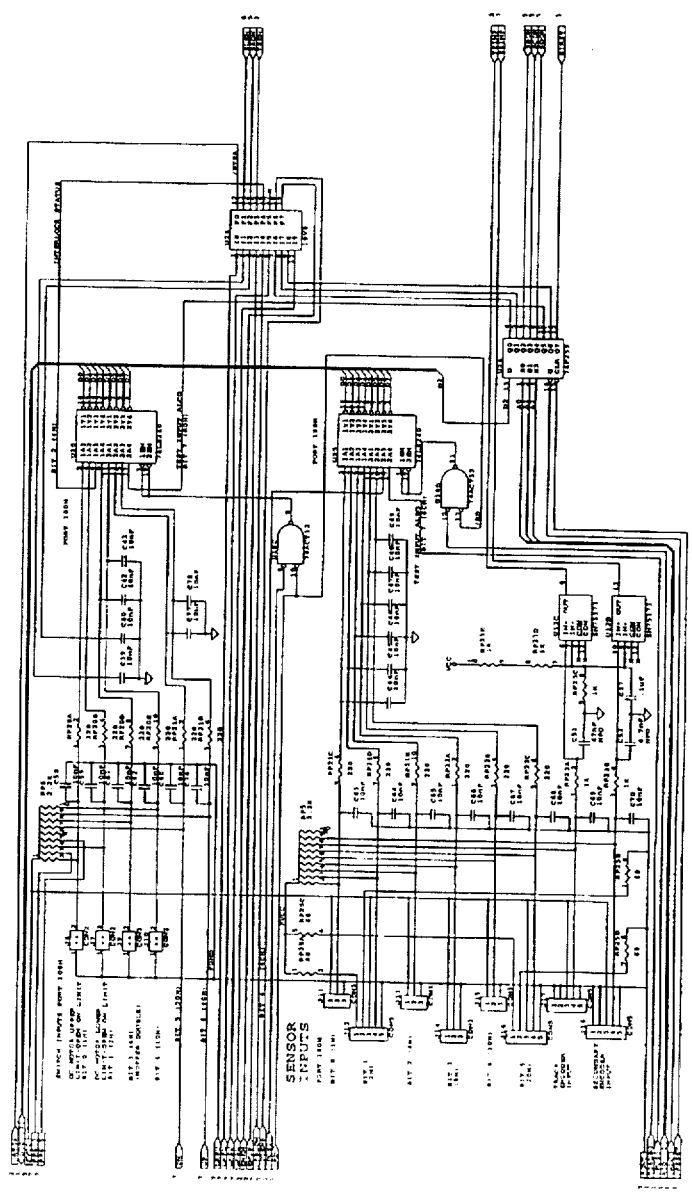

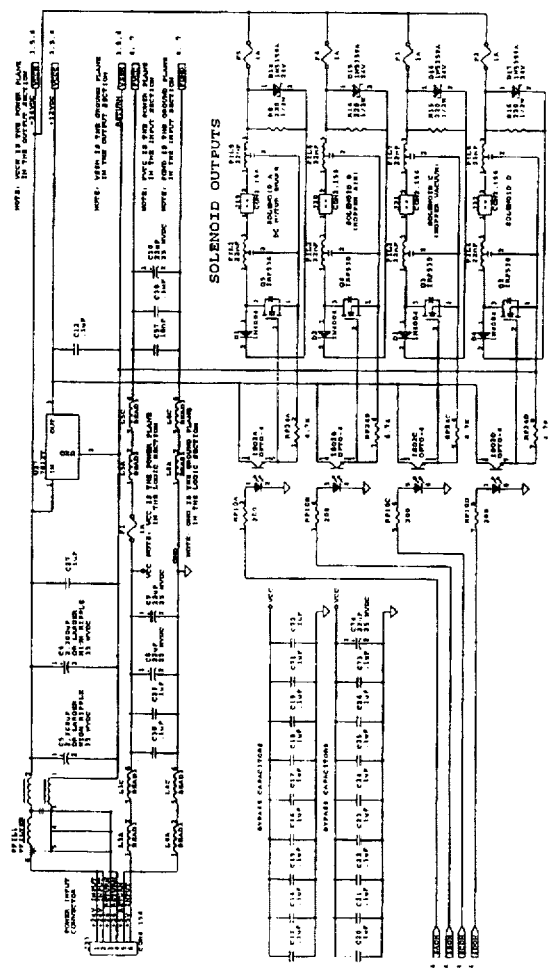

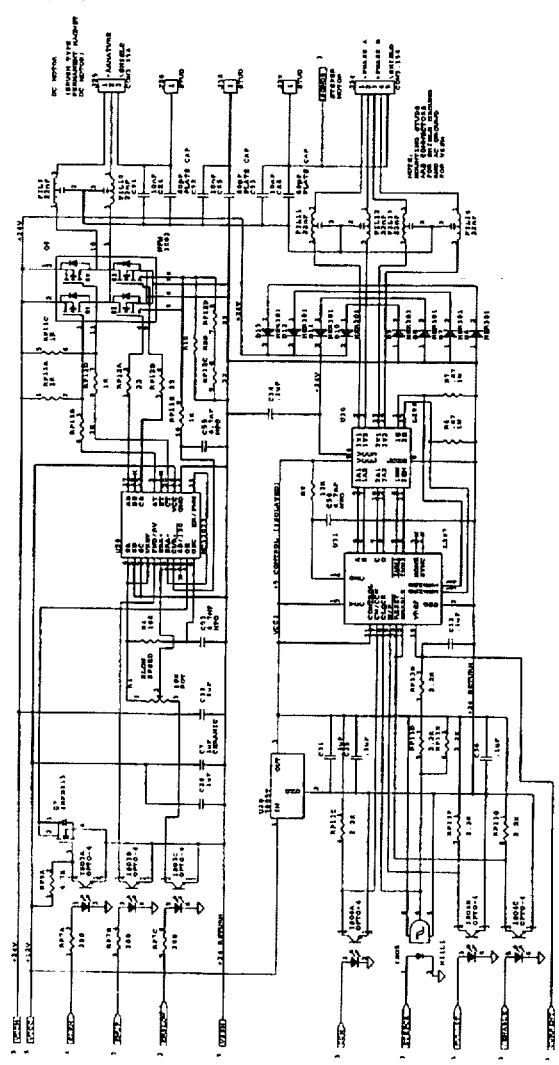

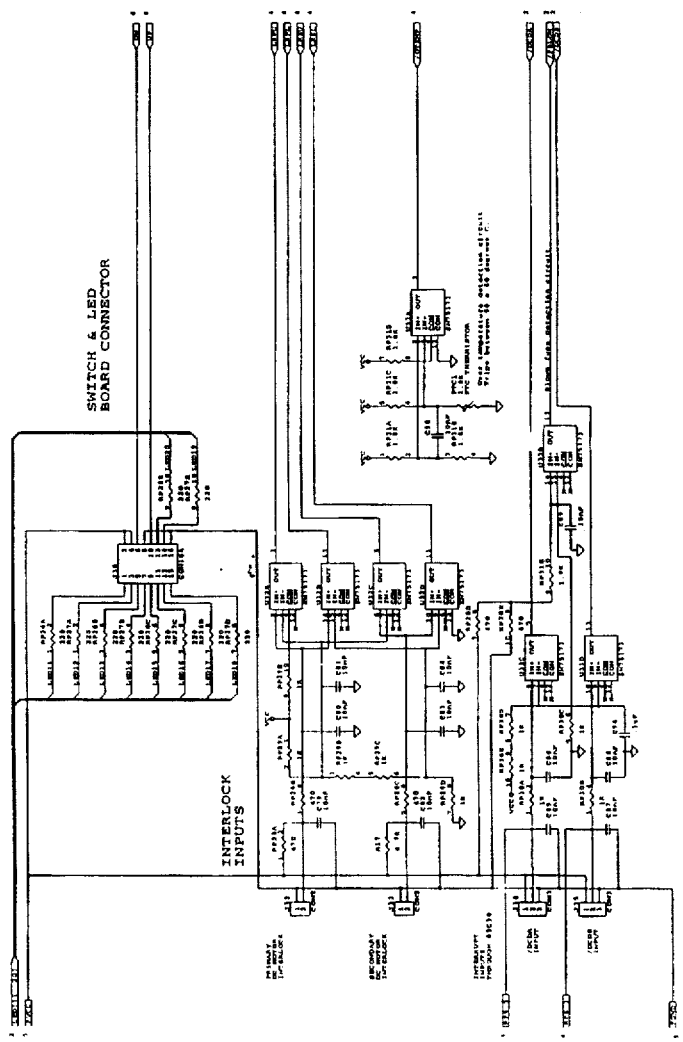

APPENDIX C

Table of Contents
Overview ...................................................................................................................................2
The Logic Section ......................................................................................................................2
Sensor Input Connections .........................................................................................................2
    Blown Fuse Detection ........................................................................................................5
The RS-232 Interface Connector ..............................................................................................5
The RS-485 Interface Connector ..............................................................................................5
The SELV Barrier .......................................................................................................................6
The VFD Control Section ..........................................................................................................6
    Controlling the Speed of the Motor ....................................................................................6
    Controlling the Direction of the Motor and Fault Reset .....................................................8
    Detecting a Fault ................................................................................................................8
    Input Voltage Requirements of VFD Section .....................................................................9

Table of Figures
Figure 1, U2 Palasm Design......................................................................................................3
Figure 2, U3 Palasm Design......................................................................................................4
Figure 3, Pinout of RS-232 Port .................................................................................................5
Figure 4, Pinout of RS-485 Port .................................................................................................5
Figure 5, Serial Loading of the AD7243 ....................................................................................6
Figure 6, Pinout of Connector J9 ...............................................................................................7
Table 1. Memory Map Summary ..............................................................................................10

Theory of Operation of the Daughter Board

*Overview*

The Daughter Board is an interface that mounts on top of the RCU board (connector J1 of Daughter Board mates with J4 of RCU). It features an RS-232 interface, an RS-485 iinterface, two sensor inputs, and an interface which controls a variable frequency drive.

The board is divided into two sections; the Logic section and the VFD Control section.

*The Logic Section*

The Logic Section controls the overall operation of the Daughter Board. Components that make up the Logic Section are: ICs U1 through U7, capacitors C1 through C14, resistors R2, R3, and resistor networks RP1, 3, 4, 5, 6, 10, 11, 12.

IC U1 is an AMD85C30 Serial Communications Controller which handles the RS-232, RS-485, and sensor inputs. The AMD85C30 has two channels; A and B. Channel A is connected to an RS-485 transmitter/receiver pair, U6 and U7. Channel B is connected to an RS-232 transceiver, U5. The AMD85C30 has general purpose inputs that are used as inputs for sensors; /DCDA, /DCDB and /SYNCB. Output /REQB is an output enable for triggering bar code scanners. A failure of U1 would affect serial communications and sensor inputs.

IC U2 is a GAL device that provides buffering of control signals from the VFD section and AMD85C30. Inputs to U2 are: /RTSA, /REQB, /INT FAULT, Q7 and /OE. Outputs from U2 are: data bus bits D0 and D1, CON, INT and TRG. Outputs D0 (pin 12) and D1 (pin 13) are enabled onto the RCU data bus whenever /OE (pin 10), is asserted during a read of the status register (02A0h). Output INT (pin 15) is the interrupt line back to the RCU (INT3) which is generated by the AMD85C30. Output CON (pin 14) is an output enable signal for the SN75174 quadruple differential line driver, U7. Output TRG (pin 16) is an output enable used for scanners that are triggered by an external means. All unused inputs to this device are tied high. A failure of U2 would affect reading of status bits, VFD fault detection, interrupt handling, and RS-485 communications. Refer to Figure 1 for a listing of the Palasm equations.

IC U3 is GAL that performs address decoding and clock signal handling. Inputs to U3 are: /PCS5, /WR, /RD, A6, A5, A4, CLKOUT and PCLK. Outputs from U3 are: PCLK, /VFD, /STATUS, /DEL_RD, /DEL_WR, /SCC and RTXCA. Outputs /VFD (14), /STATUS (15), and /SCC (18) are output enables. Outputs /DEL_RD (16) and /DEL_WR (17) are the delayed read and write control signals which are required by the AMD85C30; data must be valid before read or write can be true. Output PCLK (12) is a buffer for the CLKOUT signal from the RCU. Output RTXCA (19) is the PCLK frequency divided by two. RTXCA is the clock frequency used for the baud rate generator of channel A of the AMD85C30. The periodic output signals; PCLK, /DEL_RD, /DEL_WR and RTXCA have a 56 ohm resistor, RP12, in series to their respective inputs to help control the edge rate. A failure of U3 could render the board completely dead. Refer to Figure 2 for a listing of the Palasm equations.

IC U4 is a 74F259, an 8-bit addressable latch that controls the VFD section. The inputs to this device are address lines A2, A1, A0, data line D0, /VFD applied to /G input, and /RESET applied to /CLR input. There are 8 outputs from this device, each of which is addressable from the address bus starting at address 02B0h, refer to memory map in Table 1. Outputs which control the VFD section are SCLK (4), SDIN (5), /SYNC (6), /CLR (7), FRESET (9), FWD (10), and REV (11). Output Q7(12) of U4 is an output used for detecting the presence of the Daughter Board that can be read from the STATUS port 02A0h.

-2-

Figure 1, U2 Palasm Design

```
;PALASM Design Description

CHIP  _regs_gal  PALCE16V8

;------------------------------------- PIN Declarations ---------------
PIN  1     NA        ;
PIN  2     /RTSA     ; RTSA
PIN  3     /REQB     ; REQB is for the Laser TRG
PIN  4     /INT      ; INTerrupt input from 85C30
PIN  5     FAULT     ; FAULT input from VFD
PIN  6     Q7        ; Test bit Q7
PIN  7     I7        ;
PIN  8     I8        ;
PIN  9     I9        ;
PIN  10    GND       ;
PIN  11    /OE       ; Output Enable
PIN  12    D0        ; Data bit D0 output
PIN  13    D1        ; Data bit D1 output
PIN  14    CON       ; CONtrol for RS485 serial output
PIN  15    INT3      ; INTerrupt 3
PIN  16    TRG       ; TRiGger output for laser scanner
PIN  17    O17       ; not used
PIN  18    O18       ; not used
PIN  19    O19       ; not used
PIN  20    VCC       ;

;------------------------------- Boolean Equation Segment ------
EQUATIONS

INT3 = INT                    ; invert INT (active low) for INT3
TRG  = REQB                   ; enable laser
CON  = RTSA                   ; enable RS485
D0   = FAULT                  ; D0 reports if VFD faults
D0.TRST = OE
D1   = Q7                     ; D1 buffers test bit Q7
D1.TRST = OE
```

Figure 2. U3 Palasm Design

```
;PALASM Design Description

CHIP  _add_gal  PALCE16V8

;-------------------------------- PIN Declarations ---------------
PIN  1          CLK             ; CLocK input
PIN  2          /WR             ; Write input
PIN  3          /RD             ; Read input
PIN  4          A6              ; Address A6
PIN  5          A5              ; Address A5
PIN  6          A4              ; Address A4
PIN  7          A3              ; Address A3
PIN  8          CLKOUT          ; CLocK OUTput is an input from RCU
PIN  9          /PCS5           ; Periperhal Chip Select 5 from RCU
PIN  10         GND             ;
PIN  11         /OE             ; Output Enable
PIN  12         PCLK            ;
PIN  13         O13             ;
PIN  14         /VFD            ; VFD address enable
PIN  15         /STATUS         ; Status enable
PIN  16         /DEL_RD         ; DELayed ReaD
PIN  17         /DEL_WR         ; DELayed WRite
PIN  18         /SCC            ; Serial Comm. Controller enable
PIN  19         RTXCA           ; RTXCA (receive clock for SCC)
PIN  20         VCC             ; INPUT ;-------------------------------- Boolean Equation Segment ------
EQUATIONS PCLK   = CLKOUT                                          ; PCLK buffers the
                                                         ; CLKOUT RTXCA := /RTXCA                                          ; Divide CLKOUT by 2
RTXCA.CLKF = CLK                                         ; for receive clock DEL_WR =  WR *  CLKOUT * PCS5 * /A6 * /A5 * /A4 * /A3    ; Delay WR
             + DEL_WR * WR DEL_RD =  RD *  CLKOUT * PCS5 * /A6 * /A5 * /A4 * /A3    ; Delay RD
             + DEL_RD * RD SCC  =    PCS5 * /A6 * /A5 * /A4 * /A3                   ; Addr. 0280

STATUS =  RD *  CLKOUT * PCS5 * /A6 *  A5 * /A4 * /A3    ; Addr. 02A0
             + STATUS * RD VFD  =    WR *  CLKOUT * PCS5 * /A6 *  A5 *  A4 * /A3    ; Addr. 02B0
             + VFD * WR
```

IC U5 is a Maxim MAX232 RS-232 driver/receiver. This IC features two drivers and two receivers and requires only +5V to generate the voltage levels needed for RS-232 using four external capacitors; C11, C12, C13, C14. A failure of any of these components would affect RS-232 communications on Channel B of the AMD85C30.

IC U6 is a 75173 quadruple differential line receiver. IC U7 is a 75174 quadruple differential line driver. A failure of either of these ICs would disable RS-485 communications on Channel A of the AMD85C30.

*Sensor Input Connections*

The sensor input connectors are sectioned off from the Logic section with ferrite bead inductors L1 though L7 to reduce EMI. The two sensor inputs, J7 and J8, are 3 pin Amp headers with 100 mil centers that are connected to /DCDA (19) and /DCDB (21) of the AMD85C30 via RP11. Components RP11, C26, C27, C28, C29 serve to protect the input pins of the AMD85C30 from static discharges and to tie inputs high. These inputs will accept TTL compatible signals and can be programmed to trigger an interrupt on INT3.

*Blown Fuse Detection*

Power to the sensors is fused at F1, located near the expansion connector J1. The /SYNCB (29) input of the AMD85C30 is used for detecting the presence of the fuse. Components RP11E, R3, and C31 form a voltage divider which creates a fuse detection signal from the fused power to the sensors. The fuse detect signal is applied to the /SYNCB input.

*The RS-232 Interface Connector*

Channel B of the SCC is hardwired as an RS-232 interface. Connector J2 is the RS-232 interface connector that accepts an RJ-12 modular connector. The pinout of the connector is as follows:

Figure 3. Pinout of RS-232 Port, J2

| Pin | Name | Signal |
|-----|------|--------|
| 1 | TD | Out |
| 2 | RD | In |
| 3 | GND | |
| 4 | CTS | In |
| 5 | RTS | Out |
| 6 | TRG | Out |

Pin 1 is located on the far left of the connector with the tab facing down. Pin 6 of the connector is an output reserved for triggering barcode scanners. The transmission rate is 19200, 8, N, 1.

*The RS-485 Interface Connector*

Channel A of the SCC is the RS-485 interface. The Daughter Board RS-485 Interface accepts a modular RJ-45 connector. The pinout is as follows:

Figure 4, Pinout of RS-485 Port

| Pin | Name | Signal |
|-----|------|--------|
| 1   | -SD  | Out    |
| 2   | +SD  | Out    |
| 3   | -RD  | In     |
| 4   | +RD  | In     |
| 5   | -CTS | In     |
| 6   | +CTS | In     |
| 7   | -DTR | Out    |
| 8   | +DTR | Out    |

Pin 1 is located on the far left of the connector with the tab facing down. Component RP2 is a 150 ohm termination resistor network that is socketed on the board.

*The SELV Barrier*

The Logic section is optically coupled to the VFD section via optoisolators IS1 through IS8 which forms a safety extra low voltage (SELV) barrier between the two sections. At present, the low voltage inputs of the VFDs are not VDE/IEC approved. Logic section controls the VFD section by turning on/off an optoisolator, which in turn is connected to a component that controls the VFD. The optoisolators are H11AV1s which have open collector outputs. The SELV barrier has an isolation voltage rating of 3750 Vrms between input and output. An additional precaution was taken by encasing the VFD section inside a small enclosure (CTC 0802661-001) in order to meet UL safety regulations.

*The VFD Control Section*

The VFD section provides the start/stop, speed, and direction signals for a variable frequency drive controlling a 3-phase motor. Components that make up the VFD section are: ICs U8, U9, U10, U11, optoisolators IS1 through IS8, resistor R1, diode D1, resistor networks RP7, RP8, RP9, RP10, capacitors C15, C16, C17, C18, C19, C20, C30, t-filter FIL1, connector J9, and jumpers E1, E2, and E3. It features a DC analog output, three switch outputs, and an input back to the RCU. The purpose of these components will be covered in the following sections.

*Controlling the Speed of the Motor*

The speed of the motor is controlled by adjusting the analog speed reference input to the VFD. Most variable frequency drives have an input that can be programmed to translate a 0 - 10VDC voltage reference to a frequency reference. The reference voltage is provided by U8; an Analog Devices AD7243 12-bit serial digital to analog converter. This device requires a minimum of four input signals to control the output voltage. The output of the D/A converter, $V_{OUT}(14)$ has a range of 0 to +5V or 0 to +10V DC which is selectable at jumper E2. A jumper across pins 1 and 2 selects the +5V range. A jumper across pins 2 and 3 selects the +10V range.

Components which control the serial loading of the AD7243 are IS2, IS3, IS4, IS5, RP7, RP10 and U9. The four input signals required by the AD7243 are CLK, /SYNC, SERIAL DATA, and /CLEAR.

Optoisolator IS2 controls the SCLK(5) input to the AD7243. The H11AV1 optoisolators have slow rise and fall times of approximately 40μS which determines the maximum clock speed of the D/A converter. Although this is a 12-bit D/A, the AD7243 requires 16 clock pulses to load data into its internal latch. Serial data is latched on the falling edge of the clock. After 16 clock pulses have been received and /SYNC has gone false, the AD7243 will change the output voltage to match the value that is currently loaded in the AD7243's internal latch. The output signal from U9 should have a 50% duty cycle.

Optoisolator IS3 controls the serial data input. The first four bits sent are 'don't cares' followed by the 12-bit data word with the least significant bit last in the stream.

Optoisolator IS4 controls the /SYNC input which signals the beginning and ending of a serial message.

Optoisolator IS5 controls the /CLEAR input. This can be used for clearing the output voltage to 0V and setting the output into a known condition. Note: After power-up, the D/A needs to be initialized before data can be sent or /CLEAR can be asserted. Sending 16 clock pulses with /CLEAR asserted low will initialize the AD7243.

The outputs of the optoisolators are inverted via U9, which is a 74HC14 hex inverter Schmitt trigger that corrects the polarity of the signal. Resistor networks RP1 and RP2 are shared by IS2 through IS5. RP1 establishes the bias on the transistor output. RP2 contains the collector load resistance for each of the output transistors. The following figure illustrates the serial loading process of the DAC.

Figure 5. Serial Loading of the AD7243

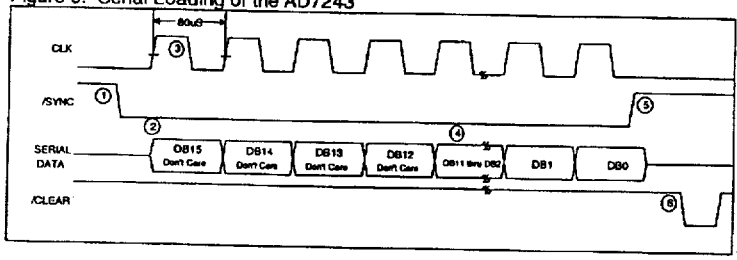

1. /Sync goes low to indicate that for the next 16 falling edges of CLK, there will be data at the Serial Data input.
2. Data must change with the rising edge of the CLK. The most significant bit is sent first, DB15.
3. Data is clocked into an internal shift register on the falling edge of the clock.
4. DB11 through DB0 are sent.
5. /SYNC is raised to indicate the completion of the cycle.
6. /CLEAR is asserted. Output of the DAC is 0 volts.

*Controlling the Direction of Motor and Fault Reset*

The VFD section has three open collector outputs that are dedicated to controlling a variable frequency drive under 2-wire control. The Magnetek GPD 333 variable frequency drives in the Nova System are programmed for 2-wire control. Only two switch inputs on the VFD are required to control start, stop and direction of an ac motor; FWD RUN/STOP (TB1) and REV RUN/STOP (TB2). Activation of the motor in forward direction is accomplished by switching the FWD RUN/STOP input to ground while the REV RUN/STOP input is open. To run motor in reverse direction, REV RUN/STOP input is switched to ground while FWD RUN/STOP is open. A third input to the VFD, FAULT RESET (TB4), is reserved for resetting the fault status of the VFD after the cause of the fault is cleared. A momentary closure of this input to ground will reset the fault. Refer to Magnetek GPD 333 technical manual for more details concerning VFD operation.

Components IS6, IS7, IS8, Q1, Q2, and Q3 control the start/stop, direction and fault reset to the VFD. Each optoisolator is paired with a transistor to form a transistor switch that will drive a VFD input to ground. Optoisolator IS7 and transistor Q2 control the FWD RUN/STOP input. Optoisolator IS8 and transistor Q3 control the REV RUN/STOP input. Optoisolator IS6 and Q1 control the external fault reset input.

*Detecting a Fault*

Variable frequency drives are capable of monitoring the operating performance of an AC motor while it is running. When a parameter is exceeded; i.e. thermal overload, over-voltage condition, over-current, this is called a fault. A fault can also be triggered by an external falt input which is typically used for interlocks. Variable frequency drives have a relay output that is used to signal a fault condition. When a fault occurs, a VFD will shut off power to the AC motor and will change the state of the relay contact from a 'run' condition to a 'fault' condition.

The VFD Control section of the Daughter Board has a fault input, pin 8 of J9, that is used to monitor the fault status of the variable frequency drive. Components which are part of the Fault input circuit are resistors R1, R2, diode D1 and optoisolator IS1.

When a fault condition appears, the variable frequency drive normally open relay contact(s) will change state. The current flowing through the relay contacts will turn optoisolator IS1 on. The output of the optoisolator is connected to U2 pin 5 which is an input to the STATUS port 02A0h.

The VFD Fault Input has a separate return line used in those instances where it is required to isolate the input signal return from the output signals return. Placing a jumper on E3 connects the fault input return line with the return line shared by the FWD, REV, FAULT RESET control outputs.

Figure 6, Pinout of Connector J9

| Pin | Name | Signal |
|---|---|---|
| 1 | +VIN | Input Power |
| 2 | SPEED REF | D/A Output |
| 3 | AGND | Speed Ref. Return |
| 4 | FAULT RESET | O.C. Output |
| 5 | FORWARD | O.C. Output |
| 6 | REVERSE | O.C. Output |
| 7 | DGND | O.C. Output Return |
| 8 | FAULT | Input |
| 9 | FAULT RETURN | Fault Input Return |

Input Voltage Requirements of VFD Section

The VFD Control section receives power from either a variable frequency drive or an external power supply, not from the RCU. A visual inspection of the board would show that there are no traces or power planes shared between the Logic section and VFD section.

Power to the VFD section determines the analog output range of the 12-bit D/A convertor. For +5V range and +10V range, the input voltage requirement is $+17.5 \leq Vin < +35VDC$. If $V_{IN}$ falls below +17.5V, only the +5V range should be used, the +10V range does not have the amplification headroom needed to support proper operation (the AD7243 $V_{DD}$ supply must be $\geq$ +14.25V at +10V range). The input voltage for the +5V range alone is $+11.4V \leq V_{IN} < +35VDC$.

Input power to the VFD section is fed through a t-filter, FIL1, and two voltage regulators, U10 and U11. IC U10 is a 78L15ACZ +15V voltage regulator which regulates the voltage to the D/A converter and to U11, an LM2931Z-5 +5V voltage regulator. In order to maintain proper voltage regulation, a minimum of +17.5V is required by the +15V regulator. If the output of the regulator is not supplying +15V to the AD7243, the +5V output range should be used.

A jumper across E1 can be used in those instances where a +15V DC regulated supply is available from the VFD. This will bypass the +15V regulator and will permit either +5V or +10V range operation of the AD7243 provided that the input voltage to VFD section is $+14.25V \leq V_{IN} < +15.75V$ DC. Caution: Without the +15V regulator, the absolute maximum voltage to the VFD section without damaging the AD7243 D/A converter is +17V DC!

| VIN | JUMPER | D/A OUTPUT |
|---|---|---|
| 17.5 - 35 | NO | +5, +10V |
| 14.25 - 15.75 | YES | +5, +10V |
| 11.4 - 15.75 | YES | +5 |

Table 1. Memory Map Summary

| Address | Read/Write | Description |
|---|---|---|
| 0280 | Read/Write | Channel B command |
| 0281 | Read/Write | Channel A command |
| 0282 | Read/Write | Channel B data |
| 0283 | Read/Write | Channel A data |
| 02A0 | Read Only | D1 = TEST BIT, D0 = VFD FAULT (0 = fault, 1 = no fault) |
| 02B0 | Write Only | CLK. The serial clock for the D/A converter. |
| 02B1 | Write Only | SERIAL DATA. Data bits are sent here one at a time. |
| 02B2 | Write Only | /SYNC. Indicates the beginning of the serial bit stream. |
| 02B3 | Write Only | /CLEAR. Sets the output of the D/A to 0 volts. |
| 02B4 | Write Only | EXTERNAL FAULT RESET. Controls the resetting of the VFD |
| 02B5 | Write Only | FORWARD RUN/STOP. Controls the running of the motor. |
| 02B6 | Write Only | REVERSE RUN/STOP. Controls the running of the motor. |
| 02B7 | Write Only | TEST BIT D1. |

Electrical Specifications of VFD Section

| Parameter | Conditions | Min | Typ | Max | Units |
|---|---|---|---|---|---|
| $V_{IN}$ | +5V and +10V range | +17.5 | - | +35 | VDC |
|  | +5V and +10V range, E1 jumper | +14.25 | - | +15.75 | VDC |
|  | +5V range | +11.4 | - | +35 | VDC |
| $I_{IN}$ | +5V range | - | - | 20 | mA |
| $V_{FAULT}$ | R2 = 1K, 1/2W | +4.5 | - | +17.0 | V |
| $I_{OUT}$ | $R_L$ = 2K, +10V range | - | - | 5 | mA |
| $T_r$ of IS1 - IS8 |  | 40 | - | - | µS |
| $T_f$ of IS1 - IS8 |  | 40 | - | - | µS |
| $V_{OL}$ Q1-Q3 |  |  |  |  |  |
| $I_{OL}$ Q1-Q3 |  |  |  | 100 | mA |
| Isolation Volt. |  | - | - | 3750 | $V_{rms}$ |
|  |  | - | - | 5304 | $V_{DC}$ |

Electrical Specifications of Logic Section

| Parameter | Conditions | Min | Typ | Max | Units |
|---|---|---|---|---|---|
| $V_{CC}$ | Supply voltage for two sensors | - | 5.0 | - | VDC |
| $I_{CC}$ | Supply current for two sensors | - | - | 1.0 | A |
| $V_{OH}$ TRG | IOH = max | 2.4 | - | - | V |
| $V_{OL}$ TRG | IOL = max | - | - | 0.5 | v |
| $I_{OH}$ TRG |  | - | - | -3.2 | mA |
| $I_{OL}$ TRG |  | - | - | 24 | mA |

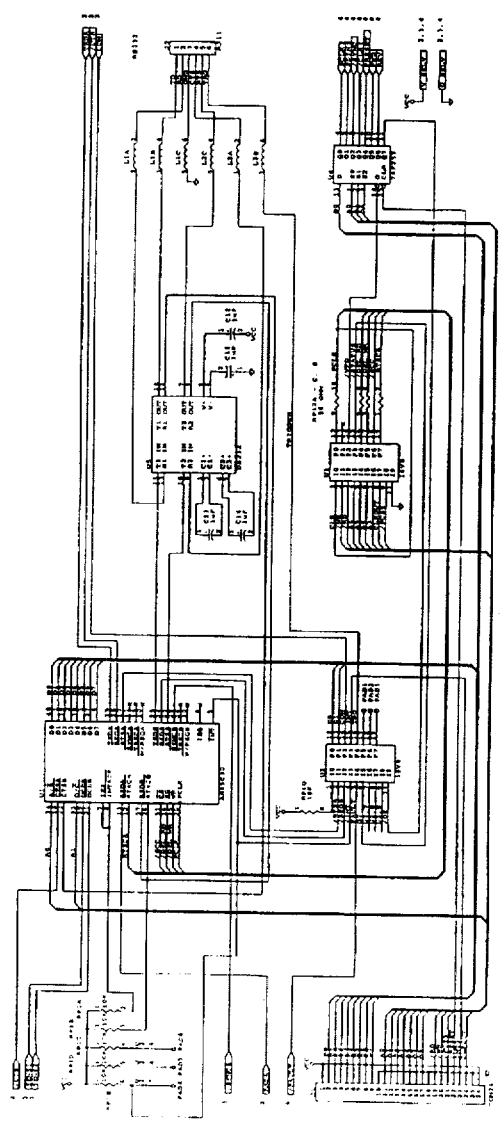

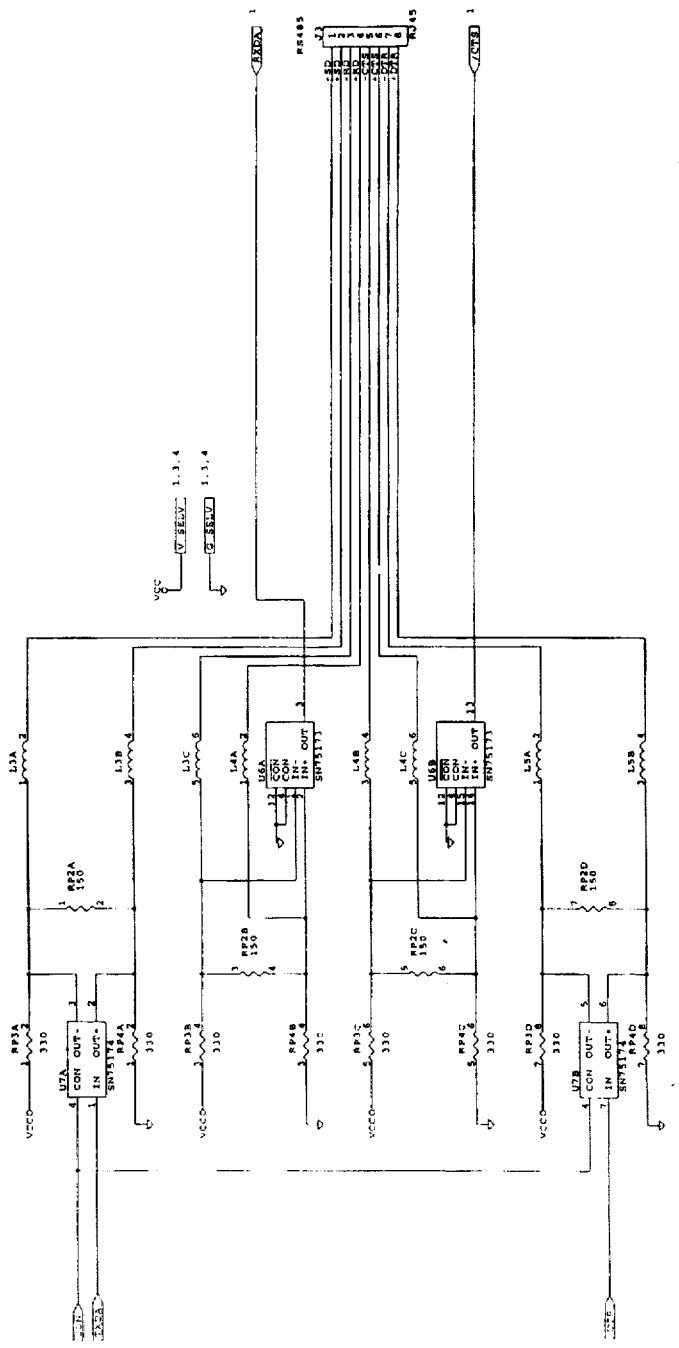

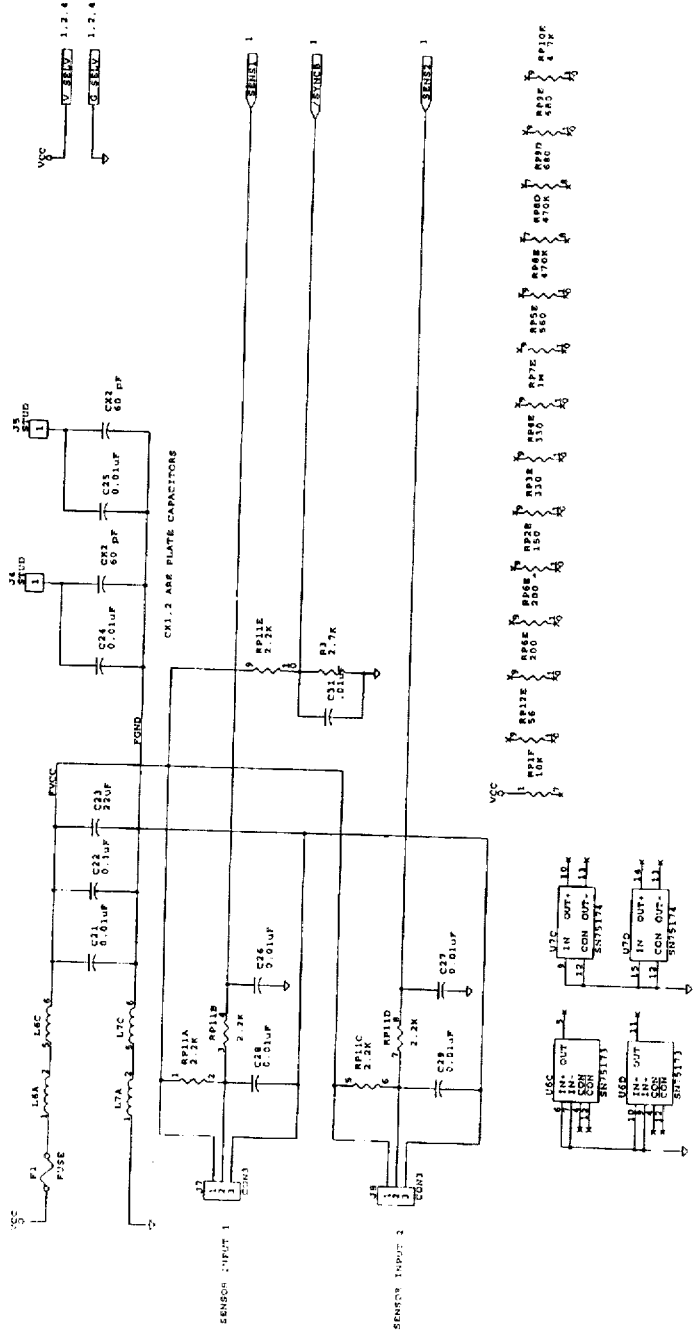

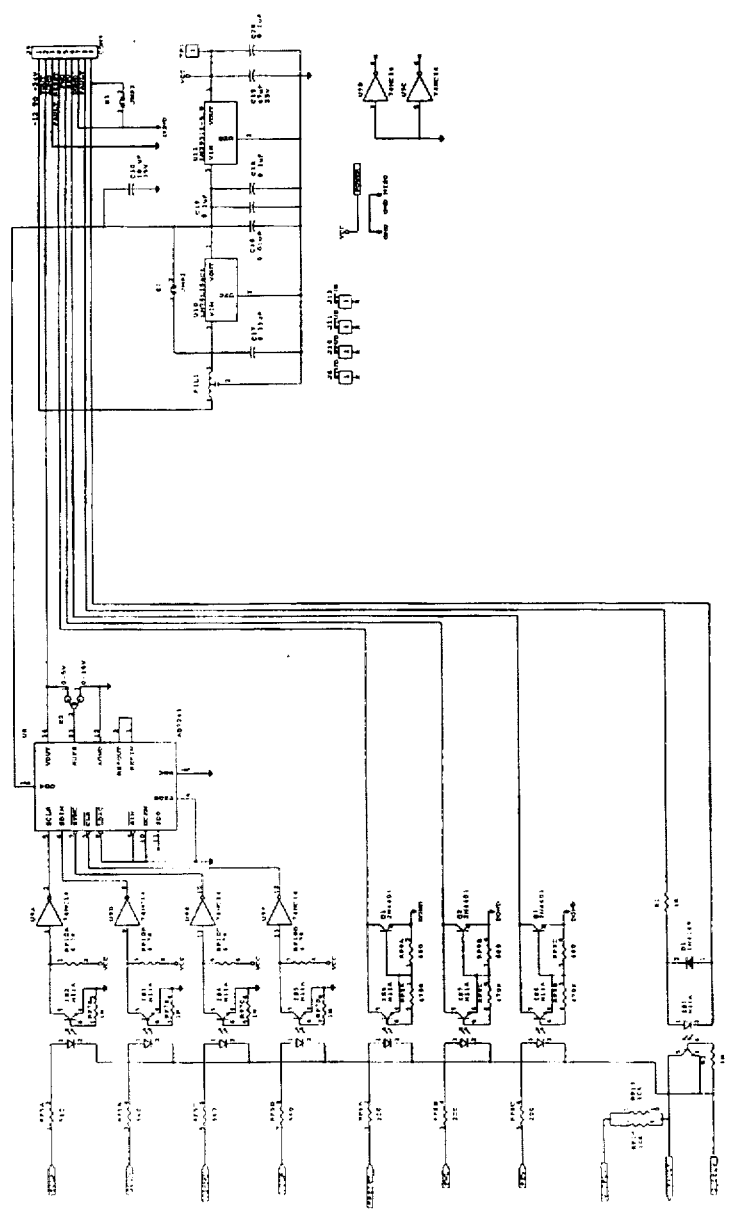

APPENDIX D

```
Copyright 1994 Check Technology Co. ;

OPTION SECURITY ON;

OPTION ISP ON;

OPTION Y1_AS_RESET ON;

OPTION MINIMIZE STRONGMIN;

DECLARE

END; //DECLARE

SYM GLB  B2  1  OVERFLOW;
        SIGTYPE LDL OUT;
        SIGTYPE LDU OUT;
     EQUATIONS
        OVFL.CLK=MCLK; // OVER FLOW (LATCHED CARRY OUT OF Q15)
        OVFL.RE= MCLR;
        OVFL.D = Q8 & Q9 & Q10 & Q11 & Q12 & Q13 & Q14 & Q15 & CAO # OVFL;
        LDL = CE & !A0; // LOAD COUNTER LOWER BYTE
        LDU = CE &  A0; // LOAD COUNTER UPPER BYTE
        END;
END;

SYM GLB  B0  1  CLOCK;
        SIGTYPE DBCK OUT;
     EQUATIONS;
        MCLK.CLK    = CLK_IN;
     // CLK_DIV4.D = CLK_DIV4 $ CLK_DIV2; // FOR FUTURE 16 MHZ CLK_IN
        MCLK.D      = MCLK.Q $ CLK_DIV2;
        MCLKIO.D    = MCLK.Q $ CLK_DIV2;
        CLK_DIV8.D = CLK_DIV8 $ (CLK_DIV2 & MCLK.Q);// FOR FUTURE 16 MHZ CLK_IN
        DBCK = DBAD & RD;
     END;
END;

SYM GLB  A0  1  EDGE_AB;
     EQUATIONS
        [SAD,SAE,SBD,SBE].CLK = MCLK;
        [SAD,SAE,SBD,SBE].RE  = MCLR;
        SAD.D = SA;
        SAE.D = !SAD & SA & ENABLE # SAD & !SA & ENABLE # SAE;
        SBD.D = SB;
        SBE.D = !SBD & SB & ENABLE # SBD & !SB & ENABLE # SBE;
     END;
END;

SYM GLB  A1  1  EDGE_CD;
     EQUATIONS
        [SCD,SCE,SDD,SDE].CLK = MCLK;
        [SCD,SCE,SDD,SDE].RE  = MCLR;
        SCD.D = SC;
```

```
            SCE.D = !SCD & SC & ENABLE # SCD & !SC & ENABLE # SCE;
            SDD.D = SD;
            SDE.D = !SDD & SD & ENABLE # SDD & !SD & ENABLE # SDE;
        END;
    END;

SYM GLB  A2   1   STATE;
            SIGTYPE COUNT OUT;
            SIGTYPE INT   OUT;
        EQUATIONS
            COUNT =  SAE & !SBE & !SCE & !SDE & ENABLE & !OVFL
                  # !SAE &  SBE & !SCE & !SDE & ENABLE & !OVFL
                  # !SAE & !SBE &  SCE & !SDE & ENABLE & !OVFL
                  # !SAE & !SBE & !SCE &  SDE & ENABLE & !OVFL
                  # COUNTS & !OVFL;
            COUNTD.CLK = MCLK;
            COUNTD.RE  = MCLR;
            COUNTD.D   = COUNT;
            INT = SAE & SBE & ENABLE
                # SAE & SCE & ENABLE
                # SAE & SDE & ENABLE
                # SBE & SCE & ENABLE
                # SBE & SDE & ENABLE
                # SCE & SDE & ENABLE
                # OVFL       & ENABLE;
        END;
    END;

SYM GLB  A3   1   FIRST_E;
        EQUATIONS
            [SEFL,SEFU].CLK = MCLK;
            [SEFL,SEFU].RE  = MCLR;
            SEFL.D = (SBE & COUNT & !COUNTD)
                   # (SDE & COUNT & !COUNTD)
                   # SEFL;
            SEFU.D = (SCE & COUNT & !COUNTD)
                   # (SDE & COUNT & !COUNTD)
                   # SEFU;
        END;
    END;

SYM GLB  A4   1   Q0-3;
        EQUATIONS
            EN = COUNT;
            [Q0..Q3].CLK = MCLK;
            [Q0..Q3].RE  = MCLR;
            Q0.D = (Q0 & !LDL) $$ ((D0 & LDL) # (                    !LDL & EN) );
            Q1.D = (Q1 & !LDL) $$ ((D1 & LDL) # (Q0 &                !LDL & EN) );
            Q2.D = (Q2 & !LDL) $$ ((D2 & LDL) # (Q0 & Q1 &           !LDL & EN) );
            Q3.D = (Q3 & !LDL) $$ ((D3 & LDL) # (Q0 & Q1 & Q2 &      !LDL & EN) );
        END;
    END;

SYM GLB  A5   1   Q4-7;
        EQUATIONS
            EN = COUNT;
            [Q4..Q7].CLK = MCLK;
            [Q4..Q7].RE  = MCLR;
            Q4.D = (Q4 & !LDL) $$ ((D4 & LDL) #
                                   (Q0 & Q1 & Q2 & Q3 &              !LDL & EN) );
            Q5.D = (Q5 & !LDL) $$ ((D5 & LDL) #
                                   (Q0 & Q1 & Q2 & Q3 & Q4 &         !LDL & EN) );
            Q6.D = (Q6 & !LDL) $$ ((D6 & LDL) #
                                   (Q0 & Q1 & Q2 & Q3 & Q4 & Q5 &    !LDL & EN) );
            Q7.D = (Q7 & !LDL) $$ ((D7 & LDL) #
                                   (Q0 & Q1 & Q2 & Q3 & Q4 & Q5 & Q6 & !LDL & EN) );
```

```
        END;
END;

SYM GLB  B1   1  CAO(CO7);
        SIGTYPE CAO OUT;
        EQUATIONS
            CLK_DIV2.CLK  = CLK_IN;
            CLK_DIV2.D    = !CLK_DIV2;
            CAO = Q0 & Q1 & Q2 & Q3 & Q4 & Q5 & Q6 & Q7 & COUNT;
        END;
END;

SYM GLB  A6   1  Q8-11;
    EQUATIONS
        [Q8..Q11].CLK = MCLK;
        [Q8..Q11].RE  = MCLR;
        CAI = CAO;
        Q8.D  = (Q8  & !LDU) $$ ((D0 & LDU) # (                        !LDU & CAI ) );
        Q9.D  = (Q9  & !LDU) $$ ((D1 & LDU) # (Q8 &                    !LDU & CAI ) );
        Q10.D = (Q10 & !LDU) $$ ((D2 & LDU) # (Q8 & Q9 &               !LDU & CAI ) );
        Q11.D = (Q11 & !LDU) $$ ((D3 & LDU) # (Q8 & Q9 & Q10 &         !LDU & CAI ) );
    END;
END;

SYM GLB  A7   1  Q12-15;
    EQUATIONS
        [Q12..Q15].CLK = MCLK;
        [Q12..Q15].RE  = MCLR;
        CAI=CAO;
        Q12.D = (Q12 & !LDU) $$ ((D4 & LDU) #
                        (Q8 & Q9 & Q10 & Q11 &                         !LDU & CAI ));
        Q13.D = (Q13 & !LDU) $$ ((D5 & LDU) #
                        (Q8 & Q9 & Q10 & Q11 & Q12 &                   !LDU & CAI ));
        Q14.D = (Q14 & !LDU) $$ ((D6 & LDU) #
                        (Q8 & Q9 & Q10 & Q11 & Q12 & Q13 &             !LDU & CAI ));
        Q15.D = (Q15 & !LDU) $$ ((D7 & LDU) #
                        (Q8 & Q9 & Q10 & Q11 & Q12 & Q13 & Q14 &       !LDU & CAI ));
    END;
END;

SYM GLB  B7   1  MD0..2;
    EQUATIONS
        [MD0,MD1,MD2].CLK = DBCK;
        [MD0,MD1,MD2].RE  = MCLR;
        MD0.D = !A0 & !A1 & Q0
              # A0  & !A1 & Q8
              # !A0 & A1  & SA    // DON'T INVERT SENSOR INPUT
              # A0  & A1  & SEFL;
        MD1.D = !A0 & !A1 & Q1
              # A0  & !A1 & Q9
              # !A0 & A1  & SB    // DON'T  INVERT SENSOR INPUT
              # A0  & A1  & SEFU;
        MD2.D = !A0 & !A1 & Q2
              # A0  & !A1 & Q10
              # !A0 & A1  & SC    // DON'T INVERT SENSOR INPUT
              # A0  & A1  & OVFL;
    END;
END;

SYM GLB  B6   1  MD3..5;
    EQUATIONS
        [MD3,MD4,MD5].CLK = DBCK;
        [MD3,MD4,MD5].RE  = MCLR;
        MD3.D = !A0 & !A1 & Q3
              # A0  & !A1 & Q11
              # !A0 & A1  & SD    // DON'T INVERT SENSOR INPUT
```

```
                  #  A0 &  A1 & INT;
        MD4.D = !A0 & !A1 & Q4
              #  A0 & !A1 & Q12
              # !A0 &  A1 & SAE;
        MD5.D = !A0 & !A1 & Q5
              #  A0 & !A1 & Q13
              # !A0 &  A1 & SBE;
    END;
END;

SYM GLB  B5  1  MD6..7;
    EQUATIONS
        [MD6,MD7].CLK = DBCK;
        [MD6,MD7].RE  = MCLR;
        MD6.D = !A0 & !A1 & Q6
              #  A0 & !A1 & Q14
              # !A0 &  A1 & SCE;
        MD7.D = !A0 & !A1 & Q7
              #  A0 & !A1 & Q15
              # !A0 &  A1 & SDE;
    END;
END;

SYM GLB  B4  1  DBOE;
        SIGTYPE CE    OUT; // COUNTER ENABLE
        SIGTYPE DBOE  OE ; // DATA BUS OUTPUT ENABLE
        SIGTYPE DBAD  OUT; // DATA BUS ADDRESS DECODE
        SIGTYPE LE    OUT; // CONTROL LATCH ENABLE
    EQUATIONS
        CE   = PCS5 &        !A1 & !A2 & !A3 & !A4 & !A5 & !A6 & WR;
        DBOE = PCS5 &                    !A3 & !A4 & !A5 & !A6 & RD;
        DBAD = PCS5 &                    !A3 & !A4 & !A5 & !A6;
        LE   = PCS5 & !A0 & !A1 &  A2 & !A3 & !A4 & !A5 & !A6 & WR & CLK_IND;
    END;
END;

SYM GLB  B3  1  LATCH;
        SIGTYPE NGRES   REG NOMIN; // NOT GLOBAL RESEST
        SIGTYPE ENABLE  OUT NOMIN; // ENABLE TO LOOK FOR EDGES AND INTERRUPT
        SIGTYPE COUNTS  OUT NOMIN; // FORCE COUNTER TO COUNT UNTIL OVERFLOW
        SIGTYPE MCLR    OUT NOMIN; // SOFTWARE AND POWER ON MASTER CLEAR
    EQUATIONS
        NGRES.CLK = MCLK;// THIS WILL NOT CLOCK UNTIL TWO CLOCKS AFTER
                         //    GLOBAL RESET (HARDWARE RESET)
        NGRES.D   = VCC; // THIS SIGNAL WILL BE LOW FOR TWO CLOCKS AFTER
                         //    GLOBAL RESET (HARDWARE RESET)
        MCLR   = LE & WR & D0 # MCLR.PIN & WR # !NGRES.Q;
        ENABLE = LE & D1 &                !MCLR.PIN
               # ENABLE.PIN &  D1 & !MCLR.PIN
               # ENABLE.PIN & !LE & !MCLR.PIN;
        COUNTS = LE & D2 &                !MCLR.PIN
               # COUNTS.PIN &  D2 & !MCLR.PIN
               # COUNTS.PIN & !LE & !MCLR.PIN;
    END;
END;

SYM IOC  Y0  1  CLK_IN;
XPIN CLK CLK_IN_PIN LOCK 11 PULLUP;
IB11(CLK_IN,CLK_IN_PIN);
END;

SYM IOC  IO30  1  D1;
XPIN IO D1_PIN LOCK 7 PULLUP;
BI11 (D1,D1_PIN,MD1,DBOE);
END;
```

```
SYM IOC IO29 1 D2;
XPIN IO D2_PIN LOCK 43 PULLUP;
BI11 (D2,D2_PIN,MD2,DBOE);
END;

SYM IOC IO28 1 D3;
XPIN IO D3_PIN LOCK 44 PULLUP;
BI11 (D3,D3_PIN,MD3,DBOE);
END;

SYM IOC IO27 1 D4;
XPIN IO D4_PIN LOCK 5 PULLUP;
BI11 (D4,D4_PIN,MD4,DBOE);
END;

SYM IOC IO26 1 D5;
XPIN IO D5_PIN LOCK 3 PULLUP;
BI11 (D5,D5_PIN,MD5,DBOE);
END;

SYM IOC IO25 1 D6;
XPIN IO D6_PIN LOCK 18 PULLUP;
BI11 (D6,D6_PIN,MD6,DBOE);
END;

SYM IOC IO24 1 D7;
XPIN IO D7_PIN LOCK 16 PULLUP;
BI11 (D7,D7_PIN,MD7,DBOE);
END;

SYM IOC IO0 1 SA;
XPIN IO SA_PIN LOCK 6 PULLUP;
ID11 (SA,SA_PIN,MCLKIO);
END;

SYM IOC IO1 1 SB;
XPIN IO SB_PIN LOCK 4 PULLUP;
ID11 (SB,SB_PIN,MCLKIO);
END;

SYM IOC IO2 1 SC;
XPIN IO SC_PIN LOCK 31 PULLUP;
ID11 (SC,SC_PIN,MCLKIO);
END;

SYM IOC IO3 1 SD;
XPIN IO SD_PIN LOCK 28 PULLUP;
ID11 (SD,SD_PIN,MCLKIO);
END;

SYM IOC IO23 1 A1;
XPIN IO A1_PIN LOCK 27 PULLUP;
IB11 (A1,A1_PIN);
END;

SYM IOC IO22 1 A2;
XPIN IO A2_PIN LOCK 42 PULLUP;
IB11 (A2,A2_PIN);
END;

SYM IOC IO21 1 A3;
XPIN IO A3_PIN LOCK 29 PULLUP;
IB11 (A3,A3_PIN);
END;

SYM IOC IO20 1 A4;
```

```
XPIN IO A4_PIN LOCK 9 PULLUP;
IB11 (A4,A4_PIN);
END;

SYM IOC IO19 1 A5;
XPIN IO A5_PIN LOCK 38 PULLUP;
IB11 (A5,A5_PIN);
END;

SYM IOC IO18 1 A6;
XPIN IO A6_PIN LOCK 22 PULLUP;
IB11 (A6,A6_PIN);
END;

SYM IOC IO15 1 WR;
XPIN IO !WR_PIN LOCK 19 PULLUP;
IB11 (!WR,!WR_PIN);
END;

SYM IOC IO14 1 RD;
XPIN IO !RD_PIN LOCK 30 PULLUP;
IB11 (!RD,!RD_PIN);
END;

SYM IOC IO13 1 PCS5;
XPIN IO !PCS5_PIN LOCK 21 PULLUP;
IB11 (!PCS5,!PCS5_PIN);
END;

SYM IOC IO31 1 CLK_IND;
XPIN IO CLK_IND_PIN LOCK 10 PULLUP;
IB11 (CLK_IND,CLK_IND_PIN);
END;

SYM IOC IO16 1 D0;
XPIN IO D0_PIN LOCK 8 PULLUP;
BI11 (D0,D0_PIN,MD0,DBOE);
END;

SYM IOC IO12 1 INT;
XPIN IO INT_PIN LOCK 17;
OB11 (INT_PIN,INT);
END;

SYM IOC IO11 1 ENABLE;
XPIN IO ENABLE_PIN LOCK 32;
OB21 (ENABLE_PIN,ENABLE); // INVERTING OUTPUT
END;

SYM IOC IO10 1 OVFL;
XPIN IO OVFL_PIN LOCK 25;
OB21 (OVFL_PIN,OVFL); // INVERTING OUTPUT
END;

SYM IOC IO17 1 A0;
XPIN IO A0_PIN LOCK 37 PULLUP;
IB11 (A0,A0_PIN);
END;

SYM IOC IO4 1 SAE;
XPIN IO SAE_PIN LOCK 15;
OB21 (SAE_PIN,SAE); // INVERTING OUTPUT
END;

SYM IOC IO5 1 SBE;
XPIN IO SBE_PIN LOCK 20;
```

```
OB21 (SBE_PIN,SBE); // INVERTING OUTPUT
END;

SYM IOC  IO6  1  SCE;
XPIN IO SCE_PIN LOCK 41;
OB21 (SCE_PIN,SCE); // INVERTING OUTPUT
END;

SYM IOC  IO7  1  SDE;
XPIN IO SDE_PIN LOCK 40;
OB21 (SDE_PIN,SDE); // INVERTING OUTPUT
END;
END;   //LDF DESIGNLDF
```

We claim:

1. An apparatus for registering a sheet being transported along a path, the sheet having a leading edge, the apparatus being configured to shift the sheet from a first position in which the leading edge is not substantially perpendicular to the path to a second position in which the leading edge is substantially perpendicular to the path, the apparatus comprising:

a first sensor arranged and configured to detect the leading edge and generate a first signal in response to detection of the leading edge;

a second sensor arranged and configured to detect the leading edge and generate a second signal in response to detection of the leading edge;

first and second roller pairs arranged and configured to feed the sheet along the path;

first and second motors, the first motor arranged to rotate the first roller pair, and the second motor arranged to rotate the second roller pair; and circuitry linked to the first and second sensors and the first and second motors, the circuitry being configured to receive the first and second signals, detect a time interval between reception of the first and second signals, and cause a speed differential between the first and second motors in response to detection of a time interval thereby shifting the sheet from the first position to the second position, wherein the speed differential is created by a change in speed of the first motor that is equal and opposite to a change in speed of the second motor and wherein the average velocity of the leading edge is maintained.

2. The apparatus of claim 1 wherein the first sensor cooperates with the circuitry in order to control the speed of the first motor, further wherein the circuitry is configured to decrease the speed of the first motor from a predetermined speed if the first signal is received before the second signal.

3. The apparatus of claim 1 wherein the first sensor cooperates with the circuitry in order to control the speed of the second motor, further wherein the circuitry is configured to increase the speed of the first motor from a predetermined speed if the first signal is received before the second signal.

4. The apparatus of claim 1 wherein the second sensor cooperates with the circuitry in order to control the speed of the second motor, further wherein the circuitry is configured to decrease the speed of the second motor from a predetermined speed if the second signal is received before the first signal.

5. The apparatus of claim 1 wherein the second sensor cooperates with the circuitry in order to control the speed of the first motor, further wherein the circuitry is configured to increase the speed of the first motor from a predetermined speed if the second signal is received before the first signal.

6. The apparatus of claim 1 wherein the first and second roller pair pinch the sheet being fed, further wherein one of the rollers in the first roller pair has a first tapered rim thereby minimizing the area of contact with the sheet, further wherein one of the rollers in the second roller pair has a tapered rim thereby minimizing the area of contact with the sheet.

7. The apparatus of claim 6 wherein the first and second tapered rims are formed by O-rings.

8. The apparatus of claim 1 wherein the first roller pair includes a first drive roller and the second roller pair includes a second drive roller, further wherein the diameters of the first and second drive rollers are equivalent.

9. The apparatus of claim 8 wherein the tolerance between the diameters of the first and second drive rollers is ±0.0005 of an inch.

10. The apparatus of claim 1 wherein the first sensor and first roller pair are connected to a first mounting member and the second sensor and second roller pair are connected to a second mounting member, further wherein the distance between the first and second mounting members is adjustable in order to accommodate sheets having different widths.

11. The apparatus of claim 1 wherein the circuitry is further configured to determine a time interval between reception of the first and second signals, and to cause the speed differential if the time interval is greater than a predetermined level.

12. The apparatus of claim 1 wherein the first and second motors are stepper motors.

13. A document handling apparatus for aligning and feeding a sheet to a printer, wherein the sheet has a leading edge and the track and the printer form a path along which the sheet is transported, the apparatus comprising:

a track for transporting sheets to the printer;

a collator having a plurality of retainers, each retainer being arranged and configured to hold stack of sheets, the collator being arranged and configured to pick sheets from one of the retainers and present the picked sheet to the track;

a roller arrangement connected to a carriage assembly the roller arrangement and carriage assembly being positioned on the track, the roller arrangement configured to register the angular position of the sheet and the carriage assembly configured to register the lateral position of the sheet;

a first sensor arranged and configured to detect the leading edge and generate a first signal in response to detection of the leading edge;

a second sensor arranged and configured to detect the leading edge and generate a second signal in response to detection of the leading edge;

first and second roller pairs arranged and configured to feed the sheet along the path;

first and second motors, the first motor arranged to rotate the first roller pair, and the second motor arranged to rotate the second roller pair; and circuitry linked to the first and second sensors and the first and second motors, the circuitry being configured to receive the first and second signals, detect a time interval between reception of the first and second signals, and cause a speed differential between the first and second motors in response to detection of a time interval thereby shifting the sheet from the first position to the second position.

14. The document handling apparatus of claim 13 wherein the first and second motors are stepper motors, further wherein the circuitry is configured to determine a time interval between steps in the first motor and steps in the second motor in response to detection of a time interval thereby causing a phase differential between the first and the second motors.

15. The document handling apparatus of claim 13 wherein the circuitry is configured to decrease the speed of the first motor from a predetermined speed and increase the speed of the second motor from a predetermined speed if the circuitry receives the first signal before the second signal thereby maintaining the mean speed of the sheet as the sheet is fed by the first and second roller pair.

16. The document handling apparatus of claim 13 wherein the circuitry is configured to increase the speed of the first motor from a predetermined speed and decrease the speed of the second motor from a predetermined speed if the circuitry receives the first signal after the second signal thereby maintaining the mean speed of the sheet as the sheet is fed by the first and second roller pair.

17. The document handling apparatus of claim 13 wherein the sheet has a side edge, the carriage assembly comprising a third motor arranged and configured to move the carriage laterally thereby shifting the side edge to the predetermined position, and the registration assembly further comprising a third sensor arranged and configured to detect the side edge and generate a third signal in response to detecting the side edge thereby indicating that the side edge is in the predetermined position, the third sensor being linked to the circuitry.

18. The document handling apparatus of claim 17 wherein the third sensor and the circuitry cooperate to control the third motor thereby causing the third motor to move the carriage laterally until the third sensor detects the side edge.

19. The document handling apparatus of claim 17 wherein the third sensor and the motor cooperate to control the third motor thereby causing the third motor to move the carriage in one direction until the third sensor detects the side edge and then move the carriage in the opposite direction until the third sensor fails to detect the side edge.

* * * * *

UNITED STATES PATENT AND TRADEMARK OFFICE
CERTIFICATE OF CORRECTION

PATENT NO.   : 5,917,727
DATED        : June 29, 1999
INVENTOR(S)  : Richardson et al.

It is certified that error appears in the above-identified patent and that said Letters Patent is hereby corrected as shown below:

Title page,
Item [56] References Cited, Other Publications: insert the following:

-- "Automatic Air-Suction Controllers, TAC Series", *Horizon International, Inc.*, brochure (date unknown).

"Bourg BST Suction Tower", *C.P. Bourg, Inc.*, brochure (date unknown)."

"Bourg BST Vertical Suction Tower", *C.P. Bourg, Inc.*, brochure (date unknown).

"Bourg Collators System", *C.P. Bourg, Inc.*, brochure (date unknown).

"Bourg Multitower and Bourg Single Tower", *C.P. Bourg, Inc.*, brochure (date unknown).

"Checktronic Printing System", *Check Technology Corporation*, brochure (September 1993).

"Duplo DC-8000 S Air Suction-Feed Collator", *Duplo*, brochure (date unknown).

"Eprint 1000", *Indigo, N.V.*, brochure (date unknown).

"Foliotronic Finishing System", *Check Technology Corporation*, brochure (September 1993).

"Indigo's E-Print: New Generation of Offset Color Printing", *Seybold Report on Publishing Systems*, pp. 1-8 (July 12, 1993).

"Print 600 Document Printing System", *Advanced Printing Systems, Inc.*, brochure (October 1992).

"The Mark of a Great Colllator is No Mark at All", *Standard Publishing Systems*, brochure (date unknown).
"Vario Control Systems", *Watkiss Automation Limited, Distributed by Challenge Graphics Equipment Company*, brochure (August 1991).

UNITED STATES PATENT AND TRADEMARK OFFICE
CERTIFICATE OF CORRECTION

PATENT NO. : 5,917,727
DATED : June 29, 1999
INVENTOR(S) : Richardson et al.

It is certified that error appears in the above-identified patent and that said Letters Patent is hereby corrected as shown below:

"Vario Floor –Standing Base", *Watkiss Automation Limited, Distributed by Challenge Graphics Equipment Company*, brochure (August 1991).

"Vario Twin Towers", *Watkiss Automation Limited, Distributed by Challenge Graphics Equipment Company*, brochure (March 1992).

Vario Suction Feed Bin", *Watkiss Automation Limted, Distributed by Challenge Graphics Equipment Company*, brochure (March 1992).

"Vario Bench Top Base", *Watkiss Automation Limited, Distributed by Challenge Graphics Equipment Company*, brochure (August 1991).

"Vario Stitch-Fold & Trim", *Watkiss Automation Limited, Distributed by Challenge GraphicsEquipment Company*, brochure (August 1991).

"Vario Friction Feed Bin", *Watkiss Automation Limited, Distributed by Challenge Graphics Equipment Company*, brochure (August 1991).

"Vario, What the Papers Say...", *Watkiss Automation Limited, Packet of Product Announcements, Articles, and the British Design Award, which was given on May 21, 1993* (August 1993).

"Vario X-Jogger", *Watkiss Automation Limited, Distributed by Challenge Graphics Equipment Company*, brochure (August 1991).

"Vario", *Watkiss Automation Limited, Distributed by Challenge Graphics Equipment Company*, brochure (date unknown).

"Xeikon DCP-1", *Xeikon N.V.*, brochure (Copyright 1993). --

Column 3,
Line 40: "5 and 6" should read -- 5, 6 and 6A --
Line 42: "FIG. 7" should read -- FIGS. 7 and 7A --

Column 6,
Line 40: "128a-128h" should read -- 178a-178h --

UNITED STATES PATENT AND TRADEMARK OFFICE
CERTIFICATE OF CORRECTION

PATENT NO. : 5,917,727
DATED : June 29, 1999
INVENTOR(S) : Richardson et al.

It is certified that error appears in the above-identified patent and that said Letters Patent is hereby corrected as shown below:

Column 9,
Line 40: "128a" should read -- 178a --

Column 15,
Line 44: "408" should read -- 438 --

Column 18,
Line 33: "538d" should read -- 538e --
Line 48: "538" should read -- 538a --
Line 53: "548" should read -- 548a --
Line 55: "538c" should read --538b --

Column 19,
Line 44: "548f" should read -- 548g --
Line 45: "538f" should read -- 538g --
Line 45: "549" should read -- 552 --
Line 45: "549b to rotate" should read -- 553 --

Signed and Sealed this

Twenty-fifth Day of September, 2001

Attest:

NICHOLAS P. GODICI
Attesting Officer    Acting Director of the United States Patent and Trademark Office